United States Patent
Munoz et al.

(10) Patent No.: US 12,459,944 B2
(45) Date of Patent: Nov. 4, 2025

(54) FUSED HETEROCYCLES AS 5-HT2A RECEPTOR AGONISTS

(71) Applicant: TRANSNEURAL THERAPEUTICS, INC., Issaquah, WA (US)

(72) Inventors: Benito Munoz, Boston, MA (US); Urjita H. Shah, Boston, MA (US); Paul Galatsis, Boston, MA (US)

(73) Assignee: TRANSNEURAL THERAPEUTICS, INC., Issaquah, WA (US)

( * ) Notice: Subject to any disclaimer, the term of this patent is extended or adjusted under 35 U.S.C. 154(b) by 0 days.

(21) Appl. No.: 18/730,504

(22) PCT Filed: Jan. 19, 2023

(86) PCT No.: PCT/US2023/011169
§ 371 (c)(1),
(2) Date: Jul. 19, 2024

(87) PCT Pub. No.: WO2023/141225
PCT Pub. Date: Jul. 27, 2023

(65) Prior Publication Data
US 2024/0425503 A1 Dec. 26, 2024

Related U.S. Application Data

(60) Provisional application No. 63/300,721, filed on Jan. 19, 2022.

(51) Int. Cl.
| | | |
|---|---|---|
| C07D 471/04 | (2006.01) |
| A61K 31/437 | (2006.01) |
| A61K 31/438 | (2006.01) |
| A61K 31/444 | (2006.01) |
| C07D 413/04 | (2006.01) |
| C07D 417/04 | (2006.01) |

(52) U.S. Cl.
CPC .......... C07D 471/04 (2013.01); A61K 31/437 (2013.01); A61K 31/438 (2013.01); A61K 31/444 (2013.01); C07D 413/04 (2013.01); C07D 417/04 (2013.01)

(58) Field of Classification Search
CPC .. C07D 471/04; C07D 413/04; C07D 417/04; A61K 31/437; A61K 31/438; A61K 31/444
USPC .......................................................... 514/278
See application file for complete search history.

(56) References Cited

FOREIGN PATENT DOCUMENTS

| WO | 2009/094668 A1 | 7/2009 |
| WO | 2021/252692 A1 | 12/2021 |
| WO | 2022/067165 A1 | 3/2022 |

OTHER PUBLICATIONS

International Search Report and Written Opinion dated Mar. 22, 2023 issued in PCT Application No. PCT/US2023/011169.

*Primary Examiner* — Kahsay Habte
(74) *Attorney, Agent, or Firm* — RAPHAEL BELLUM PLLC

(57) ABSTRACT

The disclosure provides compounds, e.g., compounds of Formula I, and their use in treating medical diseases or disorders, such as neurological disorders. Pharmaceutical compositions and methods of making various azaindole and benzisoxazole compounds are provided. The compounds are contemplated to be modulators of the 5-hydroxytryptamine 2A (5-HT2A) receptor.

21 Claims, No Drawings

FUSED HETEROCYCLES AS 5-HT2A RECEPTOR AGONISTS

CROSS REFERENCE TO RELATED APPLICATIONS

This application claims the benefit of, and priority to, U.S. Ser. No. 63/300,721 filed on Jan. 19, 2022; the content of which is incorporated by reference herein in its entirety.

BACKGROUND

Agonists of the 5-hydroxytryptamine 2A receptor (5-HT2AR) are sought after as potential pharmaceuticals for a variety of neurological diseases and disorders including, but not limited to, depression, anxiety, substance abuse, migraine headaches, and/or cluster headaches, and various somatic illnesses including, but not limited to, various inflammatory, cardiovascular, and/or pain disorders. Although many 5-HT2AR agonists have been developed, few are selective for this receptor over related subtypes, for example, the 5-HT2B receptor, a toxicology anti-target strongly implicated in serious side effects including drug-induced valvular heart disease.

Thus, there is a need for the development of safe and effective compounds that are 5-HT2A receptor agonists, for example, agonists that selectively bind to the 5-HT2A receptor over the 5-HT2B receptor.

SUMMARY

The disclosure is directed, in part, to agonists of the 5-hydroxytryptamine 2A (5-HT2A) receptor. Also disclosed herein are pharmaceutical compositions comprising at least one disclosed compound and a pharmaceutically acceptable carrier.

For example, disclosed herein is a compound of Formula I:

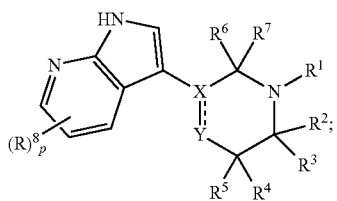

(I)

or a pharmaceutically acceptable salt and/or a stereoisomer thereof, wherein
- ⫽ is a double bond; X is C; and Y is CH; or
- ⫽ is a single bond; X is $CR^X$; Y is $CHR^Y$; and $R^X$ and $R^Y$ together form —$CH_2$—;
- $R^1$ is selected from the group consisting of hydrogen and $C_1$-$C_6$alkyl; wherein $R^1$ may optionally be substituted on an available carbon by one or more halogens or by $C_1$-$C_3$alkoxy;
- $R^2$ and $R^3$ are each hydrogen or each $C_1$-$C_6$alkyl;
- $R^4$ is selected from the group consisting of hydrogen and $C_1$-$C_6$alkyl; wherein $R^4$ may optionally be substituted on an available carbon by one or more halogens;
- $R^5$ is selected from the group consisting of hydrogen, halogen, cyano, $C_1$-$C_6$alkyl, and $C_1$-$C_6$alkoxy; wherein $R^5$ may optionally be substituted on an available carbon by one or more halogens; or
- $R^4$ and $R^5$, together with the carbon to which they are attached, may be joined together to form $C_3$-$C_6$cycloalkyl or 3-6 membered heterocyclyl;
- $R^6$ and $R^7$ are each hydrogen or each $C_1$-$C_6$alkyl; or
- $R^6$ and $R^7$, together with the carbon to which they are attached, may be joined together to form $C_3$-$C_6$cycloalkyl or 3-6 membered heterocyclyl; or
- $R^6$ and $R^5$ may be joined together to form —$CH_2$— or —$CH_2$—$CH_2$—; or
- $R^6$ and $R^3$ may be joined together to form —$CH_2$— or —$CH_2$—$CH_2$—;
- $R^8$ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens; and
- p is 0, 1, 2 or 3;

wherein:
- at least one of $R^1$, $R^4$ and $R^5$ is $C_1$-$C_6$alkyl substituted by one or more halogens; or
- $R^2$ and $R^3$ are each $C_1$-$C_6$alkyl; or
- $R^4$ and $R^5$ are each $C_1$-$C_6$alkyl or each halogen; or
- $R^6$ and $R^7$ are each $C_1$-$C_6$alkyl.

Also disclosed herein is a compound represented by Formula II:

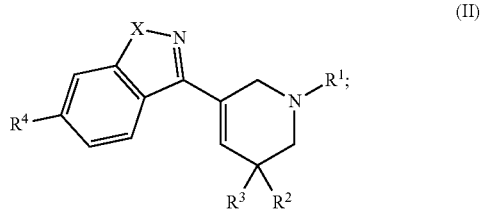

(II)

or a pharmaceutically acceptable salt and/or a stereoisomer thereof, wherein
- X is O or S;
- $R^1$ is selected from the group consisting of hydrogen and $C_1$-$C_6$alkyl;
- $R^2$ is selected from the group consisting of hydrogen and $C_1$-$C_6$alkyl;
- $R^3$ is selected from the group consisting of hydrogen and $C_1$-$C_6$alkyl; and
- $R^4$ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens.

Further disclosed herein are pharmaceutical compositions comprising at least one compound of the disclosure and at least one pharmaceutically acceptable excipient. In certain embodiments, the pharmaceutical compositions comprise at least one additional therapeutic agent that treats, ameliorates, and/or prevents a neurological disease and/or disorder.

In another embodiment, provided herein are methods of ameliorating, and/or preventing a neurological disease or disorder in a patient in need thereof, comprising administering to the patient a therapeutically effective amount of any of the compounds described herein, or a pharmaceutical composition thereof. In certain embodiments, the neurological disease or disorder is selected from the group consisting of, for example, depression, anxiety, substance abuse, and headache.

Also disclosed herein are methods of selectively agonizing the 5-hydroxytryptamine 2A (5-HT2A) receptor in a patient in need thereof, comprising administering to the

DETAILED DESCRIPTION

The features and other details of the disclosure will now be more particularly described. Before further description of the present disclosure, certain terms employed in the specification, examples and appended claims are collected here. These definitions should be read in light of the remainder of the disclosure and as understood by a person of skill in the art. Unless defined otherwise, all technical and scientific terms used herein have the same meaning as commonly understood by a person of ordinary skill in the art.

Definitions

The term "treating" includes any effect, e.g., lessening, reducing, modulating, or eliminating, that results in the improvement of the condition, disease, disorder and the like.

The term "alkyl" as used herein refers to a saturated straight or branched hydrocarbon. Exemplary alkyl groups include, but are not limited to, straight or branched hydrocarbons of 1-6, 1-4, or 1-3 carbon atoms, referred to herein as $C_{1-3}$alkyl, $C_{1-4}$alkyl, and $C_{1-3}$alkyl, respectively. Exemplary alkyl include, but are not limited to, methyl, ethyl, propyl, isopropyl, 2-methyl-1-butyl, 3-methyl-2-butyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, etc.

The term "alkenyl" as used herein refers to an unsaturated straight or branched hydrocarbon having at least one carbon-carbon double bond. Exemplary alkenyl groups include, but are not limited to, a straight or branched group of 2-6 or 3-4 carbon atoms, referred to herein as $C_1$-$C_5$alkenyl, $C_2$-$C_6$alkenyl, and $C_3$-$C_4$alkenyl, respectively. Exemplary alkenyl groups include, but are not limited to, vinyl, allyl, butenyl, pentenyl, etc.

The term "alkynyl" as used herein refers to an unsaturated straight or branched hydrocarbon having at least one carbon-carbon triple bond. Exemplary alkynyl groups include, but are not limited to, straight or branched groups of 2-6, or 3-6 carbon atoms, referred to herein as $C_{2-6}$alkynyl, and $C_{3-6}$alkynyl, respectively. Exemplary alkynyl groups include, but are not limited to, ethynyl, propynyl, butynyl, pentynyl, hexynyl, methylpropynyl, etc.

The term "alkoxy" as used herein refers to a straight or branched alkyl group attached to oxygen (alkyl-O—). Exemplary alkoxy groups include, but are not limited to, alkoxy groups of 1-6 or 2-6 carbon atoms, referred to herein as $C_1$-$C_5$alkoxy, $C_1$-$C_6$alkoxy, and $C_2$-$C_6$alkoxy, respectively. Exemplary alkoxy groups include, but are not limited to methoxy, ethoxy, isopropoxy, etc.

The term "aryl" refers to a radical of a monocyclic or polycyclic (e.g., bicyclic or tricyclic) 4n+2 aromatic ring system (e.g., having 6, 10, or 14 p electrons shared in a cyclic array) having 6-14 ring carbon atoms and zero heteroatoms provided in the aromatic ring system ("$C_{6-14}$ aryl"). In some embodiments, an aryl group has six ring carbon atoms ("$C_6$ aryl"; e.g., phenyl). In some embodiments, an aryl group has ten ring carbon atoms ("$C_{10}$ aryl"; e.g., naphthyl such as 1-naphthyl and 2-naphthyl). In some embodiments, an aryl group has fourteen ring carbon atoms ("$C_{1-4}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, and trinaphthalene. Particularly aryl groups include phenyl, naphthyl, indenyl, and tetrahydronaphthyl. Examples of representative substituted aryls include the following

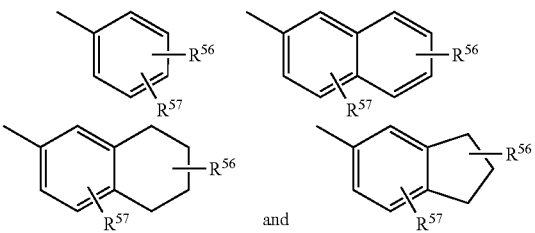

wherein one of $R^6$ and $R^7$ may be hydrogen and at least one of $R^{56}$ and $R^{57}$ is each independently selected from $C_1$-$C_8$ alkyl, $C_1$-$C_8$ haloalkyl, 4-10 membered heterocyclyl, alkanoyl, $C_1$-$C_8$ alkoxy, heteroaryloxy, alkylamino, arylamino, heteroarylamino, $NR^{58}COR^{59}$, $NR^{58}SOR^{59}NR^{58}SO_2R^{59}$, COOalkyl, COOaryl, $CONR^{58}R^{59}$, $CONR^{58}OR^{59}$, $NR^{38}R^{59}$, $SO_2NR^{58}R^{59}$, S-alkyl, SOalkyl, $SO_2$alkyl, Saryl, SOaryl, $SO_2$aryl; or $R^{56}$ and $R^{57}$ may be joined to form a cyclic ring (saturated or unsaturated) from 5 to 8 atoms, optionally containing one or more heteroatoms selected from the group N, O, or S. $R^{60}$ and $R^{61}$ are each independently hydrogen, $C_1$-$C_8$ alkyl, $C_1$-$C_4$haloalkyl, $C_3$-$C_{10}$ cycloalkyl, 4-10 membered heterocyclyl, $C_6$-$C_{10}$ aryl, substituted $C_6$-$C_{10}$ aryl, 5-10 membered heteroaryl, or substituted 5-10 membered heteroaryl.

The term "carbonyl" as used herein refers to the radical —C(O)—.

The term "cyano" as used herein refers to the radical —CN.

The terms "cycloalkyl" or a "carbocyclic group" as used herein refers to a saturated or partially unsaturated hydrocarbon group of, for example, 3-6, or 4-6 carbons, referred to herein as $C_3$-$C_{10}$cycloalkyl, $C_{3-6}$cycloalkyl or $C_{4-6}$cycloalkyl, respectively. Exemplary cycloalkyl groups include, but are not limited to, cyclohexyl, cyclopentyl, cyclopentenyl, cyclobutyl or cyclopropyl.

The terms "halo" or "halogen" as used herein refer to F, Cl, Br, or I.

The terms "haloalkyl" as used herein refers to an alkyl radical in which the alkyl group is substituted with one or more halogens. Typical haloalkyl groups include, but are not limited to, trifluoromethyl (i.e. $CF_3$), difluoromethyl, fluoromethyl, chloromethyl, dichloromethyl, dibromoethyl, tribromomethyl, tetrafluoroethyl, and the like. Exemplary haloalkyl groups include, but are not limited to, straight or branched hydrocarbons of 1-6, 1-4, or 1-3 carbon atoms substituted with a halogen (i.e. Cl, F, Br and I), referred to herein as $C_{1-6}$haloalkyl, $C_{1-4}$ haloalkyl, and $C_{1-3}$haloalkyl, respectively.

The term "hetero" when used to describe a compound or a group present on a compound means that one or more carbon atoms in the compound or group have been replaced by a nitrogen, oxygen, or sulfur heteroatom. Hetero may be applied to any of the hydrocarbyl groups described above such as alkyl, e.g., heteroalkyl, cycloalkyl, e.g., heterocyclyl, aryl, e.g., heteroaryl, cycloalkenyl, e.g., cycloheteroalkenyl, and the like having from 1 to 5, and particularly from 1 to 3 heteroatoms.

The terms "heteroaryl" or "heteroaromatic group" as used herein refers to an aromatic 5-10 membered ring system containing one or more heteroatoms, for example one to three heteroatoms, such as nitrogen, oxygen, and sulfur. The term may also be used to refer to a 5-7 membered monocyclic heteroaryl or an 8-10 membered bicyclic heteroaryl. Where possible, said heteroaryl ring may be linked to the adjacent radical though carbon or nitrogen. Examples of heteroaryl rings include but are not limited to furan, thiophene, pyrrole, pyrrolopyridine, indole, thiazole, oxazole, isothiazole, isoxazole, imidazole, benzoimidazole, imidazopyridine, pyrazole, triazole, pyridine or pyrimidine, etc.

The terms "heterocyclyl," "heterocycle," or "heterocyclic group" are art-recognized and refer to saturated or partially unsaturated 4-10 membered ring structures, whose ring structures include one to three heteroatoms, such as nitrogen, oxygen, and sulfur. Where possible, heterocyclyl rings may be linked to the adjacent radical through carbon or nitrogen. The term may also be used to refer to 4-10 membered saturated or partially unsaturated ring structures that are bridged, fused or spirocyclic ring structures, whose ring structures include one to three heteroatoms, such as nitrogen, oxygen, and sulfur. Examples of heterocyclyl groups include, but are not limited to, pyrrolidine, piperidine, morpholine, thiomorpholine, piperazine, oxetane, azetidine, tetrahydrofuran, dihydrofuran, dihydropyran, tetrahydropyran, etc. In some embodiments, the heterocycle is a spiro heterocycle (e.g., 2,8-diazaspiro[4.5]decane). In some embodiments, the heterocycle is a bridged heterocycle (e.g., octahydro-1H-4,7-methanoisoindole). "Spiro heterocyclyl," or "spiro heterocycle" refers to a polycyclic heterocyclyl with rings connected through one common atom (called a spiro atom), wherein the rings have one or more heteroatoms selected from the group consisting of N, O, and $S(O)_m$ (wherein m is an integer of 0 to 2) as ring atoms.

The terms "hydroxy" and "hydroxyl" as used herein refers to the radical —OH.

The term "oxo" as used herein refers to the radical =O.

"Pharmaceutically or pharmacologically acceptable" include molecular entities and compositions that do not produce an adverse, allergic or other untoward reaction when administered to an animal, or a human, as appropriate. For human administration, preparations should meet sterility, pyrogenicity, and general safety and purity standards as required by FDA Office of Biologics standards.

The term "pharmaceutically acceptable carrier" or "pharmaceutically acceptable excipient" as used herein refers to any and all solvents, dispersion media, coatings, isotonic and absorption delaying agents, and the like, that are compatible with pharmaceutical administration. The use of such media and agents for pharmaceutically active substances is well known in the art. The compositions may also contain other active compounds providing supplemental, additional, or enhanced therapeutic functions.

The term "pharmaceutical composition" as used herein refers to a composition comprising at least one compound as disclosed herein formulated together with one or more pharmaceutically acceptable carriers.

"Individual," "patient," or "subject" are used interchangeably and include any animal, including mammals, preferably mice, rats, other rodents, rabbits, dogs, cats, swine, cattle, sheep, horses, or primates, and most preferably humans. The compounds of the disclosure can be administered to a mammal, such as a human, but can also be administered to other mammals such as an animal in need of veterinary treatment, e.g., domestic animals (e.g., dogs, cats, and the like), farm animals (e.g., cows, sheep, pigs, horses, and the like) and laboratory animals (e.g., rats, mice, guinea pigs, and the like). "Modulation" includes antagonism (e.g., inhibition), inverse agonism, agonism, biased agonism, biased signal transduction, functionally selective agonism, partial antagonism and/or partial agonism.

In the present specification, the term "therapeutically effective amount" means the amount of the subject compound that will elicit the biological or medical response of a tissue, system or animal, (e.g. mammal or human) that is being sought by the researcher, veterinarian, medical doctor or other clinician. The compounds of the disclosure are administered in therapeutically effective amounts to treat a disease. Alternatively, a therapeutically effective amount of a compound is the quantity required to achieve a desired therapeutic and/or prophylactic effect.

The term "pharmaceutically acceptable salt(s)" as used herein refers to salts of acidic or basic groups that may be present in compounds used in the compositions. Compounds included in the present compositions that are basic in nature are capable of forming a wide variety of salts with various inorganic and organic acids. The acids that may be used to prepare pharmaceutically acceptable acid addition salts of such basic compounds are those that form non-toxic acid addition salts, i.e., salts containing pharmacologically acceptable anions, including, but not limited to, malate, oxalate, chloride, bromide, iodide, nitrate, sulfate, bisulfate, phosphate, acid phosphate, isonicotinate, acetate, lactate, salicylate, citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate and pamoate (i.e., 1,1'-methylene-bis-(2-hydroxy-3-naphthoate)) salts. Compounds included in the present compositions that are acidic in nature are capable of forming base salts with various pharmacologically acceptable cations. Examples of such salts include alkali metal or alkaline earth metal salts, particularly calcium, magnesium, sodium, lithium, zinc, potassium, and iron salts. Compounds included in the present compositions that include a basic or acidic moiety may also form pharmaceutically acceptable salts with various amino acids. The compounds of the disclosure may contain both acidic and basic groups; for example, one amino and one carboxylic acid group. In such a case, the compound can exist as an acid addition salt, a zwitterion, or a base salt.

The compounds of the disclosure may contain one or more chiral centers and, therefore, exist as stereoisomers. The term "stereoisomers" when used herein consist of all enantiomers or diastereomers. These compounds may be designated by the symbols "(+)," "(−)," "R" or "S," depending on the configuration of substituents around the stereogenic carbon atom, but the skilled artisan will recognize that a structure may denote a chiral center implicitly. The present disclosure encompasses various stereoisomers of these compounds and mixtures thereof. Mixtures of enantiomers or diastereomers may be designated "(f)" in nomenclature, but the skilled artisan will recognize that a structure may denote a chiral center implicitly.

The compounds of the disclosure may contain one or more double bonds and, therefore, exist as geometric isomers resulting from the arrangement of substituents around a carbon-carbon double bond. The symbol --- denotes a bond that may be a single, double or triple bond as described herein. Substituents around a carbon-carbon double bond are designated as being in the "Z" or "E" configuration wherein the terms "Z" and "E" are used in accordance with IUPAC standards. Unless otherwise specified, structures depicting double bonds encompass both the "E" and "Z" isomers. Substituents around a carbon-carbon double bond alternatively can be referred to as "cis" or "trans," where "cis" represents substituents on the same side of the double bond and "trans" represents substituents on opposite sides of the double bond.

Compounds of the disclosure may contain a carbocyclic or heterocyclic ring and therefore, exist as geometric isomers resulting from the arrangement of substituents around the ring. The arrangement of substituents around a carbocyclic or heterocyclic ring are designated as being in the "Z" or "E" configuration wherein the terms "Z" and "E" are used in accordance with IUPAC standards. Unless otherwise specified, structures depicting carbocyclic or heterocyclic rings encompass both "Z" and "E" isomers. Substituents around a carbocyclic or heterocyclic rings may also be referred to as "cis" or "trans", where the term "cis" represents substituents on the same side of the plane of the ring and the term "trans" represents substituents on opposite sides of the plane of the ring. Mixtures of compounds wherein the substituents are disposed on both the same and opposite sides of plane of the ring are designated "cis/trans."

Individual enantiomers and diastereomers of compounds of the present disclosure can be prepared synthetically from commercially available starting materials that contain asymmetric or stereogenic centers, or by preparation of racemic mixtures followed by resolution methods well known to those of ordinary skill in the art. These methods of resolution are exemplified by (1) attachment of a mixture of enantiomers to a chiral auxiliary, separation of the resulting mixture of diastereomers by recrystallization or chromatography and liberation of the optically pure product from the auxiliary, (2) salt formation employing an optically active resolving agent, (3) direct separation of the mixture of optical enantiomers on chiral liquid chromatographic columns or (4) kinetic resolution using stereoselective chemical or enzymatic reagents. Racemic mixtures can also be resolved into their component enantiomers by well known methods, such as chiral-phase liquid chromatography or crystallizing the compound in a chiral solvent. Stereoselective syntheses, a chemical or enzymatic reaction in which a single reactant forms an unequal mixture of stereoisomers during the creation of a new stereocenter or during the transformation of a pre-existing one, are well known in the art. Stereoselective syntheses encompass both enantio- and diastereoselective transformations, and may involve the use of chiral auxiliaries. For examples, see Carreira and Kvaemo, *Classics in Stereoselective Synthesis*, Wiley-VCH: Weinheim, 2009.

The compounds disclosed herein can exist in solvated as well as unsolvated forms with pharmaceutically acceptable solvents such as water, ethanol, and the like, and it is intended that the disclosure embrace both solvated and unsolvated forms. In one embodiment, the compound is amorphous. In one embodiment, the compound is a single polymorph. In another embodiment, the compound is a mixture of polymorphs. In another embodiment, the compound is in a crystalline form.

The disclosure also embraces isotopically labeled compounds of the disclosure which are identical to those recited herein, except that one or more atoms are replaced by an atom having an atomic mass or mass number different from the atomic mass or mass number usually found in nature. Examples of isotopes that can be incorporated into compounds of the disclosure include isotopes of hydrogen, carbon, nitrogen, oxygen, phosphorus, sulfur, fluorine and chlorine, such as $^2$, $^3$H, $^{13}$C, $^{14}$C, $^{15}$N, $^{18}$O, $^{17}$, $^{31}$P, $^{32}$P, $^{35}$S, $^{18}$F, and $^{36}$Cl, respectively. For example, a compound of the disclosure may have one or more H atom replaced with deuterium.

Certain isotopically-labeled disclosed compounds (e.g., those labeled with $^3$H and $^{14}$C) are useful in compound and/or substrate tissue distribution assays. Tritiated (i.e., $^3$H) and carbon-14 (i.e., $^{14}$C) isotopes are particularly preferred for their ease of preparation and detectability. Further, substitution with heavier isotopes such as deuterium (i.e., 2H) may afford certain therapeutic advantages resulting from greater metabolic stability (e.g., increased in vivo half-life or reduced dosage requirements) and hence may be preferred in some circumstances. Isotopically labeled compounds of the disclosure can generally be prepared by following procedures analogous to those disclosed in the examples herein by substituting an isotopically labeled reagent for a non-isotopically labeled reagent.

The term "prodrug" refers to compounds that are transformed in vivo to yield a disclosed compound or a pharmaceutically acceptable salt, hydrate or solvate of the compound. The transformation may occur by various mechanisms (such as by esterase, amidase, phosphatase, oxidative and or reductive metabolism) in various locations (such as in the intestinal lumen or upon transit of the intestine, blood or liver). Prodrugs are well known in the art (for example, see Rautio, Kumpulainen, et al, Nature Reviews Drug Discovery 2008, 7, 255). For example, if a compound of the disclosure or a pharmaceutically acceptable salt, hydrate or solvate of the compound contains a carboxylic acid functional group, a prodrug can comprise an ester formed by the replacement of the hydrogen atom of the acid group with a group such as ($C_{1-8}$)alkyl, ($C_{2-12}$)alkylcarbonyloxymethyl, 1-(alkylcarbonyloxy)ethyl having from 4 to 9 carbon atoms, 1-methyl-1-(alkylcarbonyloxy)-ethyl having from 5 to 10 carbon atoms, alkoxycarbonyloxymethyl having from 3 to 6 carbon atoms, 1-(alkoxycarbonyloxy)ethyl having from 4 to 7 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl)amino)ethyl having from 4 to 10 carbon atoms, 3-phthalidyl, 4-crotonolactonyl, gamma-butyrolacton-4-yl, di-N,N—($C_{1-2}$)alkylamino($C_{2-3}$)alkyl (such as β-dimethylaminoethyl), carbamoyl-($C_{1-2}$)alkyl, N,N-di($C_{1-2}$)alkylcarbamoyl-($C_{1-2}$)alkyl and piperidino-, pyrrolidino- or morpholino($C_{2-3}$)alkyl.

Similarly, if a compound of the disclosure contains an alcohol functional group, a prodrug can be formed by the replacement of the hydrogen atom of the alcohol group with a group such as ($C_{1-6}$)alkylcarbonyloxymethyl, 1-(($C_{1-6}$)alkylcarbonyloxy)ethyl, 1-methyl-1-(($C_{1-6}$)alkylcarbonyloxy)ethyl ($C_{1-6}$)alkoxycarbonyloxymethyl, N—($C_{1-6}$)alkoxycarbonylaminomethyl, succinoyl, ($C_{1-6}$)alkylcarbonyl, α-amino($C_{1-4}$)alkylcarbonyl, arylalkylcarbonyl and α-aminoalkylcarbonyl, or α-aminoalkylcarbonyl-α-aminoalkylcarbonyl, where each □-aminoalkylcarbonyl group is independently selected from the naturally occurring L-amino acids, P(O)(OH)$_2$, —P(OXO (C$_{1-6}$alkyl)$_2$ or glycosyl (the radical resulting from the removal of a hydroxyl group of the hemiacetal form of a carbohydrate).

If a compound of the disclosure incorporates an amine functional group, a prodrug can be formed, for example, by creation of an amide or carbamate, an N-alkylcarbonyloxyalkyl derivative, an (oxodioxolenyl)methyl derivative, an N-Mannich base, imine or enamine. In addition, a secondary amine can be metabolically cleaved to generate a bioactive primary amine, or a tertiary amine can metabolically cleaved to generate a bioactive primary or secondary amine. For examples, see Simplicio, et al., *Molecules* 2008, 13, 519 and references therein.

I. Compounds

The disclosure is directed to, in part, to compounds that are agonists of the 5-hydroxytryptamine 2A (5-HT2A) receptor. In some embodiments, the agonists of the disclosure exhibit selective binding to the 5-HT2A receptor over the 5-HTB and/or 5-HT2C receptor. In certain embodiments, compounds of the disclosure can be used to treat a variety of neurological diseases and disorders including, but not limited to, depression, anxiety, substance abuse, migraine headaches, and/or cluster headaches.

For example, disclosed herein is a compound represented by Formula I:

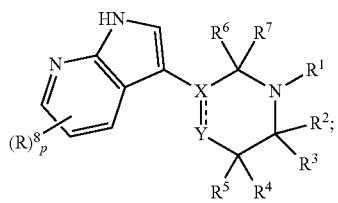

(I)

or a pharmaceutically acceptable salt and/or a stereoisomer thereof, wherein

⟋ is a double bond; X is C; and Y is CH; or
⟋ is a single bond; X is CR$^X$; Y is CHR$^Y$; and R$^X$ and R$^Y$ together form —CH$_2$—;
R$^1$ is selected from the group consisting of hydrogen and C$_1$-C$_6$alkyl; wherein R$^1$ may optionally be substituted on an available carbon by one or more halogens or by C$_1$-C$_3$alkoxy;
R$^2$ and R$^3$ are each hydrogen or each C$_1$-C$_6$alkyl;
R$^4$ is selected from the group consisting of hydrogen and C$_1$-C$_6$alkyl; wherein R$^4$ may optionally be substituted on an available carbon by one or more halogens;
R$^5$ is selected from the group consisting of hydrogen, halogen, cyano, C$_1$-C$_6$alkyl, and C$_1$-C$_6$alkoxy; wherein R$^5$ may optionally be substituted on an available carbon by one or more halogens; or
R$^4$ and R$^5$, together with the carbon to which they are attached, may be joined together to form C$_3$-C$_6$cycloalkyl or 3-6 membered heterocyclyl;
R$^6$ and R$^7$ are each hydrogen or each C$_1$-C$_6$alkyl; or
R$^6$ and R$^7$, together with the carbon to which they are attached, may be joined together to form C$_3$-C$_6$cycloalkyl or 3-6 membered heterocyclyl; or
R$^6$ and R$^5$ may be joined together to form —CH$_2$— or —CH$_2$—CH$_2$—; or
R$^6$ and R$^3$ may be joined together to form —CH$_2$— or —CH$_2$—CH$_2$—;

R$^8$ is selected from the group consisting of hydrogen, halogen, hydroxyl, C$_1$-C$_3$alkyl and C$_1$-C$_3$alkoxy; wherein C$_1$-C$_6$alkyl and C$_1$-C$_3$alkoxy; may optionally be substituted by one or more halogens; and
p is 0, 1, 2 or 3;
wherein:
at least one of R$^1$, R$^4$ and R$^5$ is C$_1$-C$_6$alkyl substituted by one or more halogens; or
R$^2$ and R$^3$ are each C$_1$-C$_6$alkyl; or
R$^4$ and R$^5$ are each C$_1$-C$_6$alkyl or each halogen; or
R$^6$ and R$^7$ are each C$_1$-C$_6$alkyl.

For example, disclosed herein is a compound represented by Formula I-L:

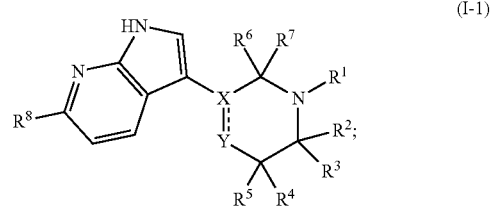

(I-1)

or a pharmaceutically acceptable salt and/or a stereoisomer thereof, wherein

⟋ is a double bond; X is C; and Y is CH; or
⟋ is a single bond; X is CR$^X$; Y is CHR$^Y$; and R$^X$ and R$^Y$ together form —CH$_2$—;
R$^1$ is selected from the group consisting of hydrogen and C$_1$-C$_6$alkyl; wherein R$^1$ may optionally be substituted on an available carbon by one or more halogens or by C$_1$-C$_3$alkoxy;
R$^2$ and R$^3$ are each hydrogen or each C$_1$-C$_6$alkyl;
R$^4$ is selected from the group consisting of hydrogen and C$_1$-C$_6$alkyl; wherein R$^4$ may optionally be substituted on an available carbon by one or more halogens;
R$^5$ is selected from the group consisting of hydrogen, halogen, cyano, C$_1$-C$_6$alkyl, and C$_1$-C$_6$alkoxy; wherein R$^5$ may optionally be substituted on an available carbon by one or more halogens; or
R$^4$ and R$^5$, together with the carbon to which they are attached, may be joined together to form C$_3$-C$_6$cycloalkyl or 3-6 membered heterocyclyl;
R$^6$ and R$^7$ are each hydrogen or each C$_1$-C$_6$alkyl; or
R$^6$ and R$^7$, together with the carbon to which they are attached, may be joined together to form C$_3$-C$_6$cycloalkyl or 3-6 membered heterocyclyl; or
R$^6$ and R$^5$ may be joined together to form —CH$_2$— or —CH$_2$—CH$_2$—; or
R$^6$ and R$^3$ may be joined together to form —CH$_2$— or —CH$_2$—CH$_2$—; and
R$^8$ is selected from the group consisting of hydrogen, halogen, hydroxyl, C$_1$-C$_3$alkyl and C$_1$-C$_3$alkoxy; wherein C$_1$-C$_6$alkyl and C$_1$-C$_3$alkoxy; may optionally be substituted by one or more halogens;
wherein:
at least one of R$^1$, R$^4$ and R$^5$ is C$_1$-C$_6$alkyl substituted by one or more halogens; or
R$^2$ and R$^3$ are each C$_1$-C$_6$alkyl; or
R$^4$ and R$^5$ are each C$_1$-C$_6$alkyl or each halogen; or
R$^6$ and R$^7$ are each C$_1$-C$_6$alkyl.

In some embodiments, a disclosed compound is represented by:

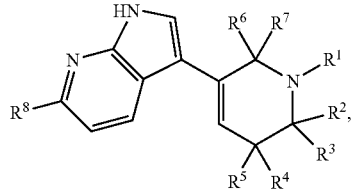
(IA)

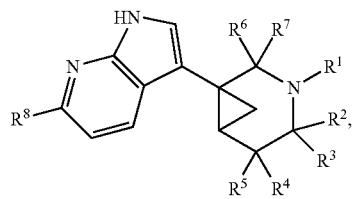
(IB)

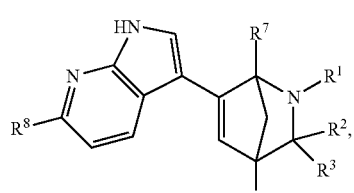
(IC)

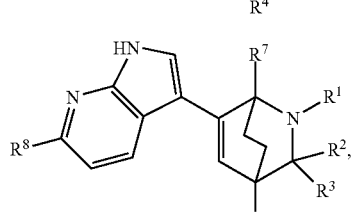
(ID)

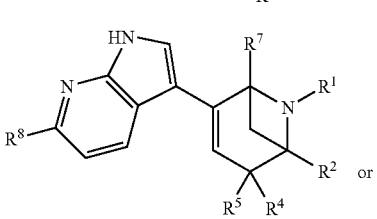
(IE)

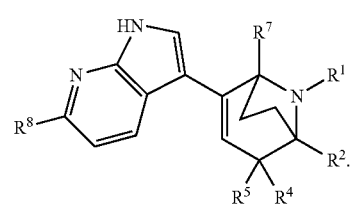
(IF)

For example, in some embodiments, a disclosed compound is represented by:

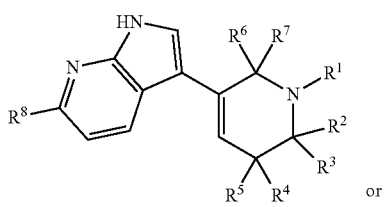
(IA)

or

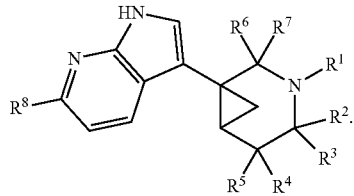
(IB)

In other embodiments, a disclosed compound is represented by:

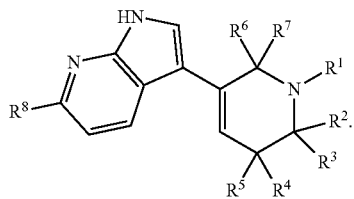
(IA)

In certain embodiments, at least one of $R^1$, $R^4$ and $R^5$ is $C_1$-$C_6$alkyl substituted on an available carbon by one or more fluoro atoms. For example, in some embodiments at least one of $R^1$, $R^4$ and $R^5$ is selected from the group consisting of —$CH_3$, —$CH_2CH_3$, —$CH(CH_3)_2$, and —$CH_2CH_2CH_3$ substituted by one or more fluoro groups. In other embodiments, at least one of R1, R4 and R5 is selected from the group consisting of —$CHF_2$—$CF_3$, —$CF_2CH_3$, —$CH_2CF_3$, —$CF_2CF_3$, —$CF_2CH_2CH_3$, —$CH_2CF_2CH_3$, —$CH_2CH_2CF_3$, —$CF_2CF_2CH_3$, —$CH_2CF_2CF_3$—$CF_2CH_2CF_3$, —$CF_2CF_2CF_3$, and —$CH(CH_3)(CHF_2)$.

In some embodiments, $R^1$ is selected from the group consisting of hydrogen, —$CH_3$, —$CF_3$, and —$CH_2OCH_3$. In other embodiments, $R^2$ and $R^3$ are each unsubstituted $C_1$-$C_6$alkyl. For example, in certain embodiments $R^2$ and $R^3$ are each —$CH_3$.

In further embodiments, $R^4$ and $R^5$ are each unsubstituted $C_1$-$C_6$alkyl. For example, in some embodiments $R^4$ and $R^5$ are each —$CH_3$. In other embodiments, $R^4$ and $R^5$ are each fluoro. In still other embodiments, $R^4$ is hydrogen and $R^5$ is selected from the group consisting of hydrogen, fluoro, cyano, —$CH_3$ and —$OCH_3$.

In certain embodiments, $R^6$ and $R^7$ are each unsubstituted $C_1$-$C_6$alkyl. For example, in some embodiments $R^6$ and $R^7$ are each —$CH_3$. In other embodiments, $R^8$ is selected from the group consisting of hydrogen, fluoro, chloro, —$CH_3$, —$CF_3$, —$OCH_3$, and —$OCF_3$. For example, in certain embodiments $R^8$ is hydrogen or fluoro.

In some embodiments, p is 0. In some embodiments, p is 1. In some embodiments, p is 2. In some embodiments, p is 3. In some embodiments, p is 0 or 1. In some embodiments, p is 0, 1 or 2.

Also disclosed herein is a compound represented by Formula IG:

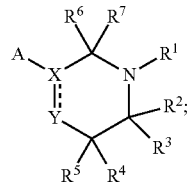
(IG)

or a pharmaceutically acceptable salt and/or a stereoisomer thereof, wherein
- A is an 8-10 membered fused bicyclic heteroaromatic ring containing at least one ring nitrogen; wherein A is bound to X through an available carbon atom; wherein ring A may be substituted on one or more available carbon atoms by R;
- ⫽ is a double bond; X is C; and Y is CH; or
- ⫽ is a single bond; X is CR$^X$; Y is CHR$^Y$; and R$^X$ and R$^Y$ together form —CH$_2$—;
- R$^1$ is selected from the group consisting of hydrogen and C$_1$-C$_6$alkyl; wherein R$^1$ may optionally be substituted on an available carbon by one or more halogens or by C$_1$-C$_3$alkoxy;
- R$^2$ and R$^3$ are each hydrogen or each C$_1$-C$_6$alkyl;
- R$^4$ is selected from the group consisting of hydrogen and C$_1$-C$_6$alkyl; wherein R$^4$ may optionally be substituted on an available carbon by one or more halogens;
- R$^5$ is selected from the group consisting of hydrogen, halogen, cyano, C$_1$-C$_6$alkyl, and C$_1$-C$_6$alkoxy; wherein R$^5$ may optionally be substituted on an available carbon by one or more halogens;
- R$^6$ and R$^7$ are each hydrogen or each C$_1$-C$_6$alkyl; and
- R$^8$ is selected from the group consisting of hydrogen, halogen, hydroxyl, C$_1$-C$_3$alkyl and C$_1$-C$_3$alkoxy; wherein C$_1$-C$_6$alkyl and C$_1$-C$_3$alkoxy; may optionally be substituted by one or more halogens.

In some embodiments, ring A is a 5:5 fused bicyclic heteroaryl. In other embodiments, ring A is a 5:6 fused bicyclic heteroaryl. In certain embodiments, ring A is a 6:6 fused bicyclic heteroaryl. For example, in some embodiments, ring A may be represented by:

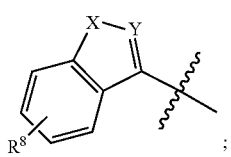
(A1)

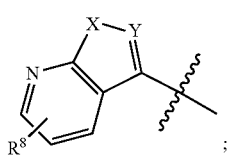
(A2)

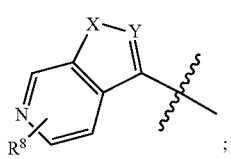
(A3)

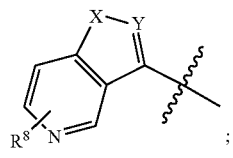
(A4)

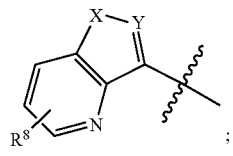
(A5)

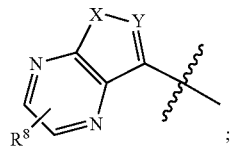
(A6)

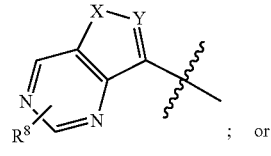
(A7)

; or

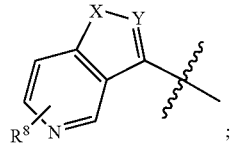
(A8)

wherein X is O, S or NR$^X$; Y is N or C(R$^Y$); R$^X$ hydrogen or C$_1$-C$_3$alkyl; and R$^Y$ is hydrogen or C$_1$-C$_3$alkyl.

In some embodiments, ring A may be represented, for example, by:

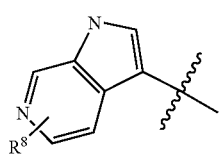
(A9)

or

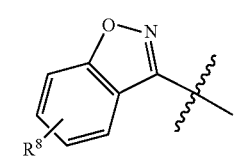
(A10)

In certain embodiments, at least one of R$^1$, R$^4$ and R$^5$ is C$_1$-C$_6$alkyl substituted by one or more halogens. In other embodiments, R$^2$ and R$^3$ are each C$_1$-C$_6$alkyl. In still other embodiments, R$^4$ and R$^5$ are each C$_1$-C$_6$alkyl or each halogen. In further embodiments, R$^6$ and R$^7$ are each C$_1$-C$_6$alkyl.

In some embodiments, a compound disclosed herein may be represented by:

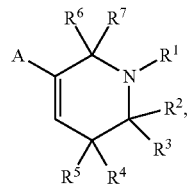
(IH)

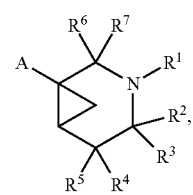
(II)

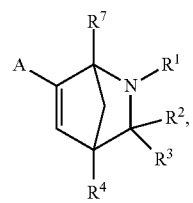
(IJ)

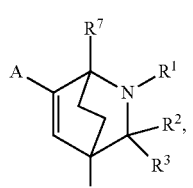
(IK)

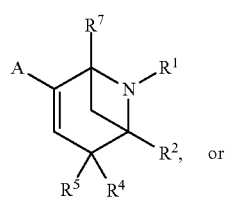
(IL) or

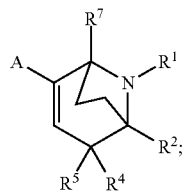
(IM)

wherein A, $R^1$, $R^2$, $R^3$, $R^4$, $R^5$, $R^6$ and $R^7$ are as defined herein.

In some embodiments, a compound disclosed herein may be represented by:

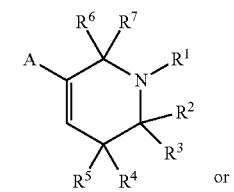
(IH)

or

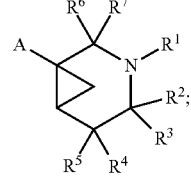
(II)

wherein A, $R^1$, $R^2$, $R^3$, $R^4$, $R^5$, $R^6$ and $R^7$ are as defined herein.

For example, in some embodiments, a compound disclosed herein may be represented by:

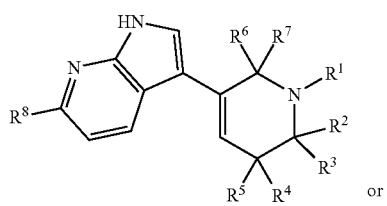
(IN)

or

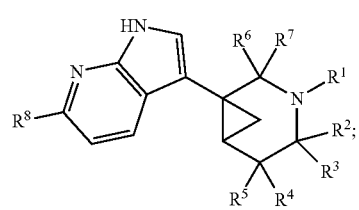
(IO)

wherein $R^1$, $R^2$, $R^3$, $R^4$, $R^5$, $R^6$, $R^7$ and $R^8$ are as defined herein.

For example, a compound disclosed herein may be represented by:

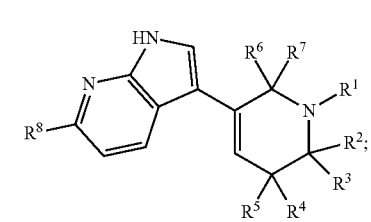
(IN)

wherein $R^1$, $R^2$, $R^3$, $R^4$, $R^5$, $R^6$, $R^7$ and $R^8$ are as defined herein.

In other embodiments, a compound disclosed herein may be represented by:

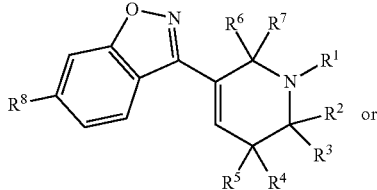

(IP)

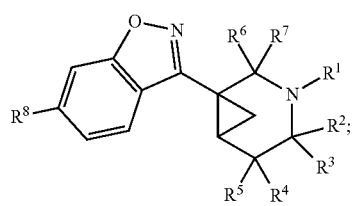

(IQ)

wherein $R^1$, $R^2$, $R^3$, $R^4$, $R^5$, $R^6$, $R^7$ and $R^8$ are as defined herein.

For example, a compound disclosed herein may be represented by:

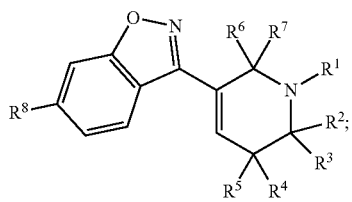

(IP)

wherein $R^1$, $R^2$, $R^3$, $R^4$, $R^5$, $R^6$, $R^7$ and $R^8$ are as defined herein.

In certain embodiments, at least one of $R^1$, $R^4$ and $R^5$ is $C_1$-$C_6$alkyl substituted on an available carbon by one or more fluoro atoms. For example, in some embodiments at least one of $R^1$, $R^4$ and $R^5$ is selected from the group consisting of —$CH_3$, —$CH_2CH_3$, —$CH(CH_3)_2$, and —$CH_2CH_2CH_3$ substituted by one or more fluoro groups. In other embodiments, at least one of R1, R4 and R5 is selected from the group consisting of —$CHF_2$, —$CF_3$, —$CF_2CH_3$, —$CH_2CF_3$, —$CF_2CF_3$, —$CF_2CH_2CH_3$, —$CH_2CF_2CH_3$, —$CH_2CH_2CF_3$, —$CF_2CF_2CH_3$, —$CH_2CF_2CF_3$—$CF_2CH_2CF_3$, —$CF_2CF_2CF_3$, and —$CH(CH_3)(CHF_2)$.

In some embodiments, $R^1$ is selected from the group consisting of hydrogen, —$CH_3$, —$CF_3$, and —$CH_2OCH_3$. In other embodiments, $R^2$ and $R^3$ are each unsubstituted $C_1$-$C_6$alkyl. For example, in certain embodiments $R^2$ and $R^3$ are each —$CH_3$.

In further embodiments, $R^4$ and $R^5$ are each unsubstituted $C_1$-$C_6$alkyl. For example, in some embodiments $R^4$ and $R^5$ are each —$CH_3$. In other embodiments, $R^4$ and $R^5$ are each fluoro. In still other embodiments, $R^4$ is hydrogen and $R^5$ is selected from the group consisting of hydrogen, fluoro, cyano, —$CH_3$ and —$OCH_3$.

In certain embodiments, $R^6$ and $R^7$ are each unsubstituted $C_1$-$C_6$alkyl. For example, in some embodiments $R^6$ and $R^7$ are each —$CH_3$. In other embodiments, $R^8$ is selected from the group consisting of hydrogen, fluoro, chloro, —$CH_3$, —$CF_3$, —$OCH_3$, and —$OCF_3$.

In some embodiments, X is O. In some embodiments, X is S. In other embodiments, X is NH. In other embodiments, at least one of $R^1$, $R^4$, and $R^5$ is $C_1$-$C_6$alkyl. In still other embodiments, at least two of $R^1$, $R^4$, and $R^5$ are each $C_1$-$C_6$alkyl. For example, in some embodiments at least two of $R^1$, $R^4$, and $R^5$ are each —$CH_3$. In certain embodiments, for example, $R^4$ and $R^5$ are each —$CH_3$. In some embodiments, $R^1$, $R^4$, and $R^5$ are each hydrogen.

Also disclosed herein is a compound represented by Formula II-1:

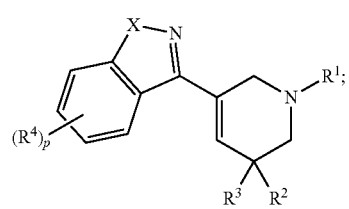

(II-1)

or a pharmaceutically acceptable salt and/or a stereoisomer thereof, wherein

X is O or S;

$R^1$ is selected from the group consisting of hydrogen and $C_1$-$C_6$alkyl;

$R^2$ is selected from the group consisting of hydrogen and $C_1$-$C_6$alkyl;

$R^3$ is selected from the group consisting of hydrogen and $C_1$-$C_6$alkyl;

$R^4$ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens; and p is 0, 1, 2, or 3.

In some embodiments, X is O. In some embodiments, X is S. In other embodiments, at least one of $R^1$, $R^2$, and $R^3$ is $C_1$-$C_6$alkyl. In still other embodiments, at least two of $R^1$, $R^2$, and $R^3$ are each $C_1$-$C_6$alkyl. For example, in some embodiments at least two of $R^1$, $R^2$, and $R^3$ are each —$CH_3$. In certain embodiments, for example, $R^2$ and $R^3$ are each —$CH_3$. In some embodiments, $R^1$, $R^2$, and $R^3$ are each hydrogen. In further embodiments, $R^4$ is selected from the group consisting of hydrogen, fluoro, chloro, —$CH_3$, —$CF_3$, —$OCH_3$, and —$OCF_3$. In some embodiments, p is 0. In some embodiments, p is 1. In some embodiments, p is 2. In some embodiments, p is 3. In some embodiments, p is 0 or 1. In some embodiments, p is 0, 1 or 2.

Also disclosed herein is a compound represented by Formula II:

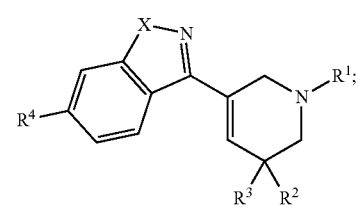

(II)

or a pharmaceutically acceptable salt and/or a stereoisomer thereof, wherein

X is O or S;
R¹ is selected from the group consisting of hydrogen and $C_1$-$C_6$alkyl;
R² is selected from the group consisting of hydrogen and $C_1$-$C_6$alkyl;
R³ is selected from the group consisting of hydrogen and $C_1$-$C_6$alkyl; and
R⁴ is selected from the group consisting of hydrogen, halogen, hydroxyl, $C_1$-$C_3$alkyl and $C_1$-$C_3$alkoxy; wherein $C_1$-$C_3$alkyl and $C_1$-$C_3$alkoxy; may optionally be substituted by one or more halogens.

In some embodiments, X is O. In some embodiments, X is S. In other embodiments, at least one of R¹, R², and R³ is $C_1$-$C_6$alkyl. In still other embodiments, at least two of R¹, R², and R³ are each $C_1$-$C_6$alkyl. For example, in some embodiments at least two of R¹, R², and R³ are each —CH₃. In certain embodiments, for example, R² and R³ are each —CH₃. In some embodiments, R¹, R², and R³ are each hydrogen. In further embodiments, R⁴ is selected from the group consisting of hydrogen, fluoro, chloro, —CH₃, —CF₃, —OCH₃, and —OCF₃.

Further disclosed herein is a compound represented by Formula IIA-1:

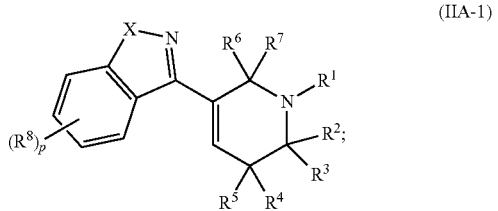

(IIA-1)

or a pharmaceutically acceptable salt and/or a stereoisomer thereof, wherein

X is O or S;
R¹ is selected from the group consisting of hydrogen and $C_1$-$C_6$alkyl; wherein R¹ may optionally be substituted on an available carbon by one or more halogens or by $C_1$-$C_3$alkoxy;
R² and R³ are each hydrogen or each $C_1$-$C_6$alkyl;
R⁴ is selected from the group consisting of hydrogen and $C_1$-$C_6$alkyl; wherein R⁴ may optionally be substituted on an available carbon by one or more halogens;
R⁵ is selected from the group consisting of hydrogen, halogen, cyano, $C_1$-$C_6$alkyl, and $C_1$-$C_6$alkoxy; wherein R⁵ may optionally be substituted on an available carbon by one or more halogens;
R⁶ and R⁷ are each hydrogen or each $C_1$-$C_6$alkyl;
R⁸ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens; and
p is 0, 1, 2, or 3.

In some embodiments, X is O. In some embodiments, X is S. In other embodiments, at least one of R¹, R², and R³ is $C_1$-$C_6$alkyl. In still other embodiments, at least two of R¹, R², and R³ are each $C_1$-$C_6$alkyl. For example, in some embodiments at least two of R¹, R², and R³ are each —CH₃. In certain embodiments, for example, R² and R³ are each —CH₃. In some embodiments, R¹, R², and R³ are each hydrogen. In further embodiments, R⁴ is selected from the group consisting of hydrogen, fluoro, chloro, —CH₃, —CF₃, —OCH₃, and —OCF₃. In some embodiments, p is 0. In some embodiments, p is 1. In some embodiments, p is 2. In some embodiments, p is 3. In some embodiments, p is 0 or 1. In some embodiments, p is 0, 1 or 2.

Further disclosed herein is a compound represented by Formula IIA:

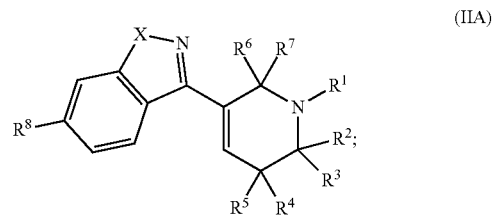

(IIA)

or a pharmaceutically acceptable salt and/or a stereoisomer thereof, wherein

X is O or S;
R¹ is selected from the group consisting of hydrogen and $C_1$-$C_6$alkyl; wherein R¹ may optionally be substituted on an available carbon by one or more halogens or by $C_1$-$C_3$alkoxy;
R² and R³ are each hydrogen or each $C_1$-$C_6$alkyl;
R⁴ is selected from the group consisting of hydrogen and $C_1$-$C_6$alkyl; wherein R⁴ may optionally be substituted on an available carbon by one or more halogens;
R⁵ is selected from the group consisting of hydrogen, halogen, cyano, $C_1$-$C_6$alkyl, and $C_1$-$C_6$alkoxy; wherein R⁵ may optionally be substituted on an available carbon by one or more halogens;
R⁶ and R⁷ are each hydrogen or each $C_1$-$C_6$alkyl; and
R⁸ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens.

In some embodiments, X is O. In some embodiments, X is S. In other embodiments, at least one of R¹, R², and R³ is $C_1$-$C_6$alkyl. In still other embodiments, at least two of R¹, R², and R³ are each $C_1$-$C_6$alkyl. For example, in some embodiments at least two of R¹, R², and R³ are each —CH₃. In certain embodiments, for example, R² and R³ are each —CH₃. In some embodiments, R¹, R², and R³ are each hydrogen. In further embodiments, R⁴ is selected from the group consisting of hydrogen, fluoro, chloro, —CH₃, —CF₃, —OCH₃, and —OCF₃.

Also disclosed herein is a compound represented by Formula IIB-1:

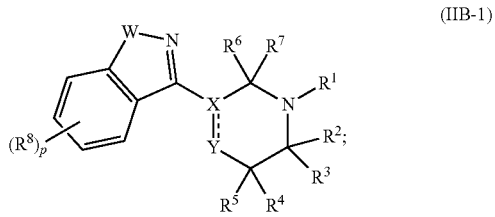

(IIB-1)

or a pharmaceutically acceptable salt and/or a stereoisomer thereof, wherein

W is O or S;
⫽ is a double bond; X is C; and Y is CH; or
⫽ is a single bond; X is CR$^X$; Y is CHR$^Y$; and R$^X$ and R$^Y$ together form —CH₂—;

R¹ is selected from the group consisting of hydrogen and $C_1$-$C_6$alkyl; wherein R¹ may optionally be substituted on an available carbon by one or more halogens or by $C_1$-$C_3$alkoxy;

R² and R³ are each hydrogen or each $C_1$-$C_6$alkyl;

R⁴ is selected from the group consisting of hydrogen and $C_1$-$C_6$alkyl; wherein R⁴ may optionally be substituted on an available carbon by one or more halogens;

R⁵ is selected from the group consisting of hydrogen, halogen, cyano, $C_1$-$C_6$alkyl, and $C_1$-$C_6$alkoxy; wherein R⁵ may optionally be substituted on an available carbon by one or more halogens; or R⁴ and R⁵, together with the carbon to which they are attached, may be joined together to form $C_3$-$C_6$cycloalkyl or 3-6 membered heterocyclyl;

R⁶ and R⁷ are each hydrogen or each $C_1$-$C_6$alkyl; or

R⁶ and R⁵ may be joined together to form —$CH_2$— or —$CH_2$—$CH_2$—; or

R⁶ and R³ may be joined together to form —$CH_2$— or —$CH_2$—$CH_2$—; and

R⁸ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens; and p is 0, 1, 2, or 3.

In some embodiments, p is 0. In some embodiments, p is 1. In some embodiments, p is 2. In some embodiments, p is 3. In some embodiments, p is 0 or 1. In some embodiments, p is 0, 1 or 2.

Also disclosed herein is a compound represented by Formula IIB:

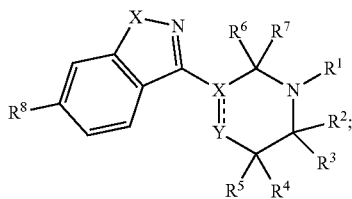

(IIB)

or a pharmaceutically acceptable salt and/or a stereoisomer thereof, wherein

W is O or S;

⚟ is a double bond; X is C; and Y is CH; or

⚟ is a single bond; X is $CR^X$; Y is $CHR^Y$; and $R^X$ and $R^Y$ together form —$CH_2$—;

R¹ is selected from the group consisting of hydrogen and $C_1$-$C_6$alkyl; wherein R¹ may optionally be substituted on an available carbon by one or more halogens or by $C_1$-$C_3$alkoxy;

R² and R³ are each hydrogen or each $C_1$-$C_6$alkyl;

R⁴ is selected from the group consisting of hydrogen and $C_1$-$C_6$alkyl; wherein R⁴ may optionally be substituted on an available carbon by one or more halogens;

R⁵ is selected from the group consisting of hydrogen, halogen, cyano, $C_1$-$C_6$alkyl, and $C_1$-$C_6$alkoxy; wherein R⁵ may optionally be substituted on an available carbon by one or more halogens; or R⁴ and R⁵, together with the carbon to which they are attached, may be joined together to form $C_3$-$C_6$cycloalkyl or 3-6 membered heterocyclyl;

R⁶ and R⁷ are each hydrogen or each $C_1$-$C_6$alkyl; or

R⁶ and R⁵ may be joined together to form —$CH_2$— or —$CH_2$—$CH_2$—; or

R⁶ and R³ may be joined together to form —$CH_2$— or —$CH_2$—$CH_2$—; and

R⁸ is selected from the group consisting of hydrogen, halogen, hydroxyl, $C_1$-$C_3$alkyl and $C_1$-$C_3$alkoxy; wherein $C_1$-$C_6$alkyl and $C_1$-$C_3$alkoxy; may optionally be substituted by one or more halogens.

For example, in some embodiments, a disclosed compound may be represented by:

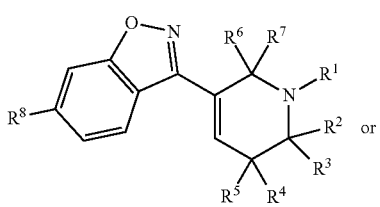

(IIC)

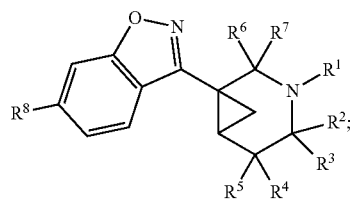

(IID)

wherein R¹, R², R³, R⁴, R⁵, R⁶, R⁷ and R⁸ are as defined herein.

For example, a disclosed compound may be represented by:

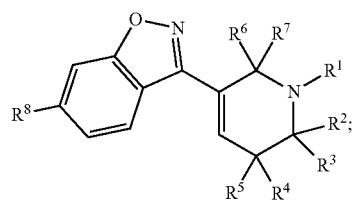

(IIE)

wherein R¹, R², R³, R⁴, R⁵, R⁶, R⁷ and R⁸ are as defined herein.

In some embodiments, at least one of R¹, R², and R³ is $C_1$-$C_6$alkyl. In other embodiments, at least two of R¹, R², and R³ are each $C_1$-$C_6$alkyl. For example, in some embodiments at least two of R¹, R², and R³ are each —$CH_3$. In certain embodiments, for example, R² and R³ are each —$CH_3$. In some embodiments, R¹, R², and R³ are each hydrogen. In further embodiments, R⁴ is selected from the group consisting of hydrogen, fluoro, chloro, —$CH_3$, —$CF_3$, —$OCH_3$, and —$OCF_3$.

In some embodiments, the compound is a compound identified in Table 1 below or a pharmaceutically acceptable salt thereof.

TABLE 1

Exemplary compounds.

| Cmpd No. | Structure |
|---|---|
| 101 | (structure) |
| 102 | (structure) |
| 103 | (structure) |
| 104 | (structure) |
| 105 | (structure) |
| 106 | (structure) |
| 107 | (structure) |

TABLE 1-continued

Exemplary compounds.

| Cmpd No. | Structure |
|---|---|
| 108 | (structure) |
| 109 | (structure) |
| 110 | (structure) |
| 111 | (structure) |
| 112 | (structure) |
| 113 | (structure) |
| 114 | (structure) |

TABLE 1-continued

Exemplary compounds.

| Cmpd No. | Structure |
|---|---|
| 115 | |
| 116 | |
| 117 | |
| 118 | |
| 119 | |
| 120 | |
| 121 | |
| 122 | |
| 123 | |
| 124 | |
| 125 | |
| 126 | |

TABLE 1-continued

Exemplary compounds.

| Cmpd No. | Structure |
|---|---|
| 127 | [7-azaindole connected to 5,5-difluoro-1,2,3,6-tetrahydropyridine] |
| 128 | [7-azaindole connected to N-methyl-5,5-difluoro-tetrahydropyridine] |
| 129 | [7-azaindole connected to N-methoxymethyl-methyl-tetrahydropyridine] |
| 130 | [7-azaindole connected to 5-methoxy-1,2,3,6-tetrahydropyridine] |
| 131 | [7-azaindole connected to N-methyl-5-methoxy-tetrahydropyridine] |
| 132 | [7-azaindole connected to 5-cyano-1,2,3,6-tetrahydropyridine] |
| 133 | [7-azaindole connected to N-methyl-5-cyano-tetrahydropyridine] |
| 134 | [7-azaindole connected to azabicyclic alkene] |
| 135 | [7-azaindole connected to N-methyl azabicyclic alkene] |
| 136 | [7-azaindole connected to azabicyclic alkene] |
| 137 | [7-azaindole connected to N-methyl azabicyclic alkene] |
| 138 | [7-azaindole connected to azabicyclic alkene] |
| 139 | [7-azaindole connected to N-methyl azabicyclic alkene] |
| 140 | [7-azaindole connected to azabicyclic alkene] |
| 141 | [7-azaindole connected to N-methyl azabicyclic alkene] |
| 142 | [7-azaindole connected to N-methyl-tetrahydropyridine with spirocyclopropane] |

TABLE 1-continued
Exemplary compounds.
| Cmpd No. | Structure |
|---|---|
| 143 | 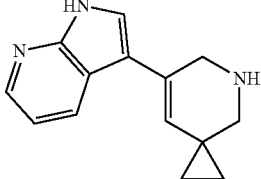 [SMILES: C1=C(c2c[nH]c3ncccc23)CNCC12CC2] |
| 144 | 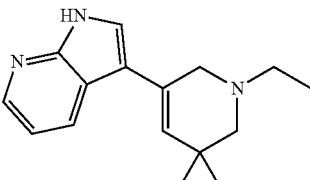 |
| 145 | 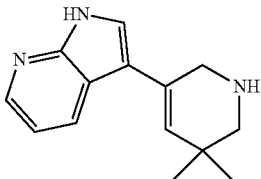 |
| 146 | 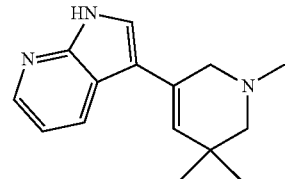 |
| 147 | 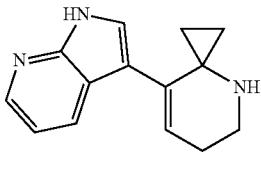 [SMILES: C1=C(c2c[nH]c3ncccc23)C2(CC2)NCC1] |
| 148 | 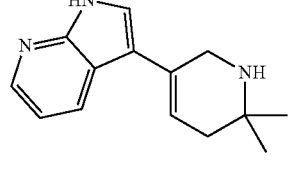 |
| 149 | 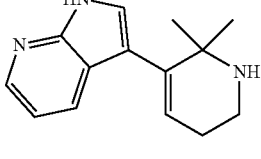 |
| 150 | 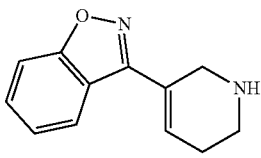 [SMILES: C1=C(c2noc3ccccc23)CNCC1] |
| 151 | 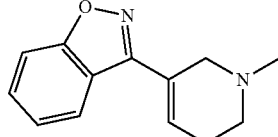 |
| 152 | 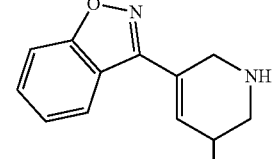 |
| 153 | 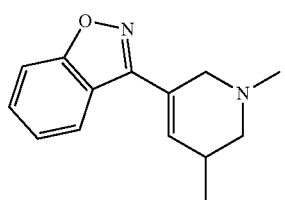 [SMILES: CC1C=C(c2noc3ccccc23)CN(C)C1] |
| 154 | 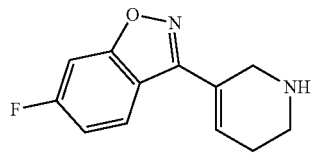 [SMILES: Fc1ccc2c(C3=CCCNC3)noc2c1] |
| 155 | 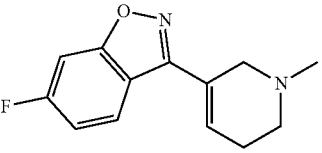 [SMILES: CN1CCC=C(c2noc3cc(F)ccc23)C1] |
| 156 | 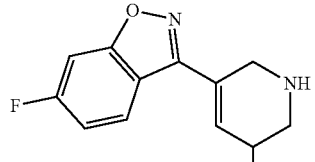 |
| 157 | 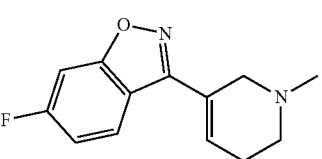 |
| 158 | 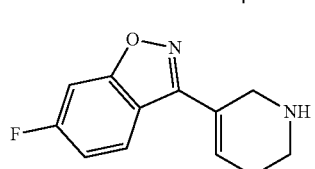 |

TABLE 1-continued

Exemplary compounds.

| Cmpd No. | Structure |
|---|---|
| 159 | [6-fluoro-benzo[d]isoxazol-3-yl linked to 1,4-dimethyl-4-methyl-tetrahydropyridine] |
| 160 | [benzo[d]isothiazol-3-yl linked to 1,2,5,6-tetrahydropyridine (NH)] |
| 161 | [benzo[d]isothiazol-3-yl linked to 4-methyl-1,2,5,6-tetrahydropyridine (NH)] |

Procedures for making compounds described herein are provided in the examples below. In the reactions described below, it may be necessary to protect reactive functional groups (such as hydroxyl, amino, thio or carboxyl groups) to avoid their unwanted participation in the reactions. The incorporation of such groups, and the methods required to introduce and remove them are known to those skilled in the art (for example, see Greene, Wuts, *Protective Groups in Organic Synthesis.* 2nd Ed. (1999)). The deprotection step may be the final step in the synthesis such that the removal of protecting groups affords compounds as disclosed herein. Starting materials used in the following scheme can be purchased or prepared by methods described in the chemical literature, or by adaptations thereof, using methods known by those skilled in the art. The order in which the steps are performed can vary depending on the groups introduced and the reagents used, but would be apparent to those skilled in the art.

Compounds disclosed herein, or any of the intermediates described in the schemes above, can be further derivatised by using one or more standard synthetic methods known to those skilled in the art. Such methods can involve substitution, oxidation or reduction reactions. These methods can also be used to obtain or modify disclosed compounds or any preceding intermediates by modifying, introducing or removing appropriate functional groups.

Where it is desired to obtain a particular enantiomer of a disclosed compound, this may be produced from a corresponding mixture of enantiomers by employing any suitable conventional procedure for resolving enantiomers known to those skilled in the art. For example, diastereomeric derivatives (such as salts) can be produced by reaction of a mixture of enantiomers of a disclosed compound (such as a racemate) and an appropriate chiral compound (such as a chiral base). The diastereomers can then be separated by any conventional means such as crystallization or chromatography, and the desired enantiomer recovered (such as by treatment with an acid in the instance where the diastereomer is a salt). Alternatively, a racemic mixture of esters can be resolved by kinetic hydrolysis using a variety of biocatalysts (for example, see Patel Stereoselective Biocatalysts, Marcel Decker; New York 2000).

In another resolution process a racemate of disclosed compounds can be separated using chiral High Performance Liquid Chromatography. Alternatively, a particular enantiomer can be obtained by using an appropriate chiral intermediate in one of the processes described above. Chromatography, recrystallisation and other conventional separation procedures may also be used with intermediates or final products where it is desired to obtain a particular geometric isomer of the disclosure.

In an alternative embodiment, disclosed compounds may also comprise one or more isotopic substitutions. For example, hydrogen may be $^2$H (D or deuterium) or $^3$H (T or tritium); carbon may be, for example, $^{13}$C or $^{14}$C; oxygen may be, for example, $^{18}$O; nitrogen may be, for example, $^{15}$N, and the like. In other embodiments, a particular isotope (e.g., $^3$H, $^{13}$C, $^{14}$C, $^{18}$O, or $^{15}$N) can represent at least 1%, at least 5%, at least 10%, at least 15%, at least 20%, at least 25%, at least 30%, at least 35%, at least 40%, at least 45%, at least 50%, at least 60%, at least 65%, at least 70%, at least 75%, at least 80%, at least 85%, at least 90%, at least 95%, at least 99%, or at least 99.9% of the total isotopic abundance of an element that occupies a specific site of the compound.

II. Methods

Another aspect of the disclosure provides methods of treating patients suffering from a neurological disease or disorder. In particular, in certain embodiments, the disclosure provides a method of treating the below medical indications comprising administering to a patient in need thereof a therapeutically effective amount of a compound described herein.

For example, provided herein is a method of treating a neurological disease or disorder in a patient in need thereof, comprising administering to the patient a therapeutically effective amount of a compound disclosed herein, e.g., a compound of Formula I or Formula II. Also provided herein is a method of treating a neurological disease or disorder in a patient in need thereof, comprising administering to the patient a therapeutically effective amount of a pharmaceutical composition comprising a compound disclosed herein, e.g., a compound of Formula I or Formula II, and a pharmaceutically acceptable excipient.

Non-limiting examples of a neurological disease or disorder include depression, anxiety, substance abuse, and headaches. Headaches that can be treated with the methods herein include, but are not limited to, migraine headaches and cluster headaches.

For example, in some embodiments the methods described herein may include treating a depressive disorder in a patient in need thereof, comprising administering to the patient an effective amount of a compound disclosed herein, or a pharmaceutical composition thereof. In some embodiments, the depressive disorder may be major depressive disorder. In other embodiments, the depressive disorder may include treatment resistant depressions.

In certain embodiments, the methods described herein may include treating an anxiety disorder in a patient in need thereof, comprising administering to the patient an effective amount of a compound disclosed herein, or a pharmaceutical composition thereof. In some embodiments, the anxiety disorder may be generalized anxiety disorder. In other embodiments, the anxiety disorder may be social anxiety disorder.

In further embodiments, the methods described herein may include treating a trauma an/or stress disorder in a patient in need thereof, comprising administering to the patient an effective amount of a compound disclosed herein, or a pharmaceutical composition thereof. In some embodiments, such a disorder may be post traumatic stress disorder. In other embodiments, such a disorder may be an adjustment disorder.

In certain embodiments, the methods described herein may include treating obsessive compulsive disorder, for example, body dysmorphic disorder, in a patient in need thereof, comprising administering to the patient an effective amount of a compound disclosed herein, or a pharmaceutical composition thereof.

In other embodiments, the methods described herein may include treating an eating disorder in a patient in need thereof, comprising administering to the patient an effective amount of a compound disclosed herein, or a pharmaceutical composition thereof. In some embodiments, the eating disorder may be anorexia. In other embodiments, the eating disorder may be bulimia.

In still further embodiments, the methods described herein may include treating a sleep-wake disorder, for example, insomnia, in a patient in need thereof, comprising administering to the patient an effective amount of a compound disclosed herein, or a pharmaceutical composition thereof.

In some embodiments, the methods described herein may include treating a psychotic disorder, for example, insomnia, in a patient in need thereof, comprising administering to the patient an effective amount of a compound disclosed herein, or a pharmaceutical composition thereof. In some embodiments, the psychotic disorder may be schizophrenia. In other embodiments, the psychotic disorder may be schizoaffective disorder. In still other embodiments, the psychotic disorder may be schizotypal personality disorder.

In certain embodiments, the methods described herein may include treating substance-related disorders and/or addictive disorders in a patient in need thereof, comprising administering to the patient an effective amount of a compound disclosed herein, or a pharmaceutical composition thereof. In some embodiments, such a disorder may be alcohol use disorder. In other embodiments, such a disorder may be opioid use disorder. In still other embodiments, such a disorder may be tobacco use disorder. For example, in some embodiments a compound disclosed herein may be useful in facilitating smoking cessation.

In certain other embodiments, the methods described herein may include treating a neurocognitive disorder in a patient in need thereof, comprising administering to the patient an effective amount of a compound disclosed herein, or a pharmaceutical composition thereof. In some embodiments, the neurocognitive disorder may include those due to a primary neurodegenerative disease, for example, Alzheimer's disease or Parkinson's disease.

In some embodiments, the methods described herein may include treating a personality disorder in a patient in need thereof, comprising administering to the patient an effective amount of a compound disclosed herein, or a pharmaceutical composition thereof. In other embodiments, the methods described herein may include treating an autism spectrum disorder in a patient in need thereof, comprising administering to the patient an effective amount of a compound disclosed herein, or a pharmaceutical composition thereof.

In further embodiments, the methods described herein may include treating a bipolar disorder in a patient in need thereof, comprising administering to the patient an effective amount of a compound disclosed herein, or a pharmaceutical composition thereof. In some embodiments, the bipolar disorder may be bipolar I disorder. In other embodiments, the bipolar disorder may be bipolar II disorder.

In other embodiments, the methods described herein may include treating a pain disorder in a patient in need thereof, comprising administering to the patient an effective amount of a compound disclosed herein, or a pharmaceutical composition thereof. In some embodiments, the pain disorder may be neuropathic pain. In other embodiments, the pain disorder may be migraine. In still other embodiments, the pain disorder may be cluster headache. In further embodiments, the pain disorder may be trigeminal neuralgia. In still further embodiments, the pain disorder may be cancer pain. In certain embodiments, the pain disorder may be regional pain disorder. In yet other embodiments, the pain disorder may be phantom limb pain. In some embodiments, a contemplated pain disorder may be a chronic pain.

In certain embodiments, a compound disclosed herein, e.g., a compound of Formula I or Formula II, may exhibit anxiolytic, anti-depressive, and anti-drug abuse actions, without exhibiting substantial psychedelic actions, for example, hallucinogenic actions. For example, a contemplated (5-HT2A) receptor agonist of the present disclosure may confer anti-depressant like activities without incurring psychedelic drug-like actions. For example, in some embodiments, a compound disclosed herein may be safe an effective for use in a method described herein, yet lack the hallucinogenic effects of known psycholedics such as, for example, DMT and psilocybin.

This disclosure also provides a method of selectively agonizing the 5-hydroxytryptamine 2A (5-HT2A) receptor. The method includes administering to a patient a compound disclosed herein, e.g., a compound of Formula I or Formula II, a pharmaceutically acceptable salt and/or stereoisomer thereof, wherein the compound selectively binds to the 5-HT2A over the 5-HTB and/or 5-HT2C receptor. The method of selectively agonizing the 5-HT2A receptor can be used to treat, ameliorate, and/or prevent diseases or disorders that are affected by, associated with, or would benefit from selective agonist activity at the 5-HT2A receptor. In selectively binding to and agonizing the 5-HT2A receptor over the 5-HTB and/or 5-HT2C receptor, the method provides, for example, reduced side effects such as, but not limited to, drug-induced valvular heart disease associated with binding and agonizing the 5-HTB receptor. In certain embodiments, a compound disclosed herein, e.g., a compound of Formula I or Formula II. is a 5-HTB receptor antagonist. In certain embodiments, a compound disclosed herein, e.g., a compound of Formula I or Formula II, is a 5-HTC receptor antagonist.

In certain embodiments, a method described herein further comprises administering to the patient an additional therapeutic agent that treats a neurological disease or disorder, or that treats a disease or disorder that is affected by, associated with, or would benefit from selective agonist activity at the 5-HT2A receptor.

Contemplated patients include not only humans, but other animals such as companion animals (e.g. dogs, cats), domestic animals (e.g. cow, swine), and wild animals (e.g. monkeys, bats, snakes).

Compounds described herein can be administered in combination with one or more additional therapeutic agents to treat a disorder described herein. For clarity, contemplated herein are both a fixed composition comprising a disclosed compound and another therapeutic agent such as disclosed herein, and methods of administering, separately a disclosed compound and a disclosed therapeutic. For example, provided in the present disclosure is a pharmaceutical composition comprising a compound described herein, one or more additional therapeutic agents, and a pharmaceutically acceptable excipient. In some embodiments, a disclosed compound and one additional therapeutic agent is administered. In some embodiments, a disclosed compound as defined herein and two additional therapeutic agents are administered. In some embodiments, a disclosed compound as defined herein and three additional therapeutic agents are administered. Combination therapy can be achieved by administering two or more therapeutic agents, each of which is formulated and administered separately. For example, a disclosed compound and an additional therapeutic agent can be formulated and administered separately. Combination therapy can also be achieved by administering two or more therapeutic agents in a single formulation, for example a pharmaceutical composition comprising a disclosed compound as one therapeutic agent and one or more additional therapeutic agents. For example, a disclosed compound and an additional therapeutic agent can be administered in a single formulation. Other combinations are also encompassed by combination therapy. While the two or more agents in the combination therapy can be administered simultaneously, they need not be. For example, administration of a first agent (or combination of agents) can precede administration of a second agent (or combination of agents) by minutes, hours, days, or weeks. Thus, the two or more agents can be administered within minutes of each other or within 1, 2, 3, 6, 9, 12, 15, 18, or 24 hours of each other or within 1, 2, 3, 4, 5, 6, 7, 8, 9, 10, 12, 14 days of each other or within 2, 3, 4, 5, 6, 7, 8, 9, or weeks of each other. In some cases even longer intervals are possible. While in many cases it is desirable that the two or more agents used in a combination therapy be present in within the patient's body at the same time, this need not be so.

Combination therapy can also include two or more administrations of one or more of the agents used in the combination using different sequencing of the component agents. For example, if agent X and agent Y are used in a combination, one could administer them sequentially in any combination one or more times, e.g., in the order X-Y-X, X-X-Y, Y-X-Y, Y-Y-X, X-X-Y-Y, etc.

For example, the methods described herein include administering to the patient a therapeutically effective amount of at least one compound of Formula I or Formula II, as described herein, which is optionally formulated in a pharmaceutical composition. In various embodiments, a therapeutically effective amount of at least one compound described herein, e.g., a compound of Formula I or Formula II, present in a pharmaceutical composition is the only therapeutically active compound in a pharmaceutical composition. In certain embodiments, the method further comprises administering to the patient an additional therapeutic agent that treats a neurological disease or disorder or that treats a disease or disorder that is affected by, associated with, or would benefit from selective agonist activity at the 5-HT2A receptor.

For example, in some embodiments the methods described herein can include administering to the patient one or more additional therapeutic agents in combination with a compound disclosed herein. In certain embodiments, the one or more additional therapeutics agents that may be administered in combination with a compound disclosed herein may be a selective serotonin reuptake inhibitor (SSRI). In some embodiments, the selective serotonin reuptake inhibitor may be selected from the group consisting of, for example, fluoxetine, paroxetine, sertraline, citalopram and escitalopram. In other embodiments, the one or more additional therapeutics agents may be a serotonin and norepinephrine reuptake inhibitor (SNRI). For example, the serotonin and norepinephrine reuptake inhibitor may be selected from the group consisting of, e.g., duloxetine, venlafaxine, desvenlafaxine and levomilnacipran. In still other embodiments, the one or more additional therapeutics agents may be selected from the group consisting of, for example, trazodone, mirtazapine, vortioxetine, vilazodone and bupropion. In certain embodiments, the one or more additional therapeutics agents may be a tricyclic antidepressant. For example, in some embodiments the tricyclic antidepressant may be selected from the group consisting of, e.g., imipramine, nortriptyline, amitriptyline, doxepin and desipramine. In further embodiments, the one or more additional therapeutics agents may be a monoamine oxidase inhibitor (MAOI). For example, in some embodiments the monoamine oxidase inhibitor may be selected from the group consisting of, e.g., tranylcypromine, phenelzine and isocarboxazid. In other embodiments, the one or more additional therapeutics agents may be, for example, a lithium compound, e.g., a lithium salt, e.g., lithium carbonate, lithium acetate, lithium sulfate, lithium citrate, lithium orotate, or lithium gluconate. In some embodiments, the one or more additional therapeutics agents may be, for example, ketamine or esketamine. In certain embodiments, the one or more additional therapeutics agents may be, for example, dextramethorphan. In other embodiments, the one or more additional therapeutics agents may be, for example, D-methadone.

In some embodiments, administering the compound(s) described herein to the patient allows for administering a lower dose of the additional therapeutic agent as compared to the dose of the additional therapeutic agent alone that is required to achieve similar results in treating, ameliorating, and/or preventing a neurological disease or disorder or in treating, ameliorating, and/or preventing a disease or disorder that is affected by, associated with, or would benefit from selective agonist activity at the 5-HT2A receptor in the patient. For example, in certain embodiments, the compound(s) described herein enhance(s) the activity of the additional therapeutic compound, thereby allowing for a lower dose of the additional therapeutic compound to provide the same effect.

In particular, in certain embodiments, the disclosure provides a method of treating the above medical indications comprising administering a subject in need thereof a therapeutically effective amount of a compound described herein, e.g., a compound of Formula I or Formula II.

III. Pharmaceutical Compositions and Kits

Another aspect of the disclosure provides pharmaceutical compositions comprising compounds as disclosed herein formulated together with a pharmaceutically acceptable carrier. In particular, the present disclosure provides pharmaceutical compositions comprising compounds as disclosed herein formulated together with one or more pharmaceutically acceptable carriers. These formulations include those suitable for oral, rectal, topical, intranasal, buccal, parenteral (e.g., subcutaneous, intramuscular, intradermal, or intravenous) rectal, vaginal, or aerosol administration, although the most suitable form of administration in any given case will depend on the degree and severity of the condition being treated and on the nature of the particular compound being used. For example, disclosed compositions may be formulated as a unit dose, and/or may be formulated for oral or subcutaneous administration.

Exemplary pharmaceutical compositions of this disclosure may be used in the form of a pharmaceutical preparation, for example, in solid, semisolid or liquid form, which contains one or more of the compound of the disclosure, as an active ingredient, in admixture with an organic or inorganic carrier or excipient suitable for external, enteral or parenteral applications. The active ingredient may be compounded, for example, with the usual non-toxic, pharmaceutically acceptable carriers for tablets, pellets, capsules, suppositories, solutions, emulsions, suspensions, and any other form suitable for use. The active object compound is included in the pharmaceutical composition in an amount sufficient to produce the desired effect upon the process or condition of the disease.

For preparing solid compositions such as tablets, the principal active ingredient may be mixed with a pharmaceutical carrier, e.g., conventional tableting ingredients such as corn starch, lactose, sucrose, sorbitol, talc, stearic acid, magnesium stearate, dicalcium phosphate or gums, and other pharmaceutical diluents, e.g., water, to form a solid preformulation composition containing a homogeneous mixture of a compound of the disclosure, or a non-toxic pharmaceutically acceptable salt thereof. When referring to these preformulation compositions as homogeneous, it is meant that the active ingredient is dispersed evenly throughout the composition so that the composition may be readily subdivided into equally effective unit dosage forms such as tablets, pills and capsules.

In solid dosage forms for oral administration (capsules, tablets, pills, dragees, powders, granules and the like), the subject composition is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, acetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; and (10) coloring agents. In the case of capsules, tablets and pills, the compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the subject composition moistened with an inert liquid diluent.

Tablets, and other solid dosage forms, such as dragees, capsules, pills and granules, may optionally be scored or prepared with coatings and shells, such as enteric coatings and other coatings well known in the pharmaceutical-formulating art.

Compositions for inhalation or insufflation include solutions and suspensions in pharmaceutically acceptable, aqueous or organic solvents, or mixtures thereof, and powders. Liquid dosage forms for oral administration include pharmaceutically acceptable emulsions, microemulsions, solutions, suspensions, syrups and elixirs. In addition to the subject composition, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, cyclodextrins and mixtures thereof.

Suspensions, in addition to the subject composition, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations for rectal or vaginal administration may be presented as a suppository, which may be prepared by mixing a subject composition with one or more suitable non-irritating excipients or carriers comprising, for example, cocoa butter, polyethylene glycol, a suppository wax or a salicylate, and which is solid at room temperature, but liquid at body temperature and, therefore, will melt in the body cavity and release the active agent.

Dosage forms for transdermal administration of a subject composition include powders, sprays, ointments, pastes, creams, lotions, gels, solutions, patches and inhalants. The active component may be mixed under sterile conditions with a pharmaceutically acceptable carrier, and with any preservatives, buffers, or propellants which may be required.

The ointments, pastes, creams and gels may contain, in addition to a subject composition, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays may contain, in addition to a subject composition, excipients such as lactose, talc, silicic acid, aluminum hydroxide, calcium silicates and polyamide powder, or mixtures of these substances. Sprays may additionally contain customary propellants, such as chlorofluorohydrocarbons and volatile unsubstituted hydrocarbons, such as butane and propane.

Compositions and compounds of the present disclosure may alternatively be administered by aerosol. This is accomplished by preparing an aqueous aerosol, liposomal preparation or solid particles containing the compound. A non-aqueous (e.g., fluorocarbon propellant) suspension could be used. Sonic nebulizers may be used because they minimize exposing the agent to shear, which may result in degradation of the compounds contained in the subject compositions. Ordinarily, an aqueous aerosol is made by formulating an aqueous solution or suspension of a subject composition together with conventional pharmaceutically acceptable carriers and stabilizers. The carriers and stabilizers vary with the requirements of the particular subject composition, but typically include non-ionic surfactants (Tweens, Pluronics, or polyethylene glycol), innocuous proteins like serum albumin, sorbitan esters, oleic acid, lecithin, amino acids such as glycine, buffers, salts, sugars or sugar alcohols. Aerosols generally are prepared from isotonic solutions.

Pharmaceutical compositions of this disclosure suitable for parenteral administration comprise a subject composition in combination with one or more pharmaceutically-acceptable sterile isotonic aqueous or non-aqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and non-aqueous carriers which may be employed in the pharmaceutical compositions of the disclosure include water, ethanol, polyols (such as glycerol, propylene glycol, polyethylene glycol, and the like), and suitable mixtures thereof, vegetable oils, such as olive oil, and injectable organic esters, such as ethyl oleate and cyclodextrins. Proper fluidity may be maintained, for example, by the use of coating materials, such as lecithin, by the maintenance of the required particle size in the case of dispersions, and by the use of surfactants.

In another aspect, the disclosure provides enteral pharmaceutical formulations including a disclosed compound and an enteric material; and a pharmaceutically acceptable carrier or excipient thereof. Enteric materials refer to polymers that are substantially insoluble in the acidic environment of the stomach, and that are predominantly soluble in intestinal fluids at specific pHs. The small intestine is the part of the gastrointestinal tract (gut) between the stomach and the large intestine, and includes the duodenum, jejunum, and ileum. The pH of the duodenum is about 5.5, the pH of the jejunum is about 6.5 and the pH of the distal ileum is about 7.5. Accordingly, enteric materials are not soluble, for example, until a pH of about 5.0, of about 5.2, of about 5.4, of about 5.6, of about 5.8, of about 6.0, of about 6.2, of about 6.4, of about 6.6, of about 6.8, of about 7.0, of about 7.2, of about 7.4, of about 7.6, of about 7.8, of about 8.0, of about 8.2, of about 8.4, of about 8.6, of about 8.8, of about 9.0, of about 9.2, of about 9.4, of about 9.6, of about 9.8, or of about 10.0. Exemplary enteric materials include cellulose acetate phthalate (CAP), hydroxypropyl methylcellulose phthalate (HPMCP), polyvinyl acetate phthalate (PVAP), hydroxypropyl methylcellulose acetate succinate (HPMCAS), cellulose acetate trimellitate, hydroxypropyl methylcellulose succinate, cellulose acetate succinate, cellulose acetate hexahydrophthalate, cellulose propionate phthalate, cellulose acetate maleate, cellulose acetate butyrate, cellulose acetate propionate, copolymer of methylmethacrylic acid and methyl methacrylate, copolymer of methyl acrylate, methylmethacrylate and methacrylic acid, copolymer of methylvinyl ether and maleic anhydride (Gantrez ES series), ethyl methyacrylate-methylmethacrylate-chlorotrimethylammonium ethyl acrylate copolymer, natural resins such as zein, shellac and copal collophorium, and several commercially available enteric dispersion systems (e. g., Eudragit L30D55, Eudragit FS30D, Eudragit L100, Eudragit S100, Kollicoat EMM30D, Estacryl 30D, Coateric, and Aquateric). The solubility of each of the above materials is either known or is readily determinable in vitro. The foregoing is a list of possible materials, but one of skill in the art with the benefit of the disclosure would recognize that it is not comprehensive and that there are other enteric materials that would meet the objectives of the present disclosure.

The disclosure also provides kits for use by a e.g. a consumer in need of treatment of a disease or disorder described herein. Such kits include a suitable dosage form such as those described above and instructions describing the method of using such dosage form to mediate, reduce or prevent inflammation. The instructions would direct the consumer or medical personnel to administer the dosage form according to administration modes known to those skilled in the art. Such kits could advantageously be packaged and sold in single or multiple kit units. An example of such a kit is a so-called blister pack. Blister packs are well known in the packaging industry and are being widely used for the packaging of pharmaceutical unit dosage forms (tablets, capsules, and the like). Blister packs generally consist of a sheet of relatively stiff material covered with a foil of a preferably transparent plastic material. During the packaging process recesses are formed in the plastic foil. The recesses have the size and shape of the tablets or capsules to be packed. Next, the tablets or capsules are placed in the recesses and the sheet of relatively stiff material is sealed against the plastic foil at the face of the foil which is opposite from the direction in which the recesses were formed. As a result, the tablets or capsules are sealed in the recesses between the plastic foil and the sheet. Preferably the strength of the sheet is such that the tablets or capsules can be removed from the blister pack by manually applying pressure on the recesses whereby an opening is formed in the sheet at the place of the recess. The tablet or capsule can then be removed via said opening.

It may be desirable to provide a memory aid on the kit, e.g., in the form of numbers next to the tablets or capsules whereby the numbers correspond with the days of the regimen which the tablets or capsules so specified should be ingested. Another example of such a memory aid is a calendar printed on the card, e.g., as follows "First Week, Monday, Tuesday, . . . etc. . . . Second Week, Monday, Tuesday, . . . " etc. Other variations of memory aids will be readily apparent. A "daily dose" can be a single tablet or capsule or several pills or capsules to be taken on a given day. Also, a daily dose of a first compound can consist of one tablet or capsule while a daily dose of the second compound can consist of several tablets or capsules and vice versa. The memory aid should reflect this.

EXAMPLES

The compounds described herein can be prepared in a number of ways based on the teachings contained herein and synthetic procedures known in the art. In the description of the synthetic methods described below, it is to be understood that all proposed reaction conditions, including choice of solvent, reaction atmosphere, reaction temperature, duration of the experiment and workup procedures, can be chosen to be the conditions standard for that reaction, unless otherwise indicated. It is understood by one skilled in the art of organic synthesis that the functionality present on various portions of the molecule should be compatible with the reagents and reactions proposed. Substituents not compatible with the reaction conditions will be apparent to one skilled in the art, and alternate methods are therefore indicated. The starting materials for the examples are either commercially available or are readily prepared by standard methods from known materials.

GENERAL EXPERIMENTAL

NMR Specification and Details $^1$H, $^{13}$C and NOE spectra were recorded on Bruker 400 MHz i-Probe spectrophotometer (400 MHz for 1H NMR and 100 MHz for 13C NMR), and spectra were integrated in Topspin 4.0.9 software. Chemical shifts were reported in δ ppm (parts per million) with residual solvent protons as internal standard (δ 7.28 for $CDCl_3$, δ 2.50 for DMSO-$d_6$, in $^1$H NMR; δ 77.16 for $CDCl_3$, δ 39.52 for DMSO-$d_6$ in $^{13}$C NMR). Coupling constant (J) values are given in Hertz (Hz). Splitting patterns are designated as s (singlet), d (doublet), t (triplet), q (quartet), dd (double doublet), m (multiplet), and br s (broad singlet).

LCMS Acidic Method

Wavelengths for Detection: 210 & 254 nm; Column Details: X-BRIDGE BEH C18 2.5 μm 2.1*50 mm; Machine Details: Waters Acquity UPLC-H Class equipped with PDA and attached with QDa detector; Column temperature: 30° C.; Auto sampler temperature: 15° C.; Mobile Phase A: 0.1% Formic acid in Milli Q water (pH=2.70); Mobile Phase B: 0.1% Formic acid in Milli Q water:Acetonitrile (10:90); Mobile phase gradient details: T=0 min (97% A, 3% B) flow: 0.8 mL/min; T=0.75 min (97% A, 3% B) flow: 0.8 mL/min; gradient to T=2.7 min (2% A, 98% B) flow: 0.8 mL/min; gradient to T=3 min (0% A, 100% B) flow: 1 mL/min; T=3.5 min (0% A, 100% B) flow: 1 mL/min; gradient to T=3.51 min (97% A, 3% B) flow: 0.8 mL/min; end of run at T=4 min (97% A, 3% B); Flow rate: 0.8 mL/min; Run Time: 4 min; UV Detection Method: PDA Mass parameter: Probe: ESI; Mode of Ionisation: positive and negative; Cone voltage: 10 V; capillary Voltage: 0.8 KV; Extractor Voltage: 1 KV; Rf Lens: −0.1; Temperature of source: 120° C.; Temperature of Probe: −600° C.; Temperature of Desolvation: NA; Cone Gas Flow: Default, Desolvation Gas flow: Default.

LCMS Basic Method

Machine Details: Waters Acquity Ultra performance LC connected with PDA and equipped with SQ detector; Column temperature: 35° C.; Auto sampler temperature: 5° C.; Mobile Phase A: 5 mM Ammonium Bicarbonate (pH=7.35) in Milli Q water; Mobile Phase B: Acetonitrile; Mobile phase gradient details: T=0 min (97% A, 3% B) Flow rate=1.0 ml/min, T=0.20 min (97% A, 3% B) Flow rate=1.0 ml/min; gradient to T=2.70 min (20% A, 80% B) Flow rate=1.0 ml/min; gradient to T=3.0 min (0% A, 100% B) Flow rate=1.2 ml/min; T=3.50 min (0% A, 100% B) Flow rate=1.2 ml/min; T=3.51 min (97% A, 3% B) Flow rate=1.0 ml/min; end of run at T=4.0 min (97% A, 3% B) Flow rate=1.0 ml/min, Run Time: 4 min; UV Detection Method: PDA.

Mass parameter: Probe: ESI, Mode of Ionisation: Positive and Negative Cone voltage: 30 and 10 V; capillary voltage: 3.0 KV; Extractor Voltage: 2 V; Rf Lens: 0.1 V; Temperature of source: 120° C.; Temperature of Probe: 400° C.; Cone Gas Flow: 100 L/Hr, Desolvation Gas flow: 800 L/Hr.

HPLC Basic Method

Wavelengths for Detection: 210 nm and 254 nm; Column Details: Waters Atlantis C18 150*4.6 mm, 5 uN; Machine Details: Waters Alliance e2695 Photodiode Array Detector 2998; Column temperature: 30° C.; Auto sampler temperature: 20° C.; Mobile Phase A: 0.1% Ammonia Solution in Milli Q water; Mobile Phase B: Acetonitrile; Mobile phase gradient details: T=0 min (90% A, 10% B); T=7.0 min (10% A, 90% B); gradient to T=9.0 min (0% A, 100% B); gradient to T=14.00 min (0% A, 100% B); T=14.01 min (90% A, 10% B); end of run at T=17 min (90% A, 10% B); Flow rate: 1.0 mL/min, Run Time: 17 min; UV Detection Method: PDA.

HPLC Acidic Method

Wavelengths for Detection: 210 and 254 nm; Column Details: Sunfire C18; 150*4.6 mm, 3.5 μm; Machine Details: SHIMADZU i-Series LC-2050C 3D with PDA detector; Column temperature: 25° C.; Auto sampler temperature: 25° C.; Mobile Phase A: 0.05% Trifluoroacetic acid in HPLC water; Mobile Phase B: 100% Acetonitrile; Mobile phase gradient details: T=0 min (90% A, 10% B) flow: 1 mL/min; T=7 min (10% A, 90% B) flow: 1 mL/min; gradient to T=9 min (0% A, 100% B) flow: 1 mL/min; gradient to T=14 min (0% A, 100% B) flow: 1 mL/min; T=14.01 min (90% A, 10% B) flow: 1 mL/min; gradient to end of run at T=17 min (90% A, 10% B); Flow rate: 1 mL/min; Run Time: 17 min; UV Detection Method: PDA.

Example 1: Synthesis of Compounds 101 and 102

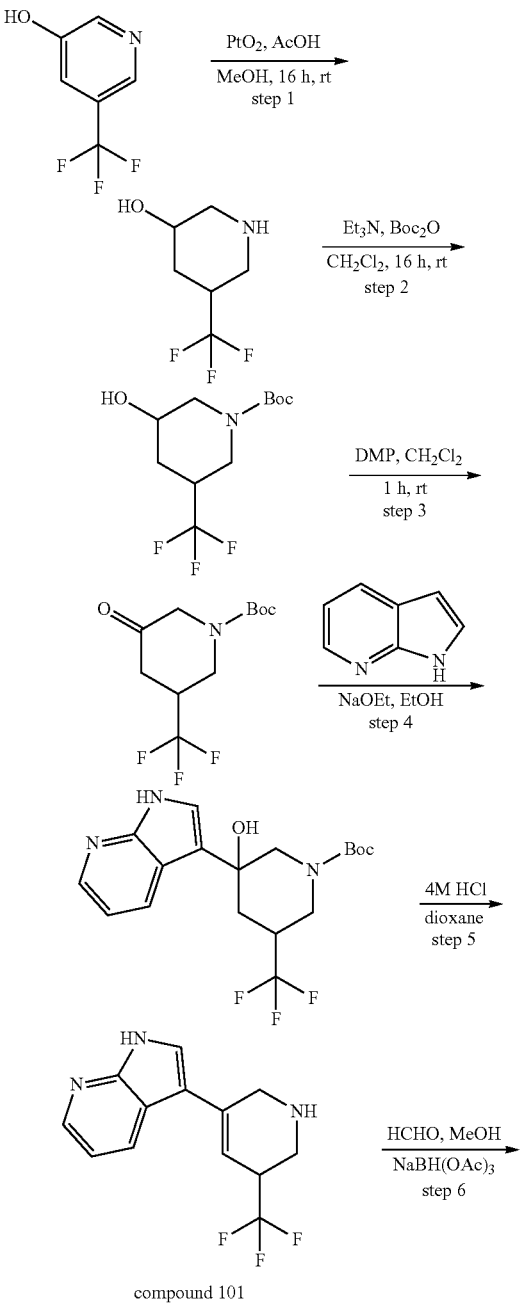

compound 101

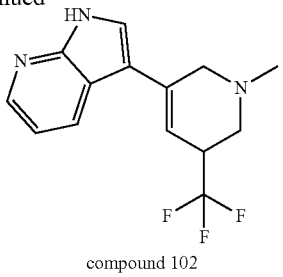

compound 102

Step 1. Synthesis of 5-(trifluoromethyl)piperidin-3-ol. To a stirred solution of 5-(trifluoromethyl)pyridin-3-ol (3.0 g, 18.40 mmol) in MeOH (15 mL) was added AcOH (15 mL) and stirred at rt for 1 h. To this solution was added $PtO_2$ (0.6 g) and stirred at rt for 16 h. The reaction mixture was filtered through celite, and the resulting filtrate was concentrated under reduced vacuum. The resulting crude was basified with sat. NaOH solution and extracted with $CH_2Cl_2$ (3×100 mL). The combined organic layers were dried over $Na_2SO_4$ and concentrated under reduced pressure to afford title compound as brown solid (2.0 g, 64%). LCMS: $C_6H_{10}F_3NO$ exact mass: 169.1 m/z 170.1 (M+1).

Step 2. Synthesis of tert-butyl-3-hydroxy-5-(trifluoromethyl)piperidine-1-carboxylate. To a stirred solution of 5-(trifluoromethyl)piperidin-3-ol (2.0 g, 11.82 mmol) in THF was added TEA (1.19 g, 11.82 mmol) and the reaction mixture was stirred at rt for 1 h before adding $(Boc)_2O$ (2.58 g, 11.82 mmol). After stirring at rt for 16 h, the reaction mixture was poured into sat. citric acid solution and extracted with EtOAc (3×100 mL). The combined organic layers were dried over $Na_2SO_4$ and concentrated under reduced pressure. The resulting crude product was purified by column chromatography eluting with 20% EtOAc in hexane to afford the title compound as white solid (2.6 g, 63%). LCMS: $C_{11}H_{18}F_3NO_3$ exact mass: 269.1; m/z 214.1 (M−56).

Step 3. Synthesis of tert-butyl-3-oxo-5-(trifluoromethyl)piperidine-1-carboxylate. To a solution of tert-butyl-3-hydroxy-5-(trifluoromethyl)piperidine-1-carboxylate (2.0 g, 7.42 mmol) in $CH_2Cl_2$ (20 mL) was added Dess-Martin periodinane (DMP) (7.8 g, 18.56 mmol). The reaction mixture was stirred at rt for 1 h and then poured into water and extracted with DCM (3×100 mL). The combined organic layers were dried over $Na_2SO_4$ and concentrated under reduced pressure. The crude product was purified by column chromatography (20% EtOAc in Hexane) to give title compound as white solid (1.8 g, 91%). LCMS: $C_{11}H_{16}F_3NO_3$ exact mass: 267.1; m/z 285.2 (M+18).

Step 4. Synthesis of tert-butyl-3-hydroxy-3-(1H-pyrrolo[2,3-b]pyridin-3-yl)-5-(trifluoro-methyl)-piperidine-1-carboxylate. To a stirred solution of tert-butyl-3-oxo-5-(trifluoro-methyl)piperidine-1-carboxylate (2.0 g, 7.48 mmol) and 1H-pyrrolo[2,3-b]pyridine (3.1 g, 26.19 mmol) in EtOH (20 mL) was added 21% NaOEt in EtOH (20 mL). The resulting reaction mixture was stirred at rt for 16 h before diluting the reaction mixture with water and extracting with EtOAc (3×200 mL). The combined organic layers were dried over $Na_2SO_4$ and concentrated under reduced pressure. The resulting crude product was purified by column chromatography ($SiO_2$ 230-400 mesh) eluting with EtOAc to afford title compound as a white solid (1.0 g, 35%). LCMS: $C_{18}H_{22}F_3N_3O_3$ exact mass; 385.2; m/z 386.2 (M+1).

Step 5. Synthesis of 3-(5-(trifluoromethyl)-1,2,5,6-tetrahydropyridin-3-yl)-1H-pyrrolo[2,3-b]pyridine. To a stirred solution of tert-butyl-3-hydroxy-3-(1H-pyrrolo[2,3-b]pyridin-3-yl)-5-(trifluoro-methyl)-piperidine-1-carboxylate (1.8 g) in 1,4-dioxane (20 mL) was added 4M HCl in dioxane (6.0 mL). The resulting reaction mixture was stirred at 90° C. for 1 h before the reaction mixture was concentrated under reduced pressure. The resulting crude product was triturated using n-pentane and diethyl ether to afford a yellow solid which was further purified by prep-HPLC (using 0.05% $NH_3$ in $H_2O$ and MeCN) to afford title compound as a white solid (1.0 g, 35%). LCMS: $C_{13}H_{12}F_3N_3$ exact mass: 267.1; m/z 267.1 (M+1); $^1$H NMR: (MeOD, 400 MHz) δ 8.88 (d, J=8.0 Hz, 1H), 8.54 (d, J=6.0 Hz, 1H), 8.02 (s, 1H), 7.71-7.67 (m, 1H), 6.46 (s, 1H), 4.27 (s, 2H), 3.90-3.80 (m, 2H), 3.61-3.53 (m, 1H).

Step 6. Synthesis of 3-(1-methyl-5-(trifluoromethyl)-1,2,5,6-tetrahydropyridin-3-yl)-1H-pyrrolo[2,3-b]pyridine. To a solution of 3-(5-(trifluoromethyl)-1,2,5,6-tetrahydropyridin-3-yl)-1H-pyrrolo[2,3-b]pyridine (1.0 g, 0.37 mmol) in MeOH (10 mL) was added 37% HCHO in water (0.34 g, 11.22 mmol) and sodium borohydride (0.43 g, 11.22 mmol). The resulting reaction mixture was stirred at rt for 1 h before the reaction mixture was diluted with sat. $NaHCO_3$ solution and extracted with DCM (3×100 mL). The combined organic extracts were dried over $Na_2SO_4$ and concentrated under reduced pressure. The resulting crude product was purified by prep-HPLC (using 0.05% $NH_3$ in $H_2O$ and MeCN) to afford title compound as a white solid (0.072 g). LCMS: $C_{14}H_{14}F_3N_3$ exact mass: 281.1; m/z 282.1 (M+1); $^1$H NMR: (MeOD, 400 MHz) δ 8.85 (s, 1H), 8.53 (d, J=5.2 Hz, 1H), 8.00 (s, 1H), 7.69-7.65 (m, 1H), 6.45 (s, 1H), 4.53 (bs, 1H), 4.26 (bs, 1H), 4.01 (bs, 2H), 3.68-3.50 (m, 1H), 3.19 (s, 3H).

Example 2: Synthesis of Compound 103

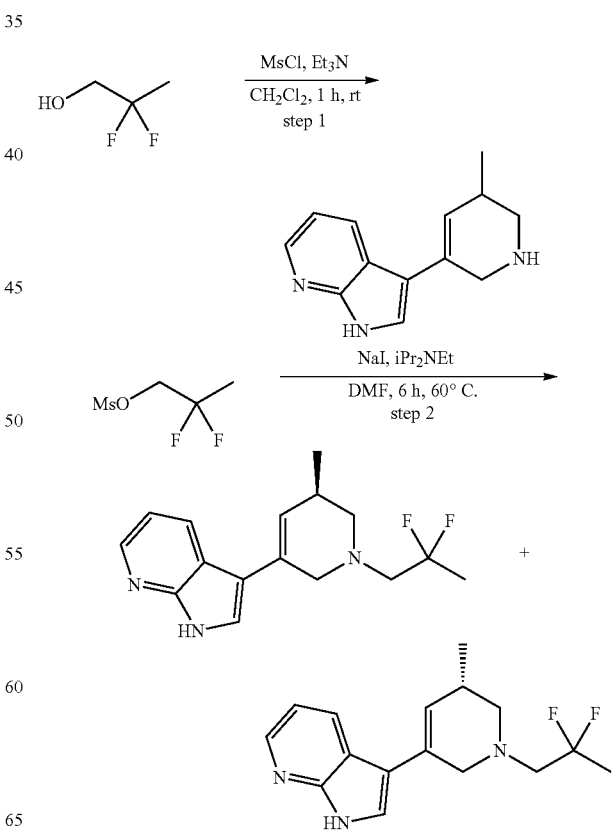

Step 1. Synthesis of 2,2-difluoropropyl methanesulfonate. To a stirred solution of 2,2-difluoropropan-1-ol (1.5 g, 15.62 mmol) in DCM (15 mL) was added Et$_3$N (3.2 mL, 23.44 mmol). Mesyl chloride (3.6 g, 31.24 mmol) was added to reaction at 0° C. and the reaction mixture was stirred at room temperature for 1 h. After completion of the reaction, the reaction mixture was diluted with water (100 mL) and extracted with DCM (3×100 mL). The combined organic extracts were dried over Na$_2$SO$_4$, filtered, and concentrated under reduced pressure to afford the title compound as a pale-yellow oil (3.2 g, 96%) which was directly used for the next step without further purification.

Step 2. Synthesis of 3-(1-(2,2-difluoropropyl)-5-methyl-1,2,5,6-tetrahydropyridin-3-yl)-1H-pyrrolo[2,3-b]pyridine. To a stirred solution of 3-(5-methyl-1,2,5,6-tetrahydropyridin-3-yl)-1H-pyrrolo[2,3-b]pyridine (0.15 g, 0.704 mmol) in DMF (1.5 mL) was added DIPEA (0.18 g, 1.408 mmol) and NaI (0.11 g, 0.704 mmol). The reaction mixture was stirred at room temperature for 15 min before adding 2,2-difluoropropyl methanesulfonate (0.12 g, 0.704 mmol). The reaction was stirred at 60° C. for 6 h before diluting with water (50 mL) and extracting with EtOAc (3×75 mL). The combined organic extracts were dried over Na$_2$SO$_4$, filtered and concentrated under reduced pressure. The crude product was purified by chiral SFC to afford the two enantiomers. The isolated material (0.035 g each isomer) was further treated with 4M HCl in dioxane (1.0 mL) to generate the HCl salt. After 30 min, the reaction mixture was concentrated under reduced pressure to afford Isomer-1 (first eluting) as an off-white solid (0.032 g, 16%) and Isomer-2 (second eluting) as an off-white solid (0.029 g, 14%).

Compound 103 (Isomer 1): LCMS: C$_{16}$H$_{19}$F$_2$N$_3$ exact mass: 291.2; m/z 292.04 (M+1); $^1$H NMR: (MeOD, 400 MHz): δ 8.92 (d, J=8.0 Hz, 1H), 8.46 (d, J=4.0 Hz, 1H), 7.80 (s, 1H), 7.65-7.61 (m, 1H), 6.36 (s, 1H), 4.22-4.08 (m, 2H), 3.68-3.63 (m, 2H), 3.02-2.97 (m, 4H), 2.76 (bs, 1H), 1.23-1.19 (m, 3H).

Compound 103 (Isomer 2): LCMS: C$_{16}$H$_{19}$F$_2$N$_3$ exact mass: 291.2; m/z 292.05 (M+1); $^1$H NMR: (MeOD, 400 MHz): δ 8.94 (d, J=8.0 Hz, 1H), 8.47 (d, J=4.0 Hz, 1H), 7.81 (s, 1H), 7.66-7.62 (m, 1H), 6.36 (s, 1H), 4.22-4.08 (m, 2H), 3.68-3.63 (m, 2H), 3.07-2.97 (m, 4H), 2.80 (bs, 1H), 1.23-1.13 (m, 3H).

Example 3: Synthesis of Compound 105

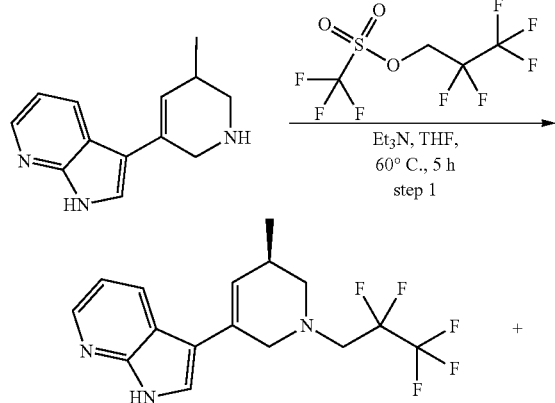

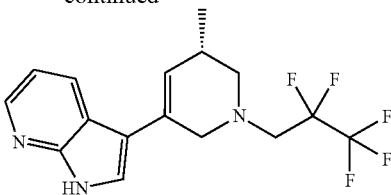

Step 1. Synthesis of 3-(5-methyl-1-(2,2,3,3,3-pentafluoropropyl)-1,2,5,6-tetrahydropyridin-3-yl)-1H-pyrrolo[2,3-b]pyridine. To a stirred solution of 3-(5-methyl-1,2,5,6-tetrahydropyridin-3-yl)-1H-pyrrolo[2,3-b]pyridine (0.2 g, 0.9389 mmol) in THF (2.0 mL) was added TEA (0.4 mL, 2.817 mmol) and stirred at rt for 15 min before adding 2,2,3,3,3-pentafluoropropyl trifluoromethane sulfonate (0.32 g, 1.127 mmol). The reaction mixture was stirred at 60° C. for 5 h before diluting with water (50 mL) and extracting with EtOAc (3×50 mL). The combined organic extracts were dried over Na$_2$SO$_4$, filtered, and concentrated under reduced pressure. The resulting crude product was resolved by chiral SFC into the two enantiomers. The isolated material (0.065 g Isomer-1 (first eluting) and 0.050 g Isomer-2 (second eluting)) was further treated with 4M HCl in dioxan (1.0 mL) for 30 min before the reaction mixture was concentrated under reduced pressure to afford Isomer-1 an off-white solid (0.070 g, 99%) and Isomer-2 an off white solid (0.048 g, 98%).

Compound 105 (Isomer 1): LCMS: C$_{16}$H$_{16}$F$_5$N$_3$ exact mass: 345.1; m/z 346.09 (M+1); $^1$H NMR: (MeOD, 400 MHz) δ 8.98 (d, J=8.0 Hz, 1H), 8.51 (d, J=6.0 Hz, 1H), 7.85 (s, 1H), 7.70-7.66 (m, 1H), 6.44 (s, 1H), 4.21-4.13 (m, 4H), 3.66-3.62 (m, 1H), 3.10-2.98 (m, 2H), 1.29 (d, J=6.8 Hz, 3H).

Compound 105 (Isomer 2): LCMS: C$_{16}$H$_{16}$F$_5$N$_3$ exact mass: 345.1; m/z 346.10 (M+1); $^1$H NMR: (MeOD, 400 MHz): δ 8.99 (d, J=8.0 Hz, 1H), 8.52 (d, J=4.0 Hz, 1H), 7.87 (s, 1H), 7.71-7.67 (m, 1H), 6.45 (s, 1H), 4.29-4.20 (m, 4H), 3.74-3.67 (m, 1H), 3.26-3.09 (m, 1H), 3.01 (bs, 1H) 1.29 (d, J=6.8 Hz, 3H).

Example 4: Synthesis of Compound 106

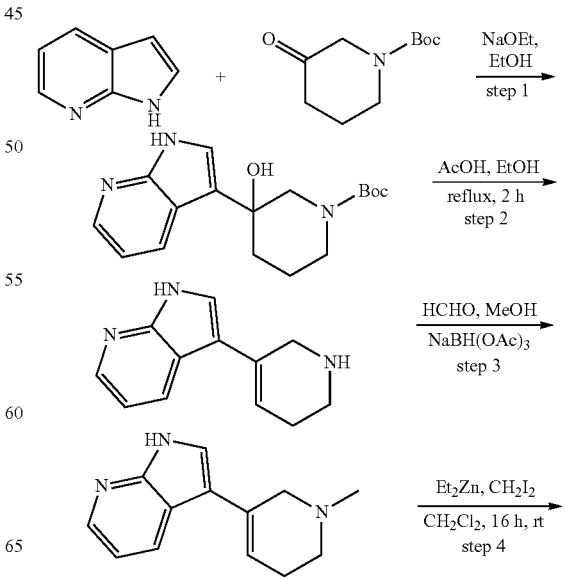

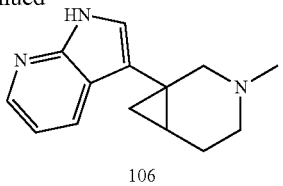

106

Step 1. Synthesis of tert-butyl-3-hydroxy-3-(1H-pyrrolo[2,3-b]pyridin-3-yl)piperidine-1-carboxylate. A solution of 1H-pyrrolo[2,3-b]pyridine (5 g, 42.32 mmol) and 1-Boc-3-piperidinone (8.43 g, 42.32 mmol) in EtOH (150 mL) was added to NaOEt prepared from NaH (10.0 g, 25.39 mmol) in ethanol (150 mL) at 0° C. The reaction mixture was stirred at rt for 16 h before being poured into sat. NaHCO₃ solution and extracted with EtOAc (3×500 mL). The combined organic extracts were dried over Na₂SO₄ and concentrated under reduced pressure. The crude product was purified by column chromatography (SiO₂ 230-400 mesh) eluting with EtOAc to afford the title compound as light pink solid (4 g, 30/a). LCMS: $C_{17}H_{23}N_3O_3$ exact mass: 317.2; m/z 318.12 (M+1).

Step 2. Synthesis of 3-(1,2,5,6-tetrahydropyridin-3-yl)-1H-pyrrolo[2,3-b]pyridine. A solution of tert-butyl-3-hydroxy-3-(1H-pyrrolo[2,3-b]pyridin-3-yl)piperidine-1-carboxylate (10 g) in EtOH (150 ml) was added to acetyl chloride (32 mL) EtOH (250 mL) at 0° C. The reaction mixture was stirred at 60° C. for 2 h before being concentrated under reduced pressure. The residue was poured into sat. NaHCO₃ solution and extracted with CH₂Cl₂ (3×500 mL). The combined organic extracts were dried over Na₂SO₄ and concentrated under reduced pressure to afford title compound as an off-white solid (6 g, 96%). LCMS: $C_{12}H_{13}N_3$ exact mass: 199.1; m/z 200.20 (M+1).

Step 3. Synthesis of 3-(1-methyl-1,2,5,6-tetrahydropyridin-3-yl)-1H-pyrrolo[2,3-b]pyridine. To a solution of 3-(1,2,5,6-tetrahydropyridin-3-yl)-1H-pyrrolo[2,3-b]pyridine (0.30 g, 1.50 mmol) in MeOH (3.0 mL) was added 37% HCHO in H₂O (0.27 g, 9.050 mmol) and sodium triacetoxyborohydride (1.27 g, 6.00 mmol). The resulting reaction mixture was stirred at rt for 16 h before being concentrated under reduced pressure. The resulting crude product was purified by reverse phase column chromatography (eluting with 46% MeCN in H₂O) to afford title compound as white solid (0.1 g, 31%). LCMS: $C_{13}H_{15}N_3$ exact mass: 213.1; m/z 214.1 (M+1).

Step 4. Synthesis of 3-(3-methyl-3-azabicyclo[4.1.0]heptan-1-yl)-1H-pyrrolo[2,3-b]pyridine. A mixture of diethyl zinc (1.15 g, 9.377 mmol) in CH₂Cl₂ (5 mL) and di-iodo methane (5.0 g, 18.75 mmol) was stirred at −78° C. for 1 h. To this mixture was added a solution of 3-(1-methyl-1,2,5,6-tetrahydropyridin-3-yl)-1H-pyrrolo[2,3-b]pyridine (0.5 g, 2.344 mmol) in CH₂Cl₂ (1 mL) at −78° C. dropwise. The reaction mixture was stirred at 60° C. for 16 h before being concentrated under reduced pressure. The crude product was purified by reverse phase column chromatography (eluting at 40% MeCN in H₂O) to afford title compound as white solid. This isolated material was further purified by Prep-HPLC (using 0.05% NH₃ in H₂O and 10% tert-butyl methyl ether in MeCN) to afford title compound as white solid (0.1 g, 6%). LCMS: $C_{14}H_{17}N_3$ exact mass: 227.1; m/z 228.2 (M+1); ¹H NMR: (MeOD, 400 MHz) δ 8.99-8.89 (m, 1H), 8.47 (d, J=5.2 Hz, 1H), 7.79-7.74 (m, 1H), 7.67-7.65 (m, 1H), 4.06-3.91 (m, 1H), 3.75-3.66 (m, 1H), 3.49-3.43 (m, 1H), 3.41-3.32 (m, 1H), 3.23-3.15 (m, 1H), 2.94 (s, 3H), 2.75-2.71 (m, 1H), 2.30-2.27 (m, 1H), 1.76 (bs, 1H), 1.41-1.29 (m, 2H).

Example 5: Synthesis of Compound 107

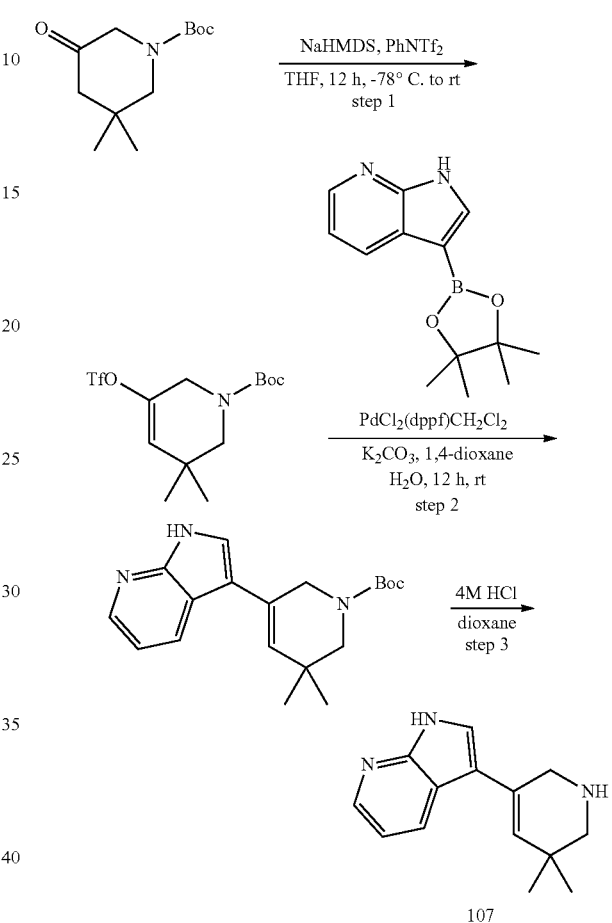

Step 1. Synthesis of tert-butyl 3,3-dimethyl-5-(((trifluoromethyl)sulfonyl)oxy)-3,6-dihydropyridine-1(2H)-carboxylate. To a solution of 1-Boc-5,5-dimethyl-3-piperidone (1.0 g, 4.40 mmol) in THF (15 mL) was added NaHMDS (1.19 mL, 6.16 mmol) at −78° C. and stirred for 15 min before adding N-Phenyl-bis(trifluoromethanesulfonimide) (1.54 g, 4.71 mmol). Stirring continued rt for 12 h before quenching with sat. NH₄Cl solution and extracting with EtOAc (3×100 mL). The combined organic extracts were dried over Na₂SO₄ and concentrated under reduced pressure to afford title compound as yellow solid (1.5 g, 95%) which was directly used for next step without further purification.

Step 2. Synthesis of tert-butyl-3,3-dimethyl-5-(1H-pyrrolo[2,3-b]pyridin-3-yl)-3,6-dihydro-pyridine-1(2H)-carboxylate. To a solution of tert-butyl-3,3-dimethyl-5-(((trifluoro-methyl)-sulfonyl)oxy)-3,6-dihydropyridine-1(2H)-carboxylate (1.5 g, 4.17 mmol) in 12 mL dioxane:H₂O (1:1) was added 7-azaindole-3-boronic acid pinacol ester (0.40 g, 1.67 mmol) and K₂CO₃ (1.72 g, 12.5 mmol) at rt and was purged with N2 for 30 min. Pd(dppf)Cl₂·CH₂Cl₂ (0.17 g, 0.20 mmol) was added and stirred at 100° C. for 12 h before being poured into H₂O and extracted with EtOAc (3×100 mL). The combined organic extracts were dried over Na₂SO₄ and concentrated under reduced pressure. The crude product was purified by column chromatography (50% EtOAc in hexane) to afford the title compound as brown liquid (0.3 g, 22%). LCMS: $C_{19}H_{25}N_3O_2$ exact mass: 327.2; 328.2 (M+1).

Step 3. Synthesis of 3-(5,5-dimethyl-1,2,5,6-tetrahydropyridin-3-yl)-1H-pyrrolo[2,3-b]pyridine hydrochloride. To a solution of tert-butyl-3,3-dimethyl-5-(1H-pyrrolo[2,3-b]pyridin-3-yl)-3,6-dihydropyridine-1(2H)-carboxylate (0.10 g, 0.30 mmol) in dioxane (2.0 mL) was added 4M HCl in dioxane (2.0 mL). The mixture was stirred at rt for 3 h before being concentrated under reduced pressure. The residue was triturated using pentane and diethyl ether to afford light brown solid which was further purified by prep-HPLC (using 0.05% HCl in H₂O:MeCN) to afford the title compound as off-white solid (0.035 g, 17%). LCMS: $C_{14}H_{17}N_3$ exact mass: 227.1; 228.2 (M+1); ¹H NMR (MeOD, 400 MHz) δ 8.89 (d, J=8.0 Hz, 1H), 8.48 (d, J=5.6 Hz, 1H), 7.87 (s, 1H), 7.64-7.61 (m, 1H), 6.34 (s, 1H), 4.10 (s, 2H), 3.28 (s, 2H), 1.37 (s, 6H).

Example 6: Synthesis of Compound 108

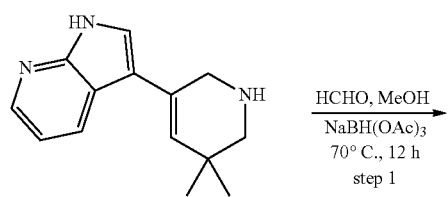

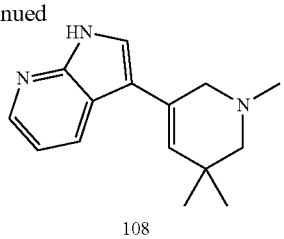

108

Step 1. Synthesis of 3-(1,5,5-trimethyl-1,2,5,6-tetrahydropyridin-3-yl)-1H-pyrrolo[2,3-b]pyridine hydrochloride. To a solution of 3-(5,5-dimethyl-1,2,5,6-tetrahydropyridin-3-yl)-1H-pyrrolo[2,3-b]pyridine hydrochloride (0.15 g, 0.66 mmol) in MeOH (3.0 mL) was added 37% HCHO in water (1.19 mL, 5.28 mmol) and stirred at 70° C. for 2 h before adding sodium triacetoxyborohydride (0.55 g, 2.6 mmol) with continued stirring at 70° C. for 12 h. The reaction mixture was quenched with sat. NaHCO₃ solution, extracted with EtOAc (3×25 mL), and the combined organic extracts were dried over Na₂SO₄ and concentrated under reduced pressure. The crude product was purified by prep-HPLC (using 0.05% HCl in H₂O in MeCN) to afford title compound as pale-yellow solid (0.009 g, 4%). LCMS: $C_{15}H_{19}N_3$ exact mass: 241.2; m/z 242.2 (M+1); ¹H NMR (MeOD, 400 MHz) δ 8.87 (d, J=8.0 Hz, 1H), 8.48 (d, J=5.2 Hz, 1H), 7.86 (s, 1H), 7.62-7.59 (m, 1H), 4.38-4.34 (m, 1H), 4.10-4.02 (m, 1H), 3.55-3.50 (m, 1H), 3.28-3.24 (s, 1H), 3.13 (s, 3H), 1.41 (s, 3H), 1.31 (s, 3H).

Example 7: Synthesis of Compounds 132 and 133

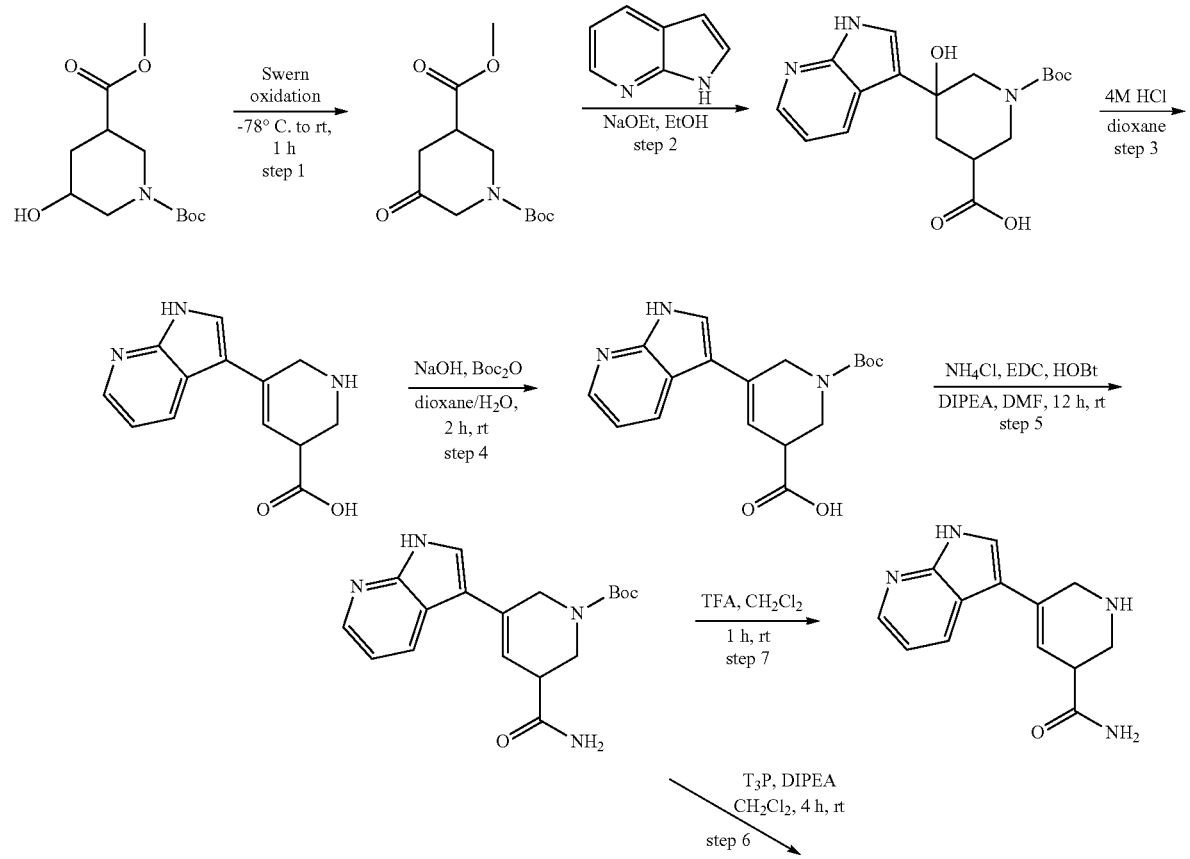

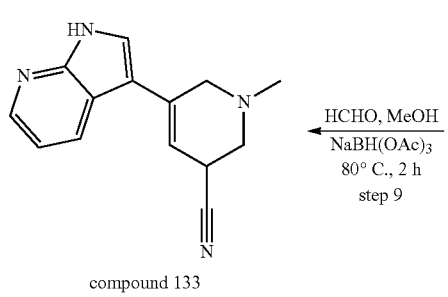

compound 133

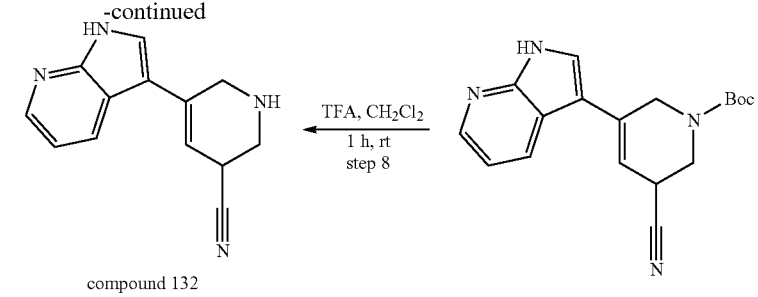

compound 132

Step 1. Synthesis of 1-(tert-butyl)-3-methyl-5-oxopiperidine-1,3-dicarboxylate. To a solution of (COCl)₂ (1.63 mL, 19.08 mmol) in CH₂Cl₂ (20 mL) was slowly added DMSO (3.08 mL, 43.38 mmol) at −78° C. After 30 min, a solution 1-(tert-butyl)-3-methyl-5-hydroxypiperidine-1,3-dicarboxylate (4.5 g, 17.35 mmol) in CH₂Cl₂ (30 mL) was added over 10 min followed by the dropwise addition of TEA (12.08 ml, 86.75 mmol). The reaction mixture was slowly allowed to warm to rt and stirred for an additional 1 h. before being diluted with H₂O and extracted with CH₂Cl₂ (3×150 mL). The combined organic extracts were dried over Na₂SO₄, filtered, and concentrated under reduced pressure. The crude product was purified by column chromatography (SiO₂ 230-400 mesh) eluting with 34% EtOAc in hexane to afford the title compound as pale-yellow solid (4.5 g, 99%). LCMS: $C_{12}H_{19}NO_5$ exact mass: 257.1; m/z 202 (M−56).

Step 2. Synthesis of 1-(tert-butoxycarbonyl)-5-hydroxy-5-(1H-pyrrolo[2,3-b]pyridin-3-yl) piperidine-3-carboxylic acid. To a stirred solution of 1H-pyrrolo[2,3-b]pyridine (8.5 g, 33.00 mmol, 1.0 eq.) in EtOH (40 mL) was added 1-(tert-butyl)-3-methyl-5-oxopiperidine-1,3-dicarboxylate (3.89 g, 33.0 mmol, 1.5 eq.) and 21% NaOEt in EtOH (40 mL). The resulting reaction mixture was stirred at ambient temperature for 12 h before being diluted with 10% citric acid solution and extracted with EtOAc (3×150 mL). The combined organic extracts were dried over Na₂SO₄, filtered, and concentrated under reduced pressure to afford the title compound as pale-yellow solid (9.0 g, 75%). LCMS: $C_{18}H_{23}N_3O_5$ exact mass: 361.2; m/z 362.35 (M+1).

Step 3. Synthesis of 5-(1H-pyrrolo[2,3-b]-pyridin-3-yl)-1,2,3,6-tetrahydropyridine-3-carboxylic acid hydrochloride. To a stirred solution of as 1-(tert-butoxycarbonyl)-5-hydroxy-5-(1H-pyrrolo[2,3-b]pyridin-3-yl) piperidine-3-carboxylic acid (9.0 g, 24.90 mmol) in dioxane (90 mL) was added 4M HCl. The reaction mixture was stirred at rt for 16 h before being concentrated under reduced pressure to afford the title compound as yellow solid (8.0 g, 99%) LCMS: $C_{13}H_{13}N_3O_2$ exact mass: 243.1; m/z 244.22 (M+1).

Step 4. Synthesis of 1-(tert-butoxycarbonyl)-5-(1H-pyrrolo[2,3-b]pyridin-3-yl)-1,2,3,6 tetrahydropyridine-3-carboxylic acid. To a stirred solution of as 5-(1H-pyrrolo[2,3-b]pyridin-3-yl)-1,2,3,6-tetrahydropyridine-3-carboxylic acid hydrochloride (8.0 g, 32.8 mmol) in dioxane:water (40 mL: 40 mL) was added NaOH (3.94 g, 98.6 mmol) followed by Boc-anhydride (14.30 mL, 65.6 mmol). The resulting reaction mixture was stirred at ambient temperature for 2 h before being concentrated under reduced pressure. The crude product was purified by reverse phase column chromatography (Cis silica, 33% of 0.1% formic acid in ACN) to afford title compound as yellow solid. (3.0 g, 26%). LCMS: $C_{18}H_{21}N_3O_4$ exact mass: 343.2; m/z 344.20 (M+1).

Step 5. Synthesis of tert-butyl-3-carbamoyl-5-(1H-pyrrolo[2,3-b]pyridin-3-yl)-3,6-dihydro-pyridine-1(2H)-carboxylate. To a stirred solution of as 1-(tert-butoxycarbonyl)-5-(1H-pyrrolo[2,3-b]pyridin-3-yl)-1,2,3,6-tetrahydropyridine-3-carboxylic acid (3.0 g, 8.73 mmol) in DMF (30 mL) was added DIPEA (5.62 g, 43.68 mmol), NH₄Cl (6.95 g, 130.9 mmol), EDC·HCl (8.34 g, 43.68 mmol) and HOBt (5.89 g, 43.68 mmol). The resulting reaction mixture was stirred at rt for 12 h before being diluted with 10% citric acid solution and extracted with EtOAc (3×150 mL). The combined organic extracts were dried over Na₂SO₄, filtered and concentrated under reduced pressure to afford the title compound as pale-yellow solid (1.2 g, 40%). LCMS: $C_{18}H_{22}N_4O_3$ exact mass: 342.2; m/z 362.35 (M+1)

Step 6. Synthesis of tert-butyl 3-cyano-5-(1H-pyrrolo[2,3-b]pyridin-3-yl)-3,6-dihydropyridine-1(2H)-carboxylate. To a stirred solution of tert-butyl-3-carbamoyl-5-(1H-pyrrolo[2,3-b]pyridin-3-yl)-3,6-dihydropyridine-1(2H)-carboxylate (1.2 g, 3.50 mmol) in DMF (12 mL) was added DIPEA (2.70 g, 21.0 mmol) and T₃P (16.6 g, 52.6 mmol). The resulting reaction mixture was stirred at room temperature for 4 h before being diluted with 10% citric acid solution and extracted with EtOAc (3×150 mL). The combined organic extracts were dried over Na₂SO₄, filtered and concentrated under reduced pressure to afford the title compound as pale-yellow solid. (0.5 g, 44%). LCMS: $C_{18}H_{20}N_4O_2$ exact mass: 324.2; m/z 325.1 (M+1).

Step 7. Synthesis of 5-(1H-pyrrolo[2,3-b]pyridin-3-yl)-1,2,3,6-tetrahydropyridine-3-carboxamide. To a stirred solution of tert-butyl-3-carbamoyl-5-(1H-pyrrolo[2,3-b]pyridin-3-yl)-3,6-dihydropyridine-1(2H)-carboxylate (0.1 g, 0.291 mmol, 1 eq.) in DCM (2 mL) was added TFA (1.0 mL, 10 v). The resulting reaction mixture was stirred at room temperature for 1 h before removing the solvent under reduced pressure. The crude product was triturated using n-pentane and diethyl ether to afford the title compound yellow solid (0.70 g, 99.04%). LCMS: $C_{13}H_{14}N_4O$ exact mass: 242.1; m/z 243.2 (M+1). ¹H NMR (400 MHz, MeOD), δ 11.96 (s, 1H), 9.59 (bs, 1H), 8.80 (bs, 1H), 8.29-8.24 (m, 2H), 7.91 (s, 1H), 7.75-7.74 (d, J=2.4 Hz, 2H), 7.38 (s, 1H), 7.20-7.17 (m, 1H), 6.47-6.46 (d, J=4.0 Hz, 1H), 3.98 (s, 2H), 3.53 (s, 1H), 3.48-3.44 (m, 1H), 3.30-3.28 (m, 1H).

Step 8. Synthesis of 5-(1H-pyrrolo[2,3-b]pyridin-3-yl)-1,2,3,6-tetrahydropyridine-3-carbonitrile. To a stirred solution of tert-butyl-3-cyano-5-(1H-pyrrolo[2,3-b]pyridin-3-yl)-3,6-dihydropyridine-1(2H)-carboxylate (0.2 g) in DCM (2 mL) was added TFA (0.5 mL). The resulting reaction mixture was stirred at RT for 1 h before concentrating under reduced pressure. The crude product was triturated using n-pentane and diethyl ether to afford the title compound as yellow solid (0.014 g, 10%). LCMS: $C_{13}H_{12}N_4$ exact mass: 224.1; m/z 225.2 (M+1). ¹H NMR (400 MHz, MeOD), δ 8.41-8.39 (d, J=7.6 Hz, 1H), 8.33-8.32 (d, J=4.4 Hz, 1H), 7.71 (s, 1H), 7.32-7.28 (m, 1H), 6.43 (s, 1H), 4.27-4.17 (m, 3H), 3.78-3.76 (d, J=5.6 Hz, 2H).

Step 9. Synthesis of 1-methyl-5-(1H-pyrrolo[2,3-b]pyridin-3-yl)-1,2,3,6-tetrahydropyridine-3-carbonitrile. To a stirred solution of 5-(1H-pyrrolo[2,3-b]pyridin-3-yl)-1,2,3,6-tetrahydropyridine-3-carbonitrile (0.4 g, 17.83 mmol) in MeOH (4 mL) at room temperature was added 37% HCHO (0.160 g, 5.32 mmol) and sodium triacetoxyborohydride (1.13 g, 5.35 mmol). The reaction mixture was stirred at 80° C. for 2 h before concentrating under reduced pressure. The crude product was purified by prep-HPLC to give the title compound as white solid (0.070 g, 17%). LCMS: $C_{11}H_{14}N_4$ exact mass: 238.1; m/z 239.25 (M+1). HPLC: 5.77 min, $^1$H NMR (400 MHz, MeOD), δ 8.31-8.29 (d, J=8.0 Hz, 1H), 8.25-8.24 (d, J=4.8 Hz, 1H), 7.56 (S, 1H), 7.22-7.19 (m, 1H), 6.19-6.18 (m, 1H), 3.82-3.81 (m, 1H), 3.56-3.52 (m, 1H), 2.95-2.90 (m, 2H), 2.53 (s, 3H).

Example 8: Synthesis of Compounds 140 and 141

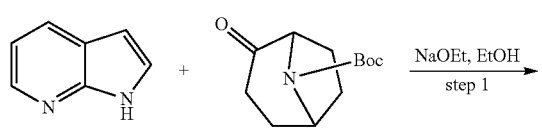

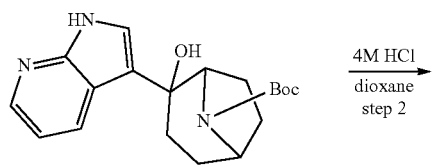

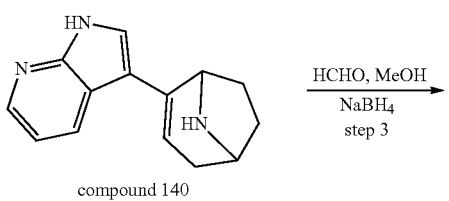

compound 140

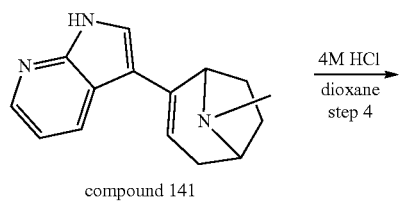

compound 141

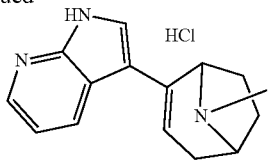

Step 1. Synthesis of tert-butyl-2-hydroxy-2-(1H-pyrrolo[2,3-b]pyridin-3-yl)-8-azabicyclo-[3.2.1]octane-8-carboxylate. To a stirred solution of 1H-pyrrolo[2,3-b]pyridine (1.04 g, 8.80 mmol) in EtOH (5 mL) was added tert-butyl-2-oxo-8-azabicyclo[3.2.1]octane-8-carboxylate (0.5 g, 2.20 mmol) and NaOEt (5 mL). The reaction mixture was stirred at ambient temperature for 12 h before being diluted with water and extracted with EtOAc (3×200 mL). The combined organic extracts were dried over $Na_2SO_4$ and concentrated under reduced pressure. The resulting crude was purified by column chromatography ($SiO_2$ 230-400 mesh 35% EtOAc in hexane) to yield the title compound as a white solid (0.30 g, 21%). LCMS: $C_{19}H_{25}N_3O_3$ exact mass: 343.2; m/z 344.2 (M+1).

Step 2. Synthesis of 3-(8-azabicyclo[3.2.1]oct-2-en-2-yl)-1H-pyrrolo[2,3-b]pyridine. To a stirred solution of tert-butyl 2-hydroxy-2-(1H-pyrrolo[2,3-b]pyridin-3-yl)-8-azabicyclo[3.2.1]-octane-8-carboxylate (0.06 g) in 1,4-dioxan (2.0 mL) was added 4M HCl in dioxan (1.50 mL). The reaction mixture was stirred at 90° C. for 2 h before removing the solvent under reduced pressure. The resulting crude product was triturated using n-pentane and diethyl ether to afford title compound as white solid (0.033 g, 83%). LCMS: $C_{14}H_{15}N_3$ exact mass: 225.1; m/z 226.2 (M+1); $^1$H NMR (MeOD, 400 MHz) δ 8.92 (d, J=8.0 Hz, 1H), 8.50 (d, J=5.6 Hz, 1H), 7.94 (s, 1H), 7.66-7.62 (m, 1H), 6.31 (s, 1H), 4.79 (s, 1H), 4.31 (d, 1H), 3.08-3.03 (m, 1H), 2.71 (s, 1H), 2.55-2.49 (m, 1H), 2.38-2.34 (m, 2H), 2.10-2.08 (m, 1H).

Step 3. Synthesis of 3-(8-methyl-8-azabicyclo[3.2.1]oct-2-en-2-yl)-1H-pyrrolo[2,3-b]pyridine. To a solution of 3-(8-azabicyclo[3.2.1]oct-2-en-2-yl)-1H-pyrrolo[2,3-b]pyridine (0.20 g, 0.88 mmol) in MeOH (2.0 mL) was added 37% HCHO in water (0.32 g, 3.55 mmol) and sodium borohydride (0.10 g, 2.64 mmol). The reaction mixture was stirred at room temperature for 1 h before being diluted with sat. $NaHCO_3$ solution and extracted with $CH_2Cl_2$ (3×30 mL). The combined organic extracts were dried over $Na_2SO_4$ and concentrated under reduced pressure. The resulting crude product was subjected to prep-HPLC purification (using 0.05% $NH_3$ in $H_2O$ and MeCN) to afford the title compound as a white solid (0.04 g, 19%). LCMS: $C_{15}H_{17}N_3$ exact mass: 239.1; 240.2 (M+1).

Step 4. Synthesis of 3-(8-methyl-8-azabicyclo[3.2.1]oct-2-en-2-yl)-1I-pyrrolo[2,3-b]pyridine hydrochloride. To a stirred solution of 3-(8-methyl-8-azabicyclo[3.2.1]oct-2-en-2-yl)-1I-pyrrolo[2,3-b]pyridine (0.04 g) in 1,4-dioxane (1.5 mL) was added 4M HCl in dioxan (1.0 mL). The reaction mixture was stirred at room temperature for 30 min before the solvent was removed under reduced pressure. The resulting crude product was triturated with n-pentane and diethyl ether to afford the title compound as a light brown solid (0.053 g). LCMS: $C_{15}H_{17}N_3$ exact mass: 239.1; m/z 240.2 (M+1); $^1$H NMR (MeOD, 400 MHz) δ 8.97 (t, J=4.0 Hz, 1H), 8.51 (d, J=5.6 Hz, 1H), 7.96 (s, 1H), 7.68-7.64 (t, J=5.6 Hz, 1H), 6.32 (d, J=1.6 Hz, 1H), 4.70 (s, 1H), 4.15 (s, 1H), 3.13 (m, 1H), 3.08 (s, 1H), 2.98 (s, 3H), 2.63-2.53 (m, 4H), 2.39-2.34 (m, 1H), 2.16-2.15 (m, 1H).

Example 9: Synthesis of Compounds 142, 143, and 144

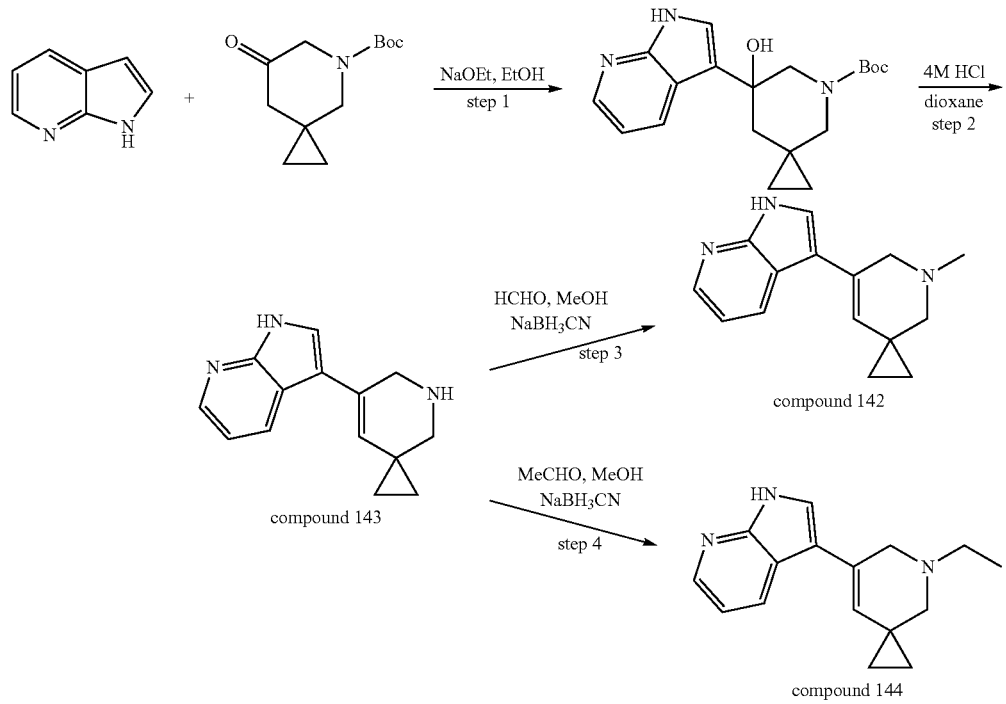

Step 1. Synthesis of tert-butyl-7-hydroxy-7-(1H-pyrrolo[2,3-b]pyridin-3-yl)-5-azaspiro [2.5]octane-5-carboxylate. To a stirred solution of 1H-pyrrolo[2,3-b]pyridine (1.04 g, 8.87 mmol) and tert-butyl-7-oxo-5-azaspiro[2.5]octane-5-carboxylate (0.5 g, 2.21 mmol) in EtOH (5.0 mL) was added 21% NaOEt in EtOH (5.0 mL). The reaction mixture was stirred at rt for 5 h before being diluted with water and extracted with EtOAc (3×80 mL). The combined organic extracts were dried over $Na_2SO_4$ and concentrated under reduced pressure. The resulting crude product was purified by column chromatography ($SiO_2$ 230-400 mesh) eluting with EtOAc to afford title compound as a white solid (0.32 g, 22%). LCMS: $C_{19}H_{25}N_3O_3$ exact mass: 343.2; m/z 344.2 (M+1).

Step 2. Synthesis of 3-(5-azaspiro[2.5]oct-7-en-7-yl)-1H-pyrrolo[2,3-b]pyridine hydrochloride. To a stirred solution of tert-butyl-7-hydroxy-7-(1H-pyrrolo[2,3-b]pyridin-3-yl)-5-aza-spiro[2.5]octane-5-carboxylate (0.32 g, 0.93 mmol) in dioxane (2.0 mL) was added 4M HCl in dioxane (5.0 mL). The reaction mixture was stirred at 80° C. for 3 h before removing the solvent under reduced pressure. The crude product was triturated with n-pentane and diethyl ether to afford title compound as an orange solid (0.20 g, 95%) LCMS: $C_{14}H_{15}N_3$ exact mass: 225.1; m/z 226.1 (M+1); $^1$H NMR: (DMSO, 400 MHz) δ 9.48 (s, 1H), 8.36 (d, J=7.6 Hz, 1H), 8.29 (d, J=4.4 Hz, 1H), 7.73 (s, 1H), 7.18 (d, J=2.4 Hz, 1H), 3.14 (s, 2H), 2.59-2.50 (m, 2H), 0.95-0.91 (m, 4H).

Step 3. Synthesis of 3-(5-methyl-5-azaspiro[2.5]oct-7-en-7-yl)-1H-pyrrolo[2,3-b]pyridine dihydrochloride. To a solution of 3-(5-azaspiro[2.5]oct-7-en-7-yl)-1H-pyrrolo[2,3-b]pyridine hydrochloride (0.1 g, 0.44 mmol) in MeOH (1.0 mL) was added 37% HCHO in water (0.14 mL, 1.77 mmol) and sodium cyanoborohydride (0.08 g, 1.33 mmol). The reaction mixture was stirred at 90° C. for 2 h before removing the solvent under reduced pressure. The resulting crude product was purified by prep-HPLC (using 0.05% HCl in $H_2O$ and MeCN) to yield title compound as a pale yellow solid (0.035 g, 25%) LCMS: $C_{15}H_{17}N_3$ exact mass: 239.1; m/z 240.2 (M+1); $^1$H NMR: (DMSO, 400 MHz) δ 12.06 (s, 1H), 10.71 (s, 1H), 8.37 (d, J=8.0 Hz, 1H), 8.29 (d, J=4.0 Hz), 7.67 (d, J=2.4 Hz, 1H), 7.22-7.10 (m, 1H), 5.92 (s, 1H), 4.37-4.33 (m, 1H), 4.04 (s, 1H), 3.39-3.34 (m, 1H), 3.18-3.15 (m, 1H), 2.92 (d, 3H), 1.23 (s, 1H), 1.06-1.01 (s, 3H).

Step 4. Synthesis of 3-(5-ethyl-5-azaspiro[2.5]oct-7-en-7-yl)-1H-pyrrolo[2,3-b]pyridine. To a stirred solution of 3-(5-azaspiro[2.5]oct-7-en-7-yl)-1H-pyrrolo[2,3-b]pyridine (0.12 g, 0.53 mmol) in MeOH (1.2 mL) was added acetaldehyde (0.093 g, 2.13 mmol) and sodium cyanoborohydride (0.1 g, 1.59 mmol). The resulting reaction mixture was stirred at 80° C. for 2 h before removing the solvent under reduced pressure. The crude product was quenched with sat. $NaHCO_3$ solution and extracted with $CH_2Cl_2$ (3×20 mL). The combined organic extracts were dried over $Na_2SO_4$, filtered, and concentrated under reduced pressure. The resulting crude material was purified by column chromatography ($SiO_2$ 230-400 mesh) eluting with 13% MeOH in $CH_2Cl_2$ to afford the title compound as an off-white solid (0.11 g, 82%) which was converted into the HCl salt as follows. To a stirred solution of 3-(5-ethyl-5-azaspiro[2.5]oct-7-en-7-yl)-1H-pyrrolo[2,3-b]pyridine (0.1 g, 0.395 mmol) in dioxane (1.0 mL) was added 4M HCl in dioxane (1.0 mL) and the resulting reaction mixture was stirred at room temperature for 1 h before concentrating under reduced pressure. The crude product was purified by prep-HPLC to afford title compound as a yellow solid (0.039 g, 31%). LCMS: $C_{13}H_{19}N_3$ exact mass: 253.16; m/z 254.3 (M+1); $^1$H NMR (DMSO, 400 MHz) δ 12.13 (s, 1H), 10.61 (s, 1H), 8.40-8.38 (d, J=7.2 Hz, 1H), 8.31-8.30 (d, J=4.4 Hz, 1H), 7.78 (s, 1H), 7.21-7.17 (m, 1H), 5.94 (s, 1H), 4.32-4.28

(m, 1H), 4.05-3.99 (m, 1H), 3.38-3.33 (m, 1H), 3.30-3.25 (m, 1H), 3.23-3.15 (m, 1H), 1.38-1.34 (t, J=8 Hz, 3H), 1.04 (m, 1H), 0.94 (m, 3H).

Example 10: Synthesis of Compounds 145 and 146

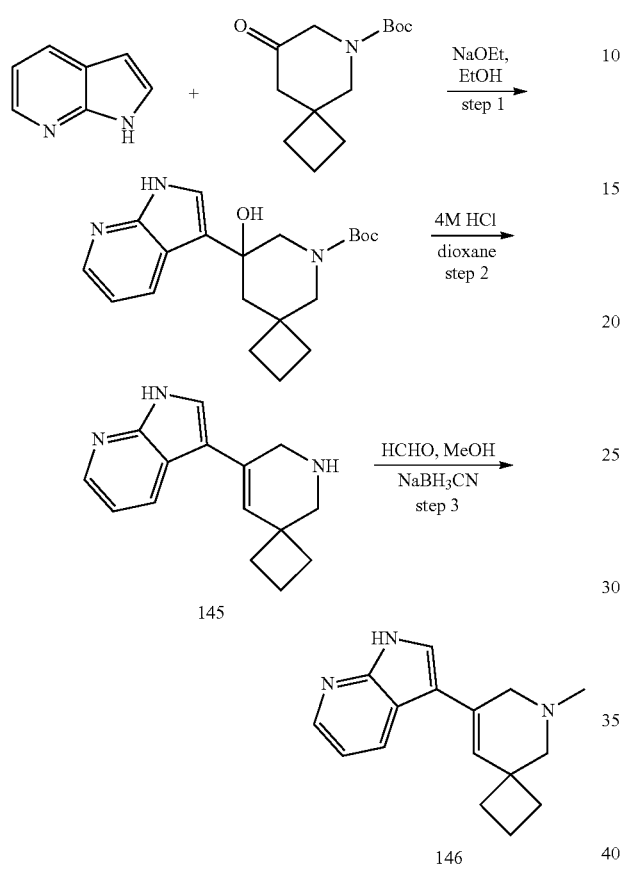

145

146

Step 1. Synthesis of tert-butyl-8-hydroxy-8-(1H-pyrrolo[2,3-b]pyridin-3-yl)-6-azaspiro[3.5]nonane-6-carboxylate. To a stirred solution of 1H-pyrrolo[2,3-b]pyridine (0.5 g, 4.23 mmol) and tert-butyl-8-oxo-6-azaspiro[3.5]nonane-6-carboxylate (1.01 g, 4.23 mmol) in ethanol (5.0 mL) was added 21% NaOEt in ethanol (5.0 mL). The resulting reaction mixture was stirred at rt for 5 h before the reaction mixture was diluted with water and extracted with EtOAc (3×80 mL). The combined organic extracts were dried over Na$_2$SO$_4$ and concentrated under reduced pressure. The crude product was purified by column chromatography (SiO$_2$ 230-400 mesh) eluting with EtOAc to afford title compound as white solid (0.44 g, 29%). LCMS: C$_{20}$H$_{27}$N$_3$O$_3$ exact mass: 357.21; m/z 358.2 (M+1).

Step-2. Synthesis of 3-(6-azaspiro[3.5]non-8-en-8-yl)-1H-pyrrolo[2,3-b]pyridine. To a stirred solution of tert-butyl-8-hydroxy-8-(1H-pyrrolo[2,3-b]pyridin-3-yl)-6-azaspiro[3.5]nonane-6-carboxylate (0.08 g, 0.22 mmol, 1.0 eq.) in CH$_2$Cl$_2$ (1.0 mL) was added 4M HCl in dioxane (1.0 mL) at 0° C. and the resulting reaction mixture was stirred at rt for 24 h before removing the solvent under reduced pressure. The crude product was purified by prep-HPLC to afford the title compound as an orange solid (0.02 g, 37%). LCMS: C$_{15}$H$_{17}$N$_3$ exact mass: 239.14; m/z 240.2 (M+1); $^1$H NMR (DMSO, 400 MHz) δ 8.95 (dd, J=8.4 Hz, 1.2 Hz, 1H), 8.49 (dd, J=5.6 Hz, 0.8 Hz, 1H), 7.86 (s, 1H), 7.66-7.62 (m, 1H), 6.71 (s, 1H), 4.08 (s, 2H), 3.54 (s, 2H), 2.41-2.34 (m, 2H), 2.26-2.19 (m, 2H), 2.16-2.12 (m, 2H).

Step-3. Synthesis of 3-(6-methyl-6-azaspiro[3.5]non-8-en-8-yl)-1H-pyrrolo[2,3-b]pyridine dihydrochloride. To a solution of 3-(6-azaspiro[3.5]non-8-en-8-yl)-1H-pyrrolo[2,3-b]pyridine (0.34 g, 1.42 mmol) in MeOH (3.4 mL) was added 37% HCHO in water (0.17 g, 5.69 mmol) and sodium cyanoborohydride (0.16 g, 4.26 mmol). The resulting reaction mixture was stirred at rt for 5 h before diluting with water and extracting with EtOAc (3×80 mL). The combined organic extracts were dried over Na$_2$SO$_4$ and concentrated under reduced pressure. The resulting crude product was purified by prep-HPLC (using 0.05% HCl in H$_2$O and MeCN) to yield the title compound as pale-yellow solid (0.041 g, 11%). LCMS: C$_{16}$H$_{19}$N$_3$ exact mass: 253.16; m/z 254.2 (M+1); $^1$H NMR (DMSO, 400 MHz) δ 8.94 (d, J=7.2 Hz, 1H), 8.49 (d, J=5.2 Hz, 1H), 7.86 (s, 1H), 7.65-7.61 (m, 1H), 6.73 (s, 1H), 4.35-4.31 (m, 1H), 4.04-4.00 (m, 1H), 3.97-3.94 (m, 1H), 3.35-3.33 (m, 1H), 3.12 (s, 3H), 2.44-2.42 (m, 1H), 2.39-2.36 (m, 2H), 2.20-2.11 (m, 3H).

Example 11: Synthesis of Compound 147

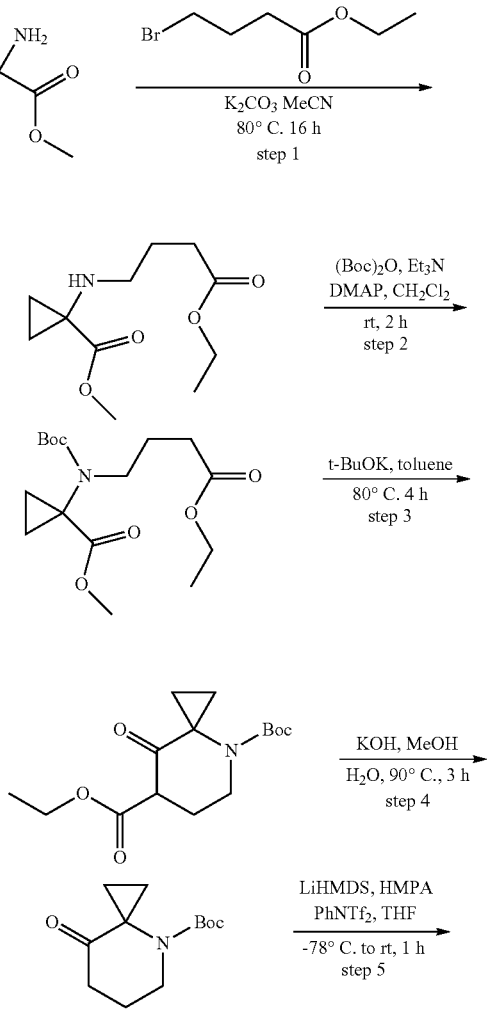

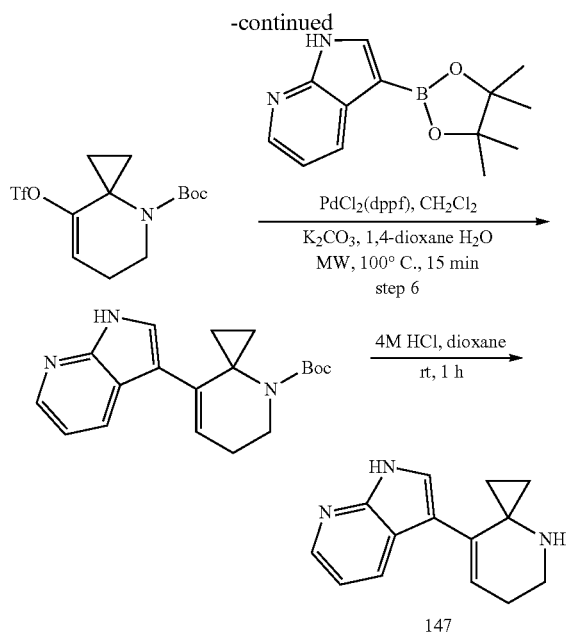

147

Step 1. Synthesis of methyl 1-((4-ethoxy-4-oxobutyl) amino)cyclopropane-1-carboxylate. To a stirred solution of methyl 1-aminocyclopropane-1-carboxylate hydrochloride (10 g, 86.9 mmol, 1.0 eq.) in MeCN (10 mL) was added $K_2CO_3$ (17.99 g, 130.4 mmol, 1.5 eq.). The reaction mixture was stirred at room temperature for 15 min before adding ethyl bromo butyrate (18.64 g, 95.5 mmol, 1.1 eq.). Stirring continued at 80° C. for 16 h before the reaction mixture was filtered through a celite pad and the pad washed with MeCN (3×100 mL). The filtrate was concentrated under a reduced pressure and the resulting crude product was purified by column chromatography ($SiO_2$, 60-120 mesh) eluting with 8% EtOAc in hexane to afford the titled compound as a yellow liquid (5.5 g, 28%). LCMS: $C_{11}H_{19}NO_4$ exact mass: 229.13; m/z 230 (M+H); $^1$H NMR (400 MHz, $CDCl_3$) δ 4.16-4.11 (q, 2H), 3.69 (s, 3H), 2.76-2.73 (t, J=7.2 Hz, 2H), 2.37-3.33 (t, J=7.2 Hz, 2H), 1.79-1.74 (m, 2H), 1.29-1.25 (m, 5H), 0.99-0.96 (m, 2H).

Step 2. Synthesis of methyl 1-((tert-butoxycarbonyl)-(4-ethoxy-4-oxobutyl)amino)cyclopropane-1-carboxylate. To a stirred solution of 1-((4-ethoxy-4-oxobutyl)amino)cyclopropane-1-carboxylate (4.5 g, 19.5 mmol) in $CH_2Cl_2$ (45 mL) was added triethylamine (4.07 mL, 29.3 mmol) dropwise under N2 atmosphere at room temperature. The resulting reaction mixture was stirred for 2 h before adding DMAP (0.237 g, 1.95 mmol) and di-tert-butyl decarbonate (12.75 g, 58.5 mmol). After completion of the reaction, the mixture was diluted with water (100 mL) and extracted with $CH_2Cl_2$ (3×50 mL). The combined extracts were dried over $Na_2SO_4$, filtered, and concentrated under reduced pressure. The resulting crude product was purified by column chromatography ($SiO_2$ 60-120 mesh) eluting with 6% EtOAc in hexane to afford the title compound as a yellow liquid (2.5 g, 38.67%). LCMS: $C_{16}H_{27}NO_6$ exact mass: 329.18; m/z 230 (M−100); $^1$H NMR (400 MHz, $CDCl_3$) δ 4.17-4.11 (m, 2H), 3.70 (br s, 3H), 3.30-3.26 (t, J=8.0 Hz, 2H), 2.35-2.31 (t, J=7.2 Hz, 1H), 1.90 (br s, 2H), 1.44 (s, 9H), 1.28-1.23 (m, 6H).

Step 3. Synthesis of methyl 4-(tert-butyl) 7-ethyl 8-oxo-4-azaspiro[2.5]octane-4,7-dicarboxylate. To a stirred solution of 1-((tert-butoxycarbonyl)-(4-ethoxy-4-oxobutyl) amino)-cyclopropane-1-carboxylate (2.5 g, 7.59 mmol) in toluene (25 mL) was added potassium tert-butoxide (1.7 g, 15.19 mmol) at rt. The reaction mixture was stirred at 80° C. for 2 h before diluting with water (20 mL) and extracting with EtOAc (3×20 mL). The combined extracts were dried over $Na_2SO_4$, filtered and concentrated under a reduced pressure to afford the title compound as a yellow liquid (1.6 g, 26.20%). LCMS: $C_{15}H_{23}NO_5$ exact mass: 297.16; m/z 198 (M−100).

Step 4. Synthesis of tert-butyl 8-oxo-4-azaspiro [2.5] octane-4-carboxylate. To a stirred solution of methyl 4-(tert-butyl) 7-ethyl 8-oxo-4-azaspiro [2.5] octane-4,7-dicarboxylate (1.5 g, 5.05 mmol) at rt in MeOH:$H_2O$ (12:3 mL) was added potassium hydroxide (0.7 g, 12.62 mmol). The resulting reaction mixture was stirred at 90° C. for 2 h before concentrating under reduced pressure. The resulting crude product was purified by column chromatography ($SiO_2$ 60-120 mesh) eluting with 15% EtOAc in hexane to afford the titled compound as a yellow liquid (0.5 g, 44%). LCMS: $C_{12}H_{19}NO_3$ exact mass: 225.14; m/z 126 (M−100); $^1$H NMR (400 MHz, DMSO) δ 3.59-3.56 (t, J=6.8 Hz, 2H), 2.36-2.33 (t, J=6.8 Hz, 2H), 2.01-1.94 (m, 2H), 1.39 (s, 9H), 1.26-1.25 (m, 2H), 1.24-1.22 (m, 2H).

Step 5. Synthesis of tert-butyl 8-(((trifluoromethyl)sulfonyl)oxy)-4-azaspiro[2.5]oct-7-ene-4-carboxylate. To a stirred solution of tert-butyl 8-oxo-4-azaspiro[2.5]octane-4-carboxylate (0.35 g, 1.55 mmol) under N2 at rt in THF (3.5 mL) was added hexamethylphosphoramide (HMPA) (0.72 g, 4.03 mmol). The reaction mixture was cooled to −78° C. before adding LiHMDS (1M in THF) (2.8 mL, 2.79 mmol) dropwise. Stirring continued for 2 h before the addition of bis(trifluoromethanesulfonyl)aniline (0.60 g, 1.70 mmol) in THF. The reaction was allowed to stir at rt for 1 h before diluting with $NH_4Cl$ solution (50 mL). The reaction mixture was extracted with EtOAc (3×50 mL), the combined extracts were dried over $Na_2SO_4$, filtered and concentrated under a reduced pressure. The crude product was purified by flash chromatography ($SiO_2$ 230-400 mesh) eluting with 15% EtOAc in hexane to afford the title compound as yellow liquid (0.3 g, 54%). LCMS: $C_{13}H_{18}F_3NO_5$ exact mass: 357.09; m/z 257 (M−100); $^1$H NMR (400 MHz, DMSO) δ 5.91 (t, J=4.0 Hz, 2H), 3.49 (t, J=5.6 Hz, 2H), 2.43-2.39 (m, 2H), 1.39 (s, 9H), 1.32-1.29 (m, 2H), 1.19-1.16 (m, 2H).

Step 6. Synthesis of tert-butyl-8-(1H-pyrrolo[2,3-b]pyridin-3-yl)-4-azaspiro[2.5]oct-7-ene-4-carboxylate. A mixture of tert-buty-18-(((trifluoromethyl)sulfonyl)oxy)-4-azaspiro [2.5]oct-7-ene-4-carboxylate (0.30 g, 0.84 mmol), 3-(4,4,5,5-tetramethyl-1,3,2-dioxaborolan-2-yl)-1H-pyrrolo[2,3-b] pyridine (0.20 g, 0.84 mmol) and $K_2CO_3$ in 1,4-Dioxane: water (4:1 mL) was purged N2 for 10 min. Pd(dppf) $Cl_2$·DCM (0.034 g, 0.042 mmol) was added at room temperature and reaction mixture was irradiated in the microwave at 100° C. for 15 min. The reaction mixture was diluted with water (50 mL) and extracted with EtOAc (3×50 mL). The combined extracts were dried over $Na_2SO_4$, filtered and concentrated under a reduced pressure to obtain crude product that was purified by reverse phase chromatography (20% Acetonitrile in water) to afford the titled compound as a yellow sticky solid (0.15 g, 55%). LCMS: $C_{19}H_{23}N_3O_2$ exact mass: 325.18; m/z 326 (M+1); $^1$H NMR (400 MHz, DMSO) δ 11.60 (s, 1H), 8.21 (d, J=3.2 Hz, 1H), 8.04 (bs, 1H), 7.22 (d, J=2.4 Hz, 1H), 7.10-7.07 (m, 1H), 5.62 (s, 1H), 3.64 (m, 2H), 2.67 (m, 2H), 1.48 (s, 9H), 1.03 (bs, 2H), 0.80 (bs, 2H).

Step 7. Synthesis of 3-(4-azaspiro[2.5]oct-7-en-8-yl)-1H-pyrrolo[2,3-b]pyridine hydrochloride. A solution of tert-butyl-8-(1H-pyrrolo[2,3-b]pyridin-3-yl)-4-azaspiro[2.5]oct- 7-ene-4-carboxylate (0.15 g, 0.46 mmol) in 4M HCl in dioxane (1.5 mL) was allowed to stirred at rt for 1 h. The reaction mixture was concentrated under reduced pressure and crude product was triturated with CH$_2$Cl$_2$ to obtain the title compound as a pale-yellow solid (0.065 g, 62%). LCMS: C$_{14}$H$_{15}$N$_3$ exact mass: 225.13; m/z 226 (M+1); $^1$H NMR (400 MHz, DMSO) δ 12.20 (s, 1H), 9.91 (s, 2H HCl salt), 8.32 (d, J=4.4 Hz, 1H), 8.14 (d, J=7.6 Hz, 1H), 7.44 (d, J=2.0 Hz, 1H), 7.27-7.26 (m, 1H), 5.92 (t, J=3.6 Hz, 1H), 3.39 (bs, 2H), 2.59 (d, J=4.0 Hz, 2H), 1.29-1.26 (t, J=6.8 Hz, 2H), 0.87-0.84 (t, J=6.8 Hz, 2H).

Example 12: Synthesis of Compound 148

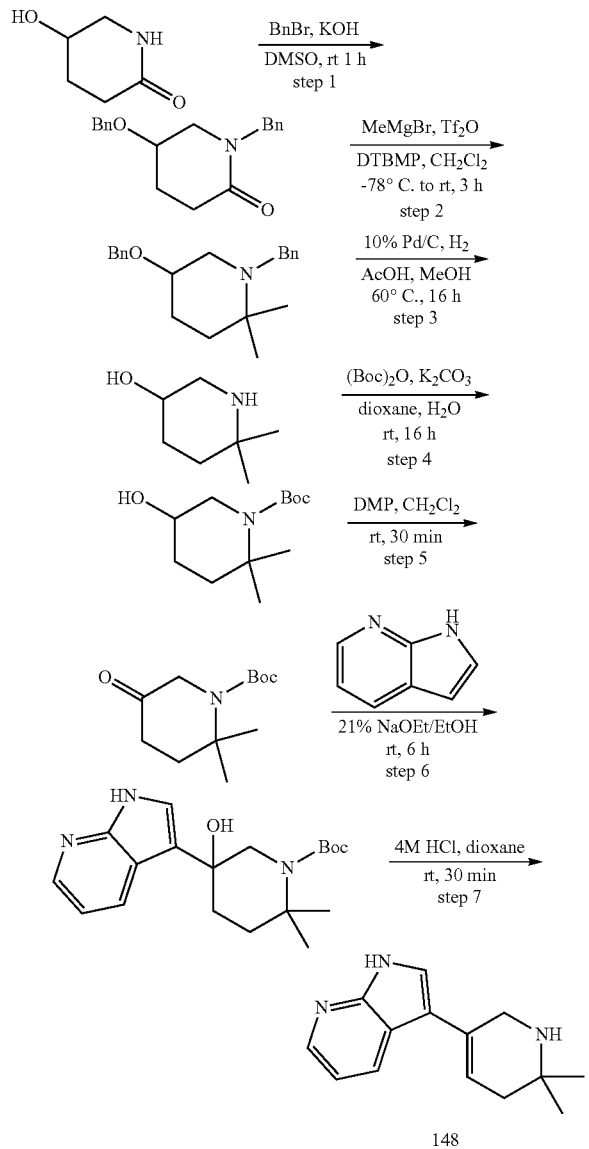

148

Step 1. Synthesis of 1-benzyl-5-(benzyloxy)piperidin-2-one. To a stirred solution of 5-hydroxypiperidin-2-one (2 g, 1.73 mmol) and KOH (7.73 g, 13.8 mmol) in DMSO (40 mL) was added benzyl bromide (11.83 g, 6.92 mmol). The reaction mixture was stirred at rt for 1 h before being diluted with water (1×50 mL) and extracted with EtOAc (3×50 mL).

The combined organic extracts were dried over Na$_2$SO$_4$, filtered and concentrated under reduced pressure. The crude product was purified by column chromatography (SiO$_2$ 230-400 mesh) eluting with 1% EtOAc in hexane to afford the titled compound as off-white sticky solid (3.5 g, 68%). LCMS: C$_{19}$H$_{21}$NO$_2$ exact mass: 295.16; m/z: 296.2 (M+1). $^1$H NMR (400 MHz, DMSO-d$_6$) δ 7.36-7.23 (m, 10H), 4.60 (d, J=15.2 Hz, 1H), 4.49 (d, J=12 Hz, 1H), 4.43-4.37 (m, 2H), 3.86-3.84 (bs, 1H), 3.41-3.39 (m, 1H), 3.30-3.26 (m, 1H), 3.17 (d, J=5.2 Hz, 1H), 2.43-2.39 (m, 1H), 2.33-2.27 (m, 1H), 1.98-1.93 (m, 2H).

Step 2. Synthesis of 1-benzyl-5-(benzyloxy)-2,2-dimethylpiperidine. To a stirred solution of 1-benzyl-5-(benzyloxy)piperidin-2-one (3.0 g, 1.01 mmol) in CH$_2$Cl$_2$ (180 mL) at −78° C. was added DTBMP (2.48 g, 1.20 mmol), triflic anhydride (3.41 g, 1.21 mmol) and MeMgBr (1M in ether) (30.3 mL). The resulting reaction mixture was stirred at rt for 3 h before being diluted with NH$_4$Cl (1×50 mL) and extracted with CH$_2$Cl$_2$ (3×50 mL). The combined organic extracts were dried over Na$_2$SO$_4$, filtered and concentrated under reduced pressure. The crude material was purified by column chromatography (SiO$_2$ 230-400 mesh) eluting with 35% EtOAc in hexane to afford the title compound as an off-white sticky solid (2.7 g, 83%). LCMS: C$_{21}$H$_{27}$NO exact mass: 309.21; m/z=310.20 [M+H]. $^1$H NMR (400 MHz, DMSO-d$_6$) δ 7.33-7.25 (m, 6H), 7.23-7.19 (m, 4H), 4.39-4.29 (q, J=12 Hz, 25.6, 2H), 3.78 (d, J=14.4 Hz, 1H), 3.34-3.27 (m, 1H), 3.15 (d, J=14 Hz, 1H), 2.60-2.55 (m, 1H), 2.22-2.16 (m, 1H), 1.89-1.86 (m, 1H), 1.59-1.56 (m, 1H), 1.45-1.41 (m, 2H), 1.14 (s, 3H), 1.03 (s, 3H).

Step 3. Synthesis of 6,6-dimethylpiperidin-3-ol. To a stirred solution of 1-benzyl-5-(benzyloxy)-2,2-dimethylpiperidine (3.5 g, 1.13 mmol) in MeOH (35 mL) at rt was added 10% Pd/C (50% loading, 1.7 g) and AcOH (catalytic amount). The resulting reaction mixture was hydrogenated at 60° C. under 30 kg pressure for 16 h before being filtered through a celite pad and the filtrate was concentrated to dryness. The crude material was purified by column chromatography (SiO$_2$ 230-400 mesh) by eluting with 2% MeOH in CH$_2$Cl$_2$ to afford the title compound as an off white solid (2.4 g, 99%). $^1$H NMR (400 MHz, DMSO-d$_6$) δ 3.44-3.40 (m, 1H), 2.80-2.76 (m, 1H), 1.70-1.66 (m, 2H), 1.53-1.40 (m, 2H), 1.30-1.26 (m, 2H), 1.06 (s, 3H), 1.017 (s, 3H).

Step 4. Synthesis of tert-butyl 5-hydroxy-2,2-dimethylpiperidine-1-carboxylate. To a stirred solution of 6,6-dimethylpiperidin-3-ol (2.4 g, 1.85 mmol) in 1,4-dioxane (24 mL) and water (3.42 mL) at rt was added K$_2$CO$_3$ (0.2 g, 1.76 mmol) and Boc-anhydride (8.066 g, 3.7 mmol). The resulting reaction mixture was stirred at rt for 16 h before being diluted with water (1×30 mL) and extracted with EtOAc (3×30 mL). The combined organic extracts were dried over Na$_2$SO$_4$, filtered and concentrated under reduced pressure. The crude material was purified by column chromatography (SiO$_2$ 230-400 mesh) eluting with 3% MeOH in CH$_2$Cl$_2$ to afford title compound as pale-yellow solid (2.0 g, 47%). LCMS: C$_{12}$H$_{23}$NO$_3$ exact mass: 229.17; m/z=130.12 [M−100H]. $^1$H NMR (400 MHz, DMSO-d$_6$) δ 4.79 (d, J=4 Hz, 2H), 3.64-3.58 (m, 2H), 2.88-2.83 (m, 1H), 1.78-1.57 (m, 2H), 1.62-1.57 (m, 1H), 1.35 (s, 9H), 1.29 (s, 3H), 1.27 (s, 3H).

Step 5. Synthesis of tert-butyl 2,2-dimethyl-5-oxopiperidine-1-carboxylate. To a stirred solution of tert-butyl-5-hydroxy-2,2-dimethylpiperidine-1-carboxylate (0.6 g, 2.61 mmol) in CH$_2$Cl$_2$ (6 mL) was added DMP (3.33 g, 7.8 mmol) portion wise and the reaction mixture was stirred at rt for 30 min. After completion of the reaction, the reaction mixture was quenched using sat. NaHCO₃ solution (30 mL) and extracted with CH₂Cl₂ (3×30 mL). The combined organic layer was dried over Na₂SO₄, filtered and concentrated under reduced vacuum. The crude material was purified by column chromatography (SiO₂ 230-400 mesh) eluting with 22% EtOAc in hexane to afford title compound as pale-yellow solid (0.45 g, 76%). LCMS: $C_{12}H_{21}NO_3$ exact mass: 227.15; m/z=128.11 [M−100H]. ¹H NMR (400 MHz, DMSO-d₆) δ 3.95 (s, 2H), 2.38 (t, J=6.8 Hz, 2H), 1.89 (t, J=6.0 Hz, 2H), 1.45 (s, 6H), 1.41 (s, 9H).

Step 6. Synthesis of 6,6-dimethyl-3-(1H-pyrrolo[2,3-b]pyridin-3-yl)piperidin-3-ol. To a stirred solution of tert-butyl-2,2-dimethyl-5-oxopiperidine-1-carboxylate (0.45 g, 1.98 mmol) and 1H-pyrrolo[2,3-b]pyridine (0.23 g, 1.98 mmol) in EtOH (4.5 mL) was added 21% NaOEt in EtOH (4.5 mL). The reaction mixture was stirred at rt for 6 h before being diluted with water (25 mL) and extracted with EtOAc (3×25 mL). The combined organic extracts were dried over Na₂SO₄, filtered and concentrated under reduce pressure. The crude material was purified by column chromatography (SiO₂ 230-400 mesh) eluting with 35% EtOAc in hexane to afford the title compound as pale-yellow solid (0.2 g, 42%). LCMS: $C_{19}H_{27}N_3O_3$ exact mass: 345.21; m/z=346.26 [M+1H]. ¹H NMR (400 MHz, DMSO-d₆) δ 11.37 (s, 1H), 8.17 (s, 1H), 8.11-8.09 (m, 1H), 7.34 (s, 1H), 7.04-7.01 (m, 1H), 5.06 (s, 1H), 3.76 (d, J=13.6 Hz, 1H), 3.48 (d, J=13.6 Hz, 1H), 2.12-2.10 (m, 1H), 1.91-1.83 (m, 2H), 1.41 (s, 6H), 1.37 (s, 2H), 1.34 (s, 9H).

Step 7. Synthesis of 3-(6,6-dimethyl-1,2,5,6-tetrahydropyridin-3-yl)-1H-pyrrolo[2,3-b]pyridine hydrochloride. To a stirred solution of 6,6-dimethyl-3-(1H-pyrrolo[2,3-b]pyridin-3-yl)piperidin-3-ol (0.2 g, 0.52 mmol) in dioxane (5 mL) at 0° C. was added 4M HCl in dioxane (1.8 mL). The reaction mixture was stirred at rt for 30 min before being concentrated to dryness. The crude material was then purified by reverse phase column chromatography using 12% MeCN in H₂O to afford the titled compound as an off white solid (0.101 g, 60%). LCMS: $C_{14}H_{17}N_3$ exact mass: 227.14; m/z=228.2 [M+H]. ¹H NMR (400 MHz, DMSO-d₆) δ 11.86 (s, 1H), 9.44 (bs, 2H, HCl salt), 8.26-8.25 (m, 2H), 7.71 (s, 1H), 7.14-7.10 (m, 1H), 6.30 (s, 1H), 3.92 (s, 2H), 2.40 (s, 2H), 1.36 (s, 6H).

Example 13: Synthesis of Compound 149

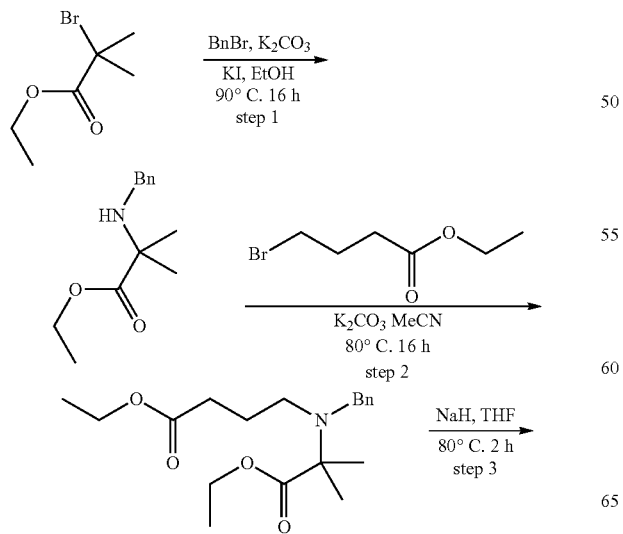

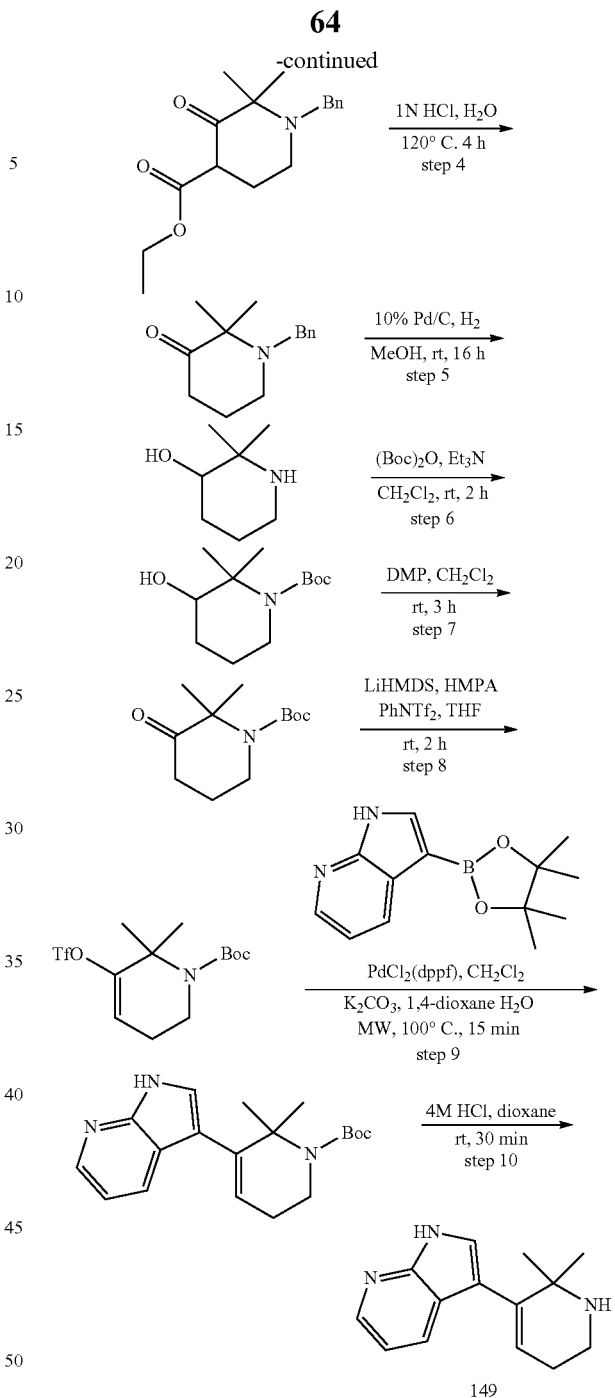

149

Step 1. Synthesis of 2-(benzyl amino)propan-2-yl propionate. To a stirred solution of 2-bromopropan-2-yl propionate (20 g, 103.62 mmol) in EtOH (100 mL) was added K₂CO₃ (14.3 g, 103.62 mmol), KI (0.17 g, 1.03 mmol) and benzylamine (10.9 g, 103.62 mmol). The reaction mixture was stirred at 90° C. for 16 h before concentrating under reduced pressure. The crude product was purified by column chromatography (SiO₂ 230-400 mesh) using 5% EtOAc in hexane to afford the title compound as pale-yellow oil (10.0 g, 44%). LCMS: $C_{13}H_{19}NO_2$ exact mass: 221.14; m/z 222.3 (M+1).

Step 2. Synthesis of ethyl 4-(benzyl(1-ethoxy-2-methyl-1-oxopropan-2-yl)amino)butanoate. To a stirred solution of 2-(benzylamino)propan-2-yl propionate (9.0 g, 40.72 mmol)

in ethyl bromobutyrate (82 g, 42.35 mmol) was added $K_2CO_3$ (0.33 g, 2.03 mmol). The resulting reaction mixture was stirred at 120° C. for 16 h before concentrating under reduced pressure. The crude product was purified by column chromatography ($SiO_2$ 230-400 mesh) eluting with 2% EtOAc in hexane to afford the title compound as a pale-yellow oil (8.0 g, 59%). LCMS: $C_{19}H_{29}NO_4$ exact mass: 335.21; m/z 336.2 (M+1).

Step 3. Synthesis of ethyl 1-benzyl-2,2-dimethyl-3-oxopiperidine-4-carboxylate. To a stirred solution of ethyl 4-(benzyl(1-ethoxy-2-methyl-1-oxopropan-2-yl) amino) butanoate (8.0 g, 23.88 mmol) in THF (80 mL) was added 60% NaH (2.8 g, 71.64 mmol) The resulting reaction mixture was stirred at 80° C. for 2 h before being quenched into water and extracted with ethyl acetate (3×300 mL). The combined extracts were dried over $Na_2SO_4$, filtered and concentrated under pressure to afford the title compound (6.9 g, 99%). LCMS: $C_{17}H_{23}NO_2$ exact mass: 289.17; m/z 290.2: (M+1).

Step 4. Synthesis of 1-benzyl-2,2-dimethylpiperidin-3-one. A stirred solution of ethyl 1-benzyl-2,2-dimethyl-3-oxopiperidine-4-carboxylate (6.9 g) in 1N HCl (70 mL) was heated at 120° C. for 4 h before being quenched into ice-water and neutralized with sodium bicarbonate solution. Aqueous layer was then extracted with EtOAc (3×200 mL) and the combined extracts were dried over $Na_2SO_4$, filtered and concentrated to dryness. The crude product was purified by column chromatography ($SiO_2$ 230-400 mesh) using 10% EtOAc in hexane to afford the title compound as colourless oil (2.0 g, 39%). LCMS: $C_{14}H_{19}NO$ exact mass: 217.15; m/z 218.2 (M+1); $^1H$ NMR: ($CDCl_3$, 400 MHz): δ 7.38-7.33 (m, 5H), 3.64 (S, 2H), 2.68-2.65 (m, 2H), 2.52 (t, J=8 Hz, 2H), 1.87-1.81 (m, 2H), 1.32 (s, 6H).

Step 5. Synthesis of 2,2-dimethylpiperidin-3-one. To a stirred solution of 1-benzyl-2,2-dimethylpiperidin-3-one (1.0 g) in MeOH (50 mL) was added 10% Pd/C (0.5 g, 50% w/w) and the resulting reaction mixture was hydrogenated at 300 psi for 16 h at which time, the reaction mixture was filtered through a celite pad and washed with MeOH. The filtrate was concentrated under reduced pressure and the crude product was purified by column chromatography ($SiO_2$ 230-400 mesh) using 10% MeOH in $CH_2Cl_2$ to afford the title compound as an off-white solid (0.6 g, 99%). $^1H$ NMR: ($CDCl_3$, 400 MHz): δ 3.49-3.35 (m, 1H), 2.82-2.73 (m, 2H), 1.86-1.70 (m, 1H), 1.68-1.60 (m, 1H), 1.59-1.52 (m, 1H), 1.17-1.15 (s, 3H), 1.14-1.10 (s, 3H).

Step 6. Synthesis of ethyl 1-benzyl-2,2-dimethyl-3-oxopiperidine-4-carboxylate. To a stirred solution of 2,2-dimethylpiperidin-3-one (0.6 g, 4.72 mmol, 1.0 eq.) in $CH_2Cl_2$ (2.0 mL) was added $Et_3N$ (2.04 mL, 14.16 mmol) followed by $(Boc)_2O$ (1.1 ml, 5.19 mmol) The resulting reaction mixture was stirred at room temperature for 2 h before being quenched with ice water and extracted with EtOAc (3×50 mL). The combined organic extracts were dried over $Na_2SO_4$, filtered and concentrated under reduce pressure. The crude product was purified by column chromatography ($SiO_2$ 230-400 mesh) using 20% EtOAc in hexane to afford title compound as an off-white solid (1.0 g, 92%). LCMS: $C_{12}H_{23}NO_3$ exact mass: 229.17; m/z 174.2 (M−56).

Step 7. Synthesis of tert-butyl-2,2-dimethyl-3-oxopiperidine-1-carboxylate. To a stirred solution of ethyl 1-benzyl-2,2-dimethyl-3-oxopiperidine-4-carboxylate (0.9 g, 3.91 mmol) in $CH_2Cl_2$ (1.0 mL) was added PCC (4.2 g, 19.56 mmol) and celite (4.2 g). The resulting reaction mixture was stirred at rt for 3 h before concentrating under reduced pressure. The crude product was purified by column chromatography ($SiO_2$ 230-400 mesh) using 25% EtOAc in hexane to afford the title compound as white solid (0.5 g, 56%). LCMS: $C_{12}H_{21}NO_3$ exact mass: 227.15; m/z 128.2 (M−100). $^1H$ NMR: (DMSO-$d_6$, 400 MHz) 3.37-3.33 (m, 2H), 2.56-2.50 (m, 2H), 1.94-1.89 (m, 2H), 1.4 (bs, 15H).

Step 8. Synthesis of tert-butyl-6,6-dimethyl-5-(((trifluoromethyl)sulfonyl)oxy)-3,6-dihydropyridine-1(2H)-carboxylate. To a stirred solution of tert-butyl-2,2-dimethyl-3-oxopiperidine-1-carboxylate (0.23 g, 1.01 mmol) in THF (0.8 mL) at −78° C. under N2 were added HMPA (0.2 mL) and LiHMDS (1.8 mL, 1.82 mmol). The resulting reaction mixture was stirred at −78° C. for 2 h. $Tf_2NPh$ (0.39 g, 1.11 mmol) was added and the resulting reaction mixture was stirred at room temperature for 2 h. After completion of the reaction, the reaction mixture was quenched with water (20 mL) and extracted with EtOAc (3×20 mL). The combined organic layer was dried over $Na_2SO_4$, filtered and concentrated under vacuum. The resulting crude was purified by column chromatography ($SiO_2$ 230-400 mesh) using 2% EtOAc in hexane to afford title compound as an off-white solid (0.22 g, 60%). LCMS: $C_{13}H_{20}NO_5S$ exact mass: 359.10; m/z 260.0 (M−100).

Step 9. Synthesis of tert-butyl-6,6-dimethyl-5-(1H-pyrrolo[2,3-b]pyridin-3-yl)-3,6-dihydropyridine-1(2H)-carboxylate. To a stirred solution of tert-butyl-6,6-dimethyl-5-(((trifluoromethyl)sulfonyl)oxy)-3,6-dihydropyridine-1 (2H)-carboxylate (0.2 g, 0.55 mmol) and 3-(4,4,5,5-tetramethyl-1,3,2-dioxaborolan-2-yl)-1H-pyrrolo[2,3-b] pyridine (0.14 g, 0.61 mmol) in dioxane:$H_2O$ (2 mL: 0.9 mL) was added $K_2CO_3$ (0.15 g, 1.11 mmol). The reaction mixture was degassed with N2 for 15 min followed by addition of $PdCl_2(dppf)CH_2Cl_2$ complex (0.02 g, 0.027 mmol). The resulting reaction mixture was microwave irradiated at 100° C. for 15 min before quenching with ice water (20 mL) and extracting with EtOAc (3×20 mL). The combined extracts were dried over $Na_2SO_4$, filtered and concentrated under reduced pressure. The crude product was purified by reverse phase column chromatography using 40% ACN in $H_2O$ to afford the title compound as an off-white solid (0.12 g, 66%). LCMS: $C_{19}H_{25}N_3O_2$ exact mass: 327.19; m/z 328.0 (M+1).

Step 10. Synthesis 3-(2,2-dimethyl-1,2,5,6-tetrahydropyridin-3-yl)-1H-pyrrolo[2,3-b]pyridine. To a stirred solution of tert-butyl-6,6-dimethyl-5-(1H-pyrrolo[2,3-b]pyridin-3-yl)-3,6-dihydropyridine-1(2H)-carboxylate (0.12 g, 0.366 mmol) in 1,4-Dioxane (1.0 mL) was added 4M HCl in dioxane (2.0 mL). The reaction mixture was stirred 90° C. for 1 h before removing the solvent under reduced pressure. The crude product was triturated with n-pentane to afford the title compound as brown solid (0.052 g, 62%) LCMS: $C_{14}H_{17}N_3$ exact mass: 227.14; m/z 228.2 (M+1); $^1H$ NMR: (DMSO, 400 MHz): δ 12.27 (s, 1H), 9.66 (s, 2H), 8.33-8.32 (d, J=4.4 Hz, 1H), 8.12-8.10 (d, J=8 Hz, 1H), 7.52 (s, 1H), 7.27-7.24 (m, 1H), 5.83 (s, 1H), 3.50 (s, 2H), 1.49-1.46 (s, 6H).

Example 14: Synthesis of Compound 151

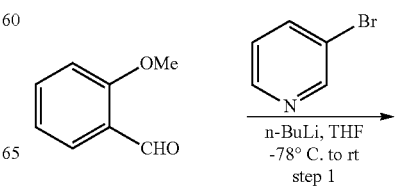

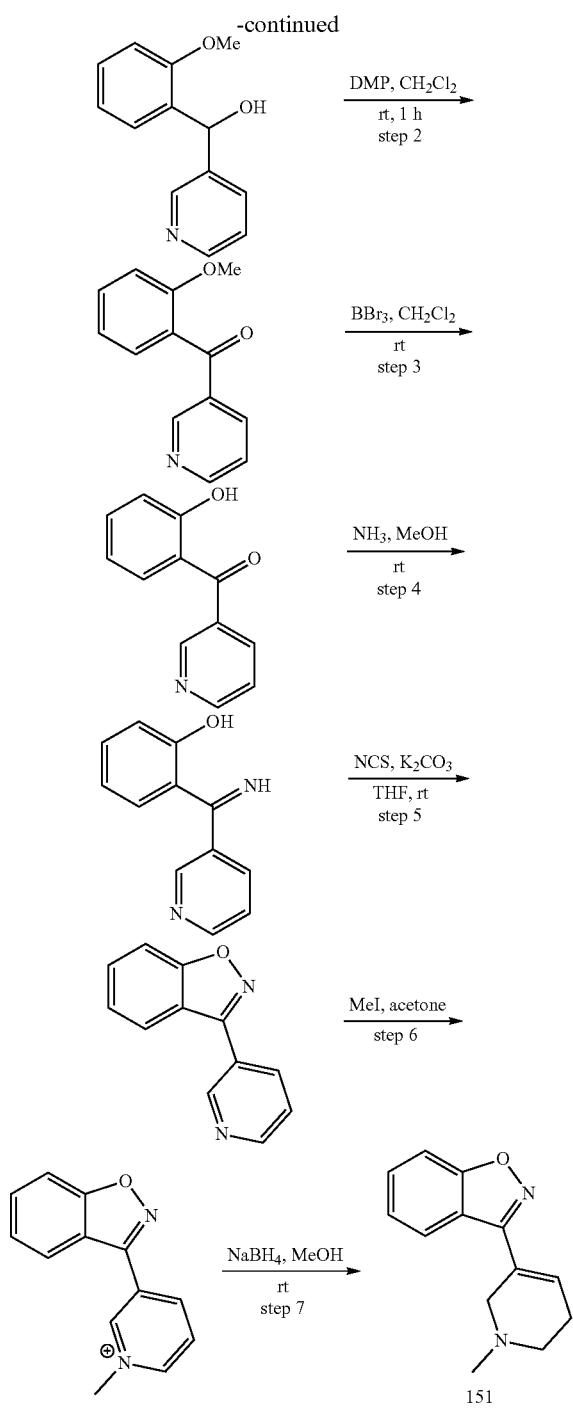

Step 1. Synthesis of (2-methoxyphenyl-pyridin-3-yl) methanol. To a stirred solution of 3-bromopyridine (5.0 g, 36.76 mmol) in THF (50 mL) was added n-BuLi (50.5 mL, 80.88 mmol) at −78° C. The resulting reaction mixture was stirred at −78° C. for 1 h before 2-methoxybenzaldehyde (8.6 g, 55.14 mmol) was then added. Once addition was completed, the reaction mixture was stirred at rt for 1 h before the reaction mixture was diluted with water (500 mL) and extracted with EtOAc (3×250 mL). The combined organic extracts were dried over $Na_2SO_4$, filtered, and concentrated under reduced pressure. The crude product was purified by column chromatography ($SiO_2$ 230-400 mesh) eluting with 10% EtOAc in hexane to afford the title compound as a pale-yellow solid (4.0 g, 50%). LCMS: $C_{13}H_{13}NO_2$; exact mass: 215.09; m/z 216.0 (M+1)$^+$.

Step 2. Synthesis of (2-methoxyphenyl)(pyridin-3-yl) methanone. To a stirred solution of (2-methoxyphenyl)(pyridin-3-yl)methanol (4.0 g, 18.60 mmol) in DCM (40 mL) at rt was added DMP (23.6 g, 55.8 mmol). After 1 h, the reaction mixture was diluted with water (100 mL) and extracted with EtOAc (3×150 mL). The combined organic extracts were dried over $Na_2SO_4$, filtered, and concentrated under reduced pressure. The crude product was purified by column chromatography ($SiO_2$ 230-400 mesh) eluting with 20% EtOAc in hexane to afford the title compound as pale yellow solid (4.0 g, 98%). LCMS: $C_{13}H_{11}NO_2$; exact mass: 213.08; m/z 214.0 (M+1)$^+$.

Step 3. Synthesis of (2-hydroxyphenyl)(pyridin-3-yl) methanone. To a stirred solution of (2-methoxyphenyl)(pyridin-3-yl)methanone (4.0 g, 18.77 mmol) in DCM (40 mL) at 0° C. was added $BBr_3$ (8.0 mL). The reaction mixture was stirred at room temperature for 16 h. After completion of the reaction, the reaction mixture was diluted with water (250 mL) and extracted with EtOAc (3×200 mL). The combined organic extracts were dried over $Na_2SO_4$, filtered, and concentrated under reduced pressure to afford the title compound as off yellow solid (4.0 g, 99%) LCMS: $C_{12}H_9NO_2$; exact mass: 199.06; m/z 200.0 (M+1)$^+$.

Step 4. Synthesis of 2-(imino(pyridin-3-yl)methyl)phenol. To a stirred solution of (2-hydroxyphenyl)(pyridin-3-yl)methanone (4.0 g, 20.2 mmol) in MeOH (40 mL) at rt was added $NH_3$ in MeOH (4 mL). The reaction mixture was stirred for 16 h before it was concentrated under reduced pressure to afford the title compound as light-yellow solid (4.0 g, 99%) LCMS: $C_{12}H_{10}N_2O$ exact mass: 198.08; m/z 199.0 (M+1)$^+$.

Step 5. Synthesis of 3-(pyridin-3-yl)benzo[d]isoxazole. To a stirred solution of 2-(imino(pyridin-3-yl)methyl)phenol (3.0 g, 15.15 mmol) in THF (30 mL) at rt was added $K_2CO_3$ (4.1 g, 30.3 mmol) and NCS (3.0 g, 22.6 mmol). After 2 h, the reaction mixture was diluted with water (200 mL) and extracted with EtOAc (3×200 mL). The combined organic extracts were dried over $Na_2SO_4$, filtered and concentrated under reduced pressure to afford the title compound as off white solid (3.0 g, 99%). LCMS: exact mass: $C_{12}H_8N_2O$; 196.06; m/z 197.15 (M+1)$^+$.

Step 6. Synthesis of 3-(benzo[d]isoxazol-3-yl)-1-methylpyridin-1-ium. To a stirred solution of 3-(pyridin-3-yl)benzo[d]isoxazole (3.0 g, 15.3 mmol) in acetone (30 mL) was added MeI (4.3 g, 30.6 mmol). The resulting reaction mixture was stirred at 50° C. for 16 h before the ppt was filter and dried under reduced pressure to afford the title compound as off white solid (0.7 g, 69.7%). LCMS: $C_{13}H_{11}N_2O$; exact mass: 211.09; m/z 211.0 (M+H)$^+$.

Step 7. Synthesis of 3-(1-methyl-1,2,5,6-tetrahydropyridin-3-yl)benzo[d]isoxazole. To a stirred solution of 3-(benzo[d]isoxazol-3-yl)-1-methylpyridin-1-ium (2.0 g, 9.4 mmol) in MeOH (2.0 mL) was added acetic acid (2.1 g, 47.3 mmol) and sodium cyanoborohydride (1.7 g, 28.4 mmol. The resulting reaction mixture was stirred at room temperature for 4 h before being diluted with water (100 mL) and extracted with EtOAc (3×150 mL). The combined organic extracts were dried over $Na_2SO_4$, filtered and concentrated under a reduced pressure. The crude product was purified via prep HPLC chromatography to afford the title compound as a yellow solid (0.1 g, 10%). LCMS: $C_{13}H_{14}N_2O$; exact mass: 214.11; m/z 215.0 (M+1)$^+$; $^1$H NMR (400 MHz, DMSO) δ 8.062 (s, 1H), 7.68-7.63 (m, 2H), 7.45-7.41 (m, 1H), 7.03-7.02 (m, 1H), 3.73 (s, 2H), 2.94-2.91 (t, J=6 Hz, 2H), 2.64 (s, 5H).

Example 15: Synthesis of Compound 154

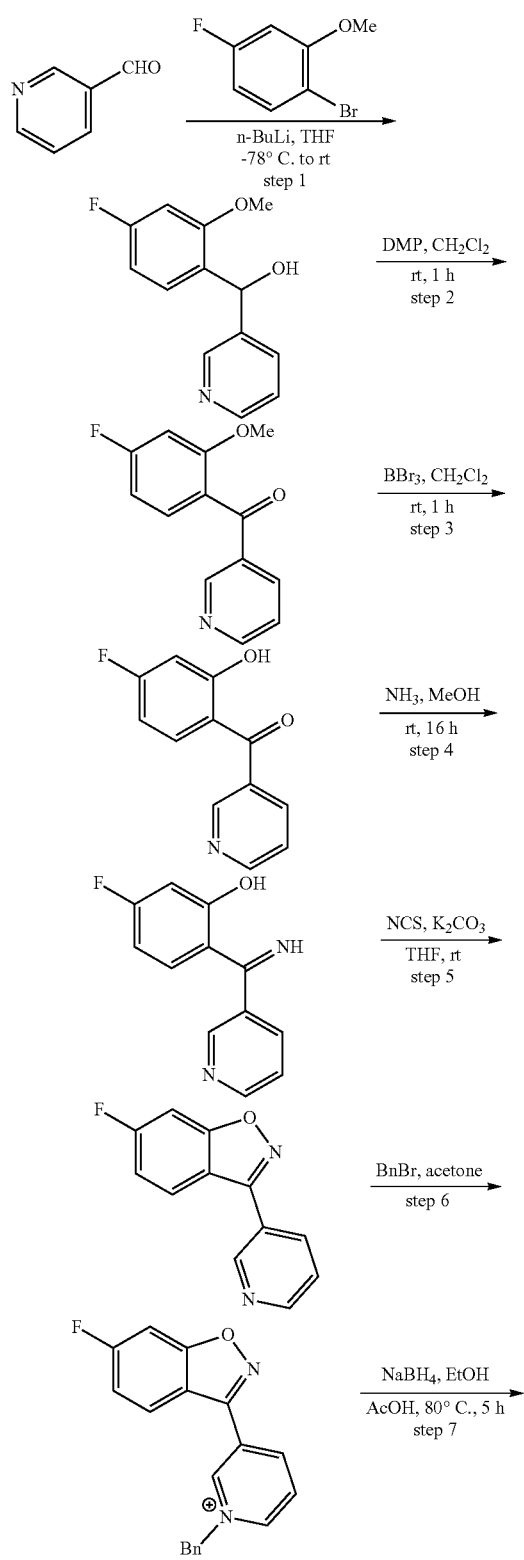

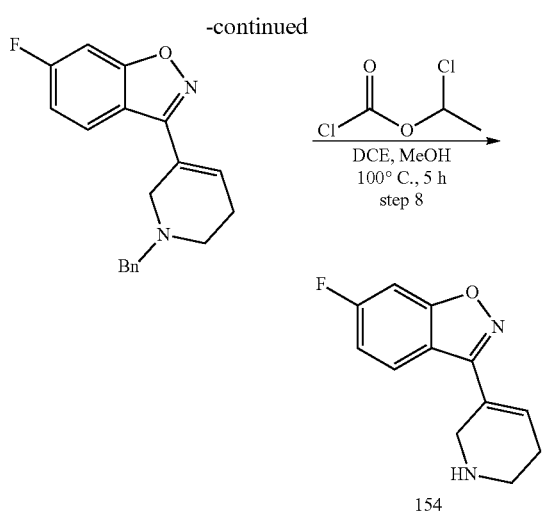

Step 1. Synthesis of (4-fluoro-2-methoxyphenyl)(pyridin-3-yl)methanol. To a stirred solution of 1-bromo-4-fluoro-2-methoxybenzene (20 g, 97.4 mmol) in THF (50 mL) was added n-BuLi (66 mL, 107.00 mmol) at −78° C. After 1 h at −78° C., 3-methoxybenzaldehyde (12.51 g, 116.8 mmol) was then added and the reaction was stirred an additional 1 h before the reaction mixture was diluted with water (500 mL) and extracted with EtOAc (3×250 mL). The combined organic extracts were dried over $Na_2SO_4$, filtered, and concentrated under reduced pressure. The crude product was purified by column chromatography ($SiO_2$ 230-400 mesh) eluting with 23% EtOAc in hexane to afford the title compound as pale-yellow solid (18 g, 41%). LCMS: $C_{13}H_{12}FNO_2$; exact mass: 233.09; m/z 234.1 $(M+1)^+$.

Step 2. Synthesis of (4-fluoro-2-methoxyphenyl)(pyridin-3-yl)methanone. To a stirred solution of (4-fluoro-2-methoxyphenyl)(pyridin-3-yl)methanol (18 g, 77.23 mmol) in $CH_2Cl_2$ (40 mL) was added DMP (163.78 g, 386.1 mmol). The reaction mixture was stirred at room temperature for 1 h before being diluted with water (100 mL) and extracted with EtOAc (3×150 mL). The combined organic extracts were dried over $Na_2SO_4$, filtered and concentrated under reduced pressure. The crude product was purified by column chromatography ($SiO_2$ 230-400 mesh) eluting with 20% EtOAc in hexane to afford the title compound as pale-yellow solid (15 g, 71%). LCMS: $C_{13}H_{10}FNO_2$; exact mass: 231.07; m/z 232.00 $(M+1)^+$.

Step 3. Synthesis of (4-fluoro-2-hydroxyphenyl)(pyridin-3-yl)methanone. To a stirred solution of (4-fluoro-2-methoxyphenyl)(pyridin-3-yl)methanone (15 g, 69.00 mmol) in $CH_2Cl_2$ (150 mL) at 0° C. was added $BBr_3$ (30 mL). The resulting reaction mixture was stirred at room temperature for 16 h before being diluted with water (250 mL) and extracted with EtOAc (3×200 mL). The combined organic extracts were dried over $Na_2SO_4$, filtered and concentrated under reduced pressure to afford the title compound as yellow solid (12 g, 61.87%). LCMS: $C_{12}H_8FNO_2$; exact mass: 217.05; m/z 217.9 $(M+1)^+$.

Step 4. Synthesis of 5-fluoro-2-(imino(pyridin-3-yl)methyl)phenol. To a stirred solution of (4-fluoro-2-hydroxyphenyl)(pyridin-3-yl)methanone (12 g, 20.2 mmol) in MeOH (40 mL) at rt was added $NH_3$ in MeOH (120 mL). After stirring for 16 h, the reaction mixture was concentrated under reduced pressure to afford the title compound as light-yellow solid (15 g, 99%). LCMS: $C_{12}H_9FN_2O$; exact mass: 216.07; m/z 217.00 (M+1).

Step 5. Synthesis of 6-fluoro-3-(pyridin-3-yl)benzo[d]isoxazole. To a stirred solution of 5-fluoro-2-(imino(pyridin-3-yl)methyl)phenol (10 g, 46.2 mmol) at rt in THF (100 mL) was added K₂CO₃ (19.04 g, 138.6 mmol) and N-Chlorosuccinimide (12.30 g, 92.4 mmol). After 3 h, the reaction mixture was diluted with water (100 mL) and extracted with EtOAc (3×100 mL). The combined organic extracts was dried over Na₂SO₄, filtered and concentrated under reduced pressure to afford the title compound as off white solid (12 g, 99%). LCMS: C₁₂H₇FN₂O; exact mass: 214.05; m/z 214.75 (M+1)⁺.

Step 6. Synthesis of 1-benzyl-3-(6-fluorobenzo[d]isoxazol-3-yl)pyridin-1-ium. To a stirred solution of 6-fluoro-3-(pyridin-3-yl)benzo[d]isoxazole (10 g, 46.6 mmol) in acetone (100 mL) was added benzyl bromide (10 mL). The resulting reaction mixture was stirred at 50° C. for 16 h before the ppt was filtered and dried under reduced pressure to afford the title compound as off white solid (20 g, 99%). LCMS: C₁₉H₁₄FN₂O; exact mass: 305.11; 305.1 m/z (M+H)⁺.

Step 7. Synthesis of 3-(1-benzyl-1,2,5,6-tetrahydropyridin-3-yl)-6-fluorobenzo[d]isoxazole. To a stirred solution of 1-benzyl-3-(6-fluorobenzo[d]isoxazol-3-yl)pyridin-1-ium (21 g, 68.8 mmol) in EtOH (210 mL) was added AcOH (21 g, 68.8 mmol) and sodium cyanoborohydride (43.22 g, 688.0 mmol). The resulting reaction mixture was stirred at 80° C. for 4 h before being diluted with water (100 mL) and extracted with EtOAc (3×150 mL). The combined organic extracts were dried over Na₂SO₄, filtered and concentrated under a reduced vacuum. The crude product was purified via reverse phase column chromatography using 40% AcCN and water to afford the title compound as a yellow solid (2 g, 9%). LCMS: C₁₉H₁₇FN₂O; exact mass: 308.13; m/z 309.1 (M+1)⁺.

Step 8. Synthesis of 6-fluoro-3-(1,2,5,6-tetrahydropyridin-3-yl)benzo[d]isoxazole. To a stirred solution of 3-(1-benzyl-1,2,5,6-tetrahydropyridin-3-yl)-6-fluorobenzo[d]isoxazole (2.0 g, 6.48 mmol) in 1,2-dichloroethane (20 mL) was added 1-chloroethyl chloroformate (1.83 g, 1.29 mmol). The resulting reaction mixture was stirred at rt for 1 h before being concentrated under a reduced pressure. The residue was dissolved in MeOH (20 mL) and stirred at 50° C. for 2 h. The solvent was removed and the residue purified by prep HPLC AZZOTA C18 (260 mm×30 mm 10 μm) eluting with 0.05% NH₄OH in H₂O, MeCN:MeOH:IPA (65:25:10) to afford the title compound as a white solid (0.022 g, 2%). LCMS: C₁₂H₁₁FN₂O; exact mass: 218.09; m/z: 219.0 (M+1)⁺; ¹H NMR (400 MHz, DMSO) δ 8.17-8.14 (m, 1H), 7.76-7.73 (d, J=9.2 Hz, 1H), 7.34-7.29 (t, J=1.6 Hz, 1H), 6.97 (s, 1H), 3.65 (s, 2H), 2.89-2.87 (t, J=5.6 Hz, 2H), 2.28 (s, 2H).

Example 16: Synthesis of Compound 160

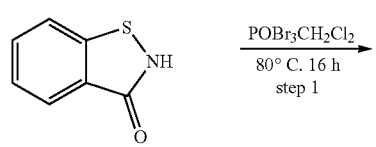

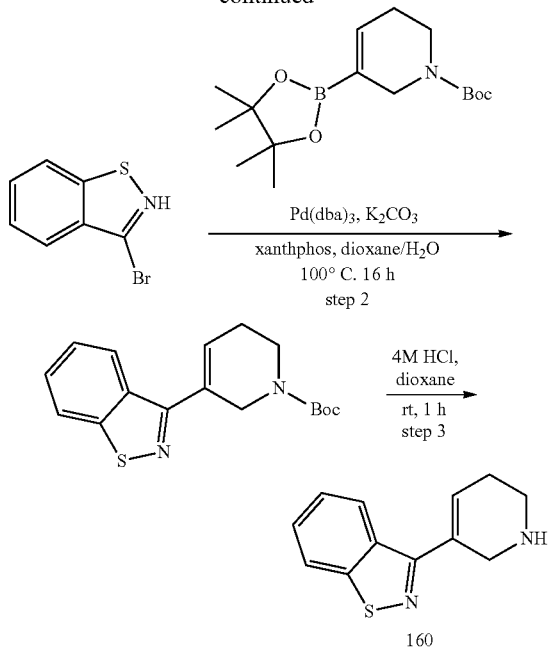

Step 1. Synthesis of tert-butyl-5-(benzo[b]thiophen-3-yl)-3-methyl-3,6-dihydropyridine-1(2H)-carboxylate. To a stirred solution of benzo[d]isothiazol-3(2H)-one (0.2 g, 0.0132 mmol) in CH₂Cl₂ (2 mL) was added POBr₃ (0.7 g, 0.002 mmol). The reaction mixture was heated at 80° C. for 16 h before being quenched into ice water and extracted with EtOAc (3×20 mL). The combined organic extracts were dried over Na₂SO₄, filtered and concentrated under reduce pressure. The crude product was purified by reverse phase column chromatography (45% MeCN in H₂O) to afford the title compound as an off white solid (0.15 g, 53%). ¹H NMR: (DMSO, 400 MHz): δ 8.32 (d, J=1.4 Hz, 1H), 8.02 (d, J=8.0 Hz, 1H), 7.77-7.73 (m, 1H), 7.65-7.63 (m, 1H).

Step 2. Synthesis of tert-butyl-5-(benzo[d]isothiazol-3-yl)-3,6-dihydropyridine-1(2H)-carboxylate. To a stirred solution of tert-butyl-5-(benzo[b]thiophen-3-yl)-3-methyl-3,6-dihydropyridine-1(2H)-carboxylate (0.15 g, 0.0007 mmol) and tert-butyl-5-(4,4,5,5-tetramethyl-1,3,2-dioxaborolan-2-yl)-3,6-dihydropyridine-1(2H)-carboxylate (0.14 g, 0.00077 mmol) in dioxane:H₂O (2 mL: 0.9 mL) was added K₂CO₃ (0.29 g, 0.002 mmol). The reaction mixture was purged with N2 followed by the addition of Pd₂(dba)₃ (0.02 g, 0.00007 mmol) and xantphos (0.02 g, 0.00007 mmol). The reaction mixture was stirred at 100° C. for 16 h before being quenched with ice water and extracted with EtOAc (3×20 mL). The combined organic extracts were dried over Na₂SO₄, filtered and concentrated under reduce pressure. The crude product was purified by flash column chromatography (SiO₂ 230-400 mesh) eluting with 10% EtOAc in hexane to afford the title compound as an off-white solid (0.14 g, 66%). LCMS: C₁₇H₂₀N₂O₂S; exact mass: 316.12; m/z 317.0 (M+1).

Step 3. Synthesis of 3-(1,2,5,6-tetrahydropyridin-3-yl)benzo[d]isothiazole. To a stirred solution of tert-butyl-5-(benzo[d]isothiazol-3-yl)-3,6-dihydropyridine-1(2H)-carboxylate (0.14 g, 0.0044 mmol) in 1,4-dioxane (1.0 mL) was added 4M HCl in dioxane (2.0 mL). The reaction mixture was stirred at rt for 1 h before being concentrated to dryness. The crude product was triturated with Et₂O to afford the title compound as an off-white solid (0.06 g, 14%). LCMS:

$C_{12}H_{12}N_2S$; 216.07; m/z 217.2 (M+1); $^1H$ NMR: (DMSO, 400 MHz) δ 9.32 (bs, 2H HCl salt), 8.36-8.34 (d, J=8 Hz, 1H), 8.29-8.27 (d, J=8 Hz, 1H), 7.68-7.65 (t, J=14.8 Hz, 1H), 7.59-7.55 (t, J=14.8 Hz, 1H), 6.89 (s, 1H), 4.16 (s, 2H), 3.72 (s, 1H), 3.13 (s, 1H), 2.67-2.62 (bs, 2H).

Example 17: Synthesis of Compound 161

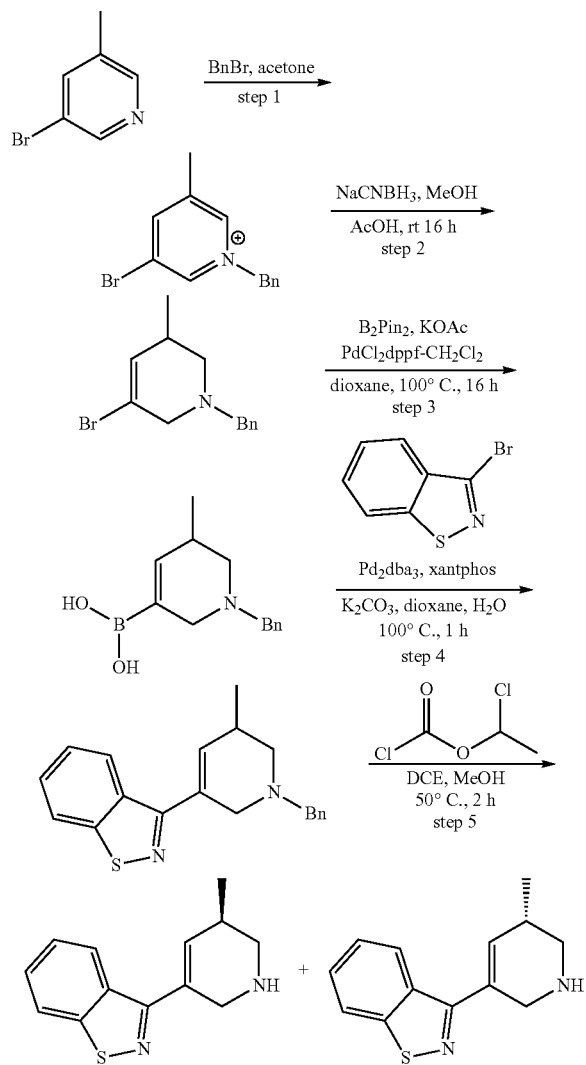

Step 1. Synthesis of 1-benzyl-3-bromo-5-methylpyridin-1-ium. To a stirred solution of 3-bromo-5-methylpyridine (10 g, 58.8 mmol) in acetone (100 mL) was added benzyl bromide (9.9 g, 58.5 mmol). The resulting reaction mixture was stirred at 50° C. for 16 h before the ppt was collected and dried under reduced pressure to afford the title compound as white solid (10 g, 63%). LCMS: $C_{13}H_{13}BrN$; exact mass: 262.02; m/z 263.15 (M+1).

Step 2. Synthesis of 1-benzyl-5-bromo-3-methyl-1,2,3,6-tetrahydropyridine. To a stirred solution of 1-benzyl-3-bromo-5-methylpyridin-1-ium (10 g, 38.16 mmol) in MeOH (100 mL) was added acetic acid (10.9 mL, 190.83 mmol) and sodium cyanoborohydride (7.1 g, 114.50 mmol). The resulting reaction mixture was stirred at rt for 16 h before being diluted with water (500 mL) and extracted with EtOAc (3×250 mL). The combined organic extracts were dried over $Na_2SO_4$, filtered, and concentrated under reduced pressure. The crude product was purified by column chromatography ($SiO_2$ 230-400 mesh) eluting with 2% EtOAc in hexane to afford the title compound as pale-yellow solid (3.0 g, 20%). LCMS: $C_{13}H_{16}BrN$; exact mass: 265.05; m/z 266.0 (M+1).

Step 3. Synthesis of (1-benzyl-5-methyl-1,2,5,6-tetrahydropyridin-3-yl)boronic acid. To a stirred solution of 1-benzyl-5-bromo-3-methyl-1,2,3,6-tetrahydropyridine (3.0 g, 11.3 mmol) and bis(pinacolato)diborane (2.7 g, 11.3 mmol) in 1,4-dioxane (30 mL) was added KOAc (3.3 g, 33.9 mmol). The reaction mixture was purged with N2 for 10 min followed by addition of $PdCl_2(dppf)\cdot CH_2Cl_2$ (0.413 g, 0.56 mmol, 0.05 eq.). The resulting reaction mixture was stirred at 100° C. for 16 h before being diluted with $H_2O$ (250 mL) and extracted with EtOAc (3×100 mL). The combined organic extracts were dried over $Na_2SO_4$, filtered, and concentrated under reduced pressure to afford the title compound as dark brown gummy liquid (3.0 g, 99%). The crude was used for next step without further purification. LCMS: $C_{13}H_{18}BNO_2$; exact mass: 231.14; m/z 232.0 (M+1).

Step 4. Synthesis of 3-(1-benzyl-5-methyl-1,2,5,6-tetrahydropyridin-3-yl)benzo[d]isothiazole). To a stirred solution of (1-benzyl-5-methyl-1,2,5,6-tetrahydropyridin-3-yl)boronic acid (3.0 g, 12.9 mmol) and 3-bromobenzo[d]isothiazole (3.02 g, 14.2 mmol) in 1,4-dioxane: $H_2O$ (10:1 mL) was added $K_2CO_3$ (5.2 g, 38.7 mmol, 3.0 eq.). The reaction mixture was purged with N2 for 10 min followed by addition of $Pd_2(dba)_3$ (0.59 g, 0.6 mmol) and xantphos (0.37 g, 0.6 mmol). The resulting reaction mixture was stirred at 100° C. for 1 h before being diluted with water (100 mL) and extracted with EtOAc (3×100 mL). The combined organic extracts were dried over $Na_2SO_4$, filtered and concentrated under reduced pressure. The crude product was purified by column chromatography ($SiO_2$ 230-400 mesh) eluting with 20% EtOAc in hexane to afford the title compound as off white solid (0.3 g, 7%). LCMS: $C_{20}H_{20}N_2S$; exact mass: 320.13; m/z: 321.1 (M+1)$^1H$ NMR (400 MHz, DMSO) δ 8.26-8.20 (m, 2H), 7.62 (t, J=8 Hz, 1H), 7.53 (t, J=7.6 Hz, 1H), 7.39-7.29 (m, 5H), 7.28-7.25 (m, 1H), 6.48 (s, 1H), 3.71-3.64 (m, 2H), 3.55-3.51 (d, J=16.4 Hz, 1H), 3.30-3.28 (m, 1H), 2.86-2.82 (m, 1H), 2.66-2.64 (m, 1H), 2.19-2.15 (m, 1H), 1.11 (d, J=7.2 Hz, 3H).

Step 5. Synthesis of 3-(5-methyl-1,2,5,6-tetrahydropyridin-3-yl)benzo[d]. A mixture of 3-(1-benzyl-5-methyl-1,2,5,6-tetrahydropyridin-3-yl)benzo[d]isothiazole (0.3 g, 0.9 mmol) in 1,2-dichloroethane (3.0 mL) and 1-chloroethyl chloroformate (0.1 mL, 1.1 mmol) were stirred at rt for 1 h before the reaction mixture was concentrated under reduced pressure. The residue was dissolved in methanol (3.0 mL) and resulting mixture was stirred at 50° C. for 2 h before being concentrated under a reduced pressure. The residue was $_{purified}$ by column chromatography ($SiO_2$ 230-400 mesh) eluting with 2% methanol in $CH_2Cl_2$ to afford the desired compound 0.2 g (yield 99%). The enantiomers were separated by chiral SFC (Column: CHIRAL PAK IG 250×50 mm 5 um, Mobile phase: A: LIQ. CO2, B: 0.1% M·NH3 MEOH-ACN (50-50) to get the title compound as Isomer-1 and Isomer-2.

Isomer-1: LCMS: $C_{13}H_{14}N_2S$; exact mass: 230.09; m/z: 231.1 (M+1). $^1H$ NMR (400 MHz, DMSO) δ 8.23 (t, d=8.8 Hz, 2H), 7.62 (t, J=7.2 Hz, 1H), 7.53 (t, d=7.6 Hz, 1H), 6.47 (s, 1H), 3.76-3.65 (m, 2H), 3.09-3.07 (m, 1H), 2.48-2.43 (m, 2H), 1.09 (d, J=6.4 Hz, 3H).

Isomer-2: LCMS: $C_{13}H_{14}N_2S$; exact mass: 230.09; m/z: 231.1 (M+1). $^1$H NMR (400 MHz, DMSO) δ 8.23 (t, d=8.4 Hz, 1H), 7.62 (t, J=7.4 Hz, 1H), 7.53 (t, d=7.6 Hz, 1H), 6.46 (s, 1H), 3.74-3.64 (m, 2H), 3.07-3.05 (m, 1H), 2.45-2.41 (m, 2H), 1.09 (d, J=6.4 Hz, 3H).

Example 18: IP1 Accumulation Assay

The functional activity of disclosed compounds is measured using an IP1 (inositol monophosphate) accumulation assay. The effects of disclosed compounds on IP1 production (a proxy for $G_q$ activation) was measured in HEK 293 cells expressing human serotonin 2A receptors (5-HT2AR) using a Homogeneous Time Resolved Fluorescence (HTRF) assay. Standard protocols are followed. Briefly, a cell suspension and test compound/s is incubated in a standard buffer. Following incubation, the cells are lysed, and the fluorescence acceptor and donor are added. After incubation the fluorescence transfer is measured, and data is analyzed using GraphPad Prism to generate concentration response curves. The results are shown in Table 2, where A=<100; B=100 to 1000; C=>1000 to 10000; D=>10000; E=inactive; and +++=>90; ++=75 to 90; +=50 to <75%; –=<50%; and NC=not calculated.

TABLE 2

| Compound | h5-HT2A $EC_{50}$ (nM) | h5-HT2A $E_{max}$ (% 5-HT) |
| --- | --- | --- |
| 101 | C | ++ |
| 102 | D | NC |
| 103 Isomer 1 | E | – |
| 103 Isomer 2 | E | – |
| 105 Isomer 1 | E | – |
| 105 Isomer 2 | E | – |
| 106 | D | NC |
| 107 | D | NC |
| 108 | D | NC |
| 132 | D | NC |
| 134 | E | – |
| 140 Isomer 1 | D | NC |
| 140 Isomer 2 | E | – |
| 141 | D | NC |
| 142 | C | + |
| 143 | C | ++ |
| 144 | C | ++ |
| 145 | C | – |
| 146 | B | + |
| 147 | C | +++ |
| 148 | E | – |
| 149 | E | – |
| 160 | A | + |
| 161 Isomer 1 | B | +++ |
| 161 Isomer 2 | A | ++ |

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:
1. A compound represented by Formula I:

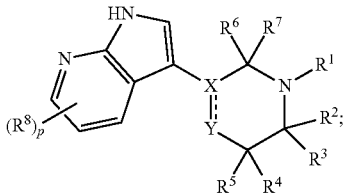

Formula I or a pharmaceutically acceptable salt and/or a stereoisomer thereof, wherein
- ⇌ is a double bond; X is C; and Y is CH; or
- ⇌ is a single bond; X is CR$^X$; Y is CHR$^Y$; and R$^X$ and R$^Y$ together form —CH$_2$—;
- R$^1$ is selected from the group consisting of hydrogen and C$_1$-C$_6$alkyl; wherein R$^1$ may optionally be substituted on an available carbon by one or more halogens or by C$_1$-C$_3$alkoxy;
- R$^2$ and R$^3$ are each hydrogen or each C$_1$-C$_6$alkyl;
- R$^4$ is selected from the group consisting of hydrogen and C$_1$-C$_6$alkyl; wherein R$^4$ may optionally be substituted on an available carbon by one or more halogens;
- R$^5$ is selected from the group consisting of hydrogen, halogen, cyano, C$_1$-C$_6$alkyl, and C$_1$-C$_6$alkoxy; wherein R$^5$ may optionally be substituted on an available carbon by one or more halogens; or
- R$^4$ and R$^5$, together with the carbon to which they are attached, may be joined together to form C$_3$-C$_6$cycloalkyl or 3-6 membered heterocyclyl;
- R$^6$ and R$^7$ are each hydrogen or each C$_1$-C$_6$alkyl; or
- R$^6$ and R$^7$, together with the carbon to which they are attached, may be joined together to form C$_3$-C$_6$cycloalkyl or 3-6 membered heterocyclyl; or
- R$^6$ and R$^5$ may be joined together to form —CH$_2$— or —CH$_2$—CH$_2$—; or
- R$^6$ and R$^3$ may be joined together to form —CH$_2$— or -CH$_2$-CH$_2$-;
- R$^8$ is selected from the group consisting of hydrogen, halogen, hydroxyl, C$_1$-C$_3$alkyl and C$_1$-C$_3$alkoxy; wherein C$_1$-C$_3$alkyl and C$_1$-C$_3$alkoxy may optionally be substituted by one or more halogens; and
- p is 0, 1, 2 or 3;
wherein:
- at least one of R$^1$, R$^4$ and R$^5$ is C$_1$-C$_6$alkyl substituted by one or more halogens; or
- R$^2$ and R$^3$ are each C$_1$-C$_6$alkyl; or
- R$^4$ and R$^5$ are each C$_1$-C$_6$alkyl or each halogen; or
- R$^6$ and R$^7$ are each C$_1$-C$_6$alkyl.

2. The compound of claim 1, wherein the compound is represented by:

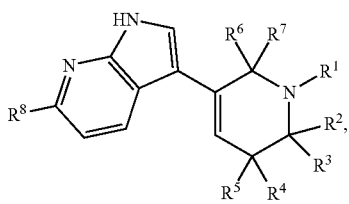
(IA)

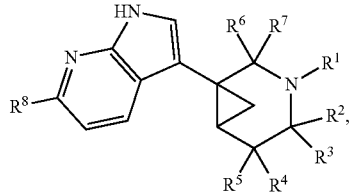
(IB)

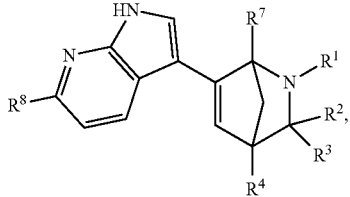
(IC)

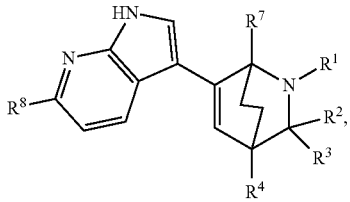
(ID)

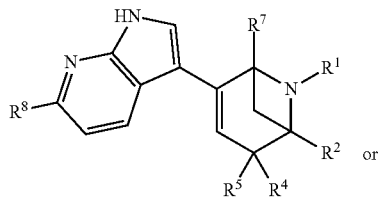
(IE)

or

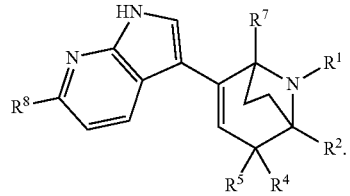
(IF)

3. The compound of claim 2, wherein the compound is represented by:

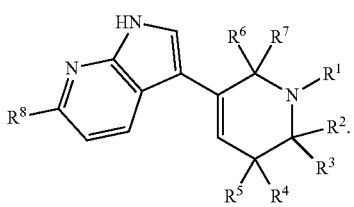
(IA)

4. The compound of claim 1, wherein at least one of R$^1$, R$^4$ and R$^5$ is C$_1$-C$_6$alkyl substituted on an available carbon by one or more fluoro atoms.

5. The compound of claim 1, wherein at least one of R$^1$, R$^4$ and R$^5$ is selected from the group consisting of —CH$_3$, —CH$_2$CH$_3$, —CH(CH$_3$)$_2$, and —CH$_2$CH$_2$CH$_3$ substituted by one or more fluoro groups.

6. The compound of claim 1, wherein at least one of R$^1$, R$^4$ and R$^5$ is selected from the group consisting of —CHF$_2$—CF$_3$, —CF$_2$CH$_3$, —CH$_2$CF$_3$, —CF$_2$CF$_3$, —CF₂CH₂CH₃, —CH₂CF₂CH₃, —CH₂CH₂CF₃, —CF₂CF₂CH₃, —CH₂CF₂CF₃—CF₂CH₂CF₃, —CF₂CF₂CF₃, and —CH(CH₃)(CHF₂).

7. The compound of claim 1, wherein $R^1$ is selected from the group consisting of hydrogen, —CH₃, —CF₃, and —CH₂OCH₃.

8. The compound of claim 1, wherein $R^2$ and $R^3$ are each unsubstituted $C_1$-$C_6$alkyl.

9. The compound of claim 8, wherein $R^2$ and $R^3$ are each —CH₃.

10. The compound of claim 1, wherein $R^4$ and $R^5$ are each unsubstituted $C_1$-$C_6$alkyl.

11. The compound of claim 10, wherein $R^4$ and $R^5$ are each —CH₃.

12. The compound of claim 1, wherein $R^4$ and $R^5$ are each fluoro.

13. The compound of claim 1, wherein $R^6$ and $R^7$ are each unsubstituted $C_1$-$C_6$alkyl.

14. The compound of claim 13, wherein $R^6$ and $R^7$ are each —CH₃.

15. The compound of claim 1, wherein $R^5$ is selected from the group consisting of hydrogen, fluoro, cyano, —CH₃ and —OCH₃.

16. The compound of claim 1, wherein $R^8$ is selected from the group consisting of hydrogen, fluoro, chloro, —CH₃, —CF₃, —OCH₃, and —OCF₃.

17. The compound of claim 1, wherein $R^8$ is hydrogen or fluoro.

18. A compound selected from the group consisting of:

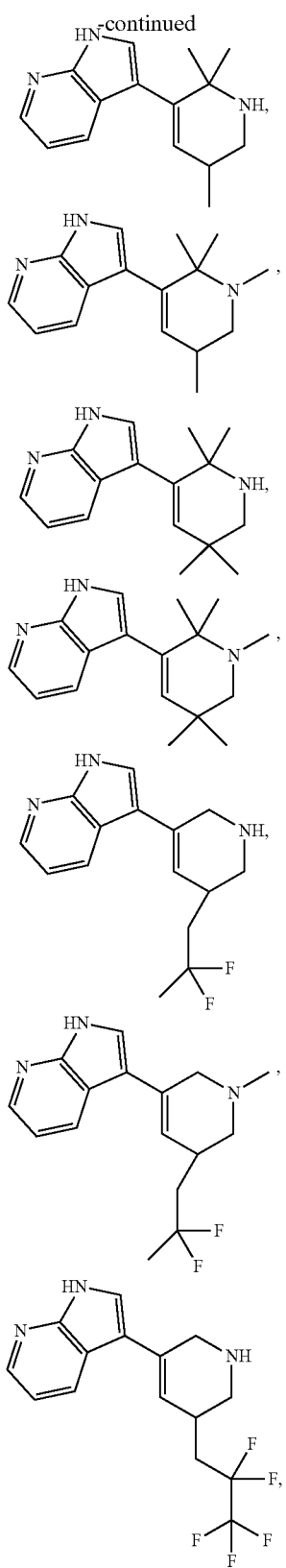

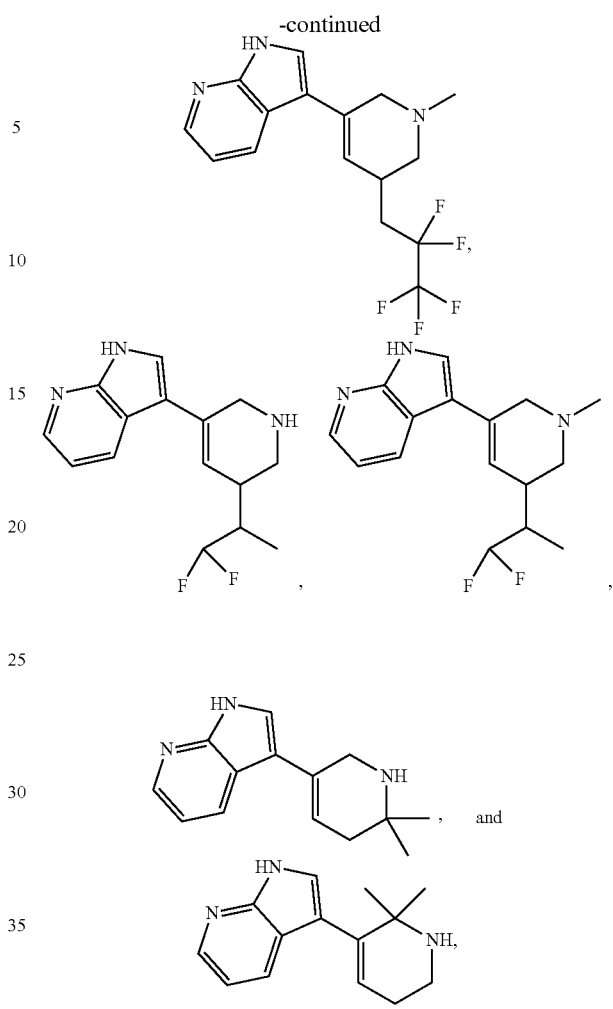

or a pharmaceutically acceptable salt and/or stereoisomer thereof.

19. A pharmaceutical composition comprising a compound of claim 1 and a pharmaceutically acceptable excipient.

20. A method of treating a neurological disease or disorder in a patient in need thereof, comprising administering to the patient a therapeutically effective amount of a compound of claim 1,
wherein the neurological disease or disorder is selected from the group consisting of depression, anxiety, substance abuse, and headaches.

21. A method of treating a neurological disease or disorder in a patient in need thereof, comprising administering to the patient a therapeutically effective amount of a pharmaceutical composition comprising a compound of claim 1 and a pharmaceutically acceptable excipient,
wherein the neurological disease or disorder is selected from the group consisting of depression, anxiety, substance abuse, and headaches.

* * * * *